(12) United States Patent
Tam et al.

(10) Patent No.: US 8,707,394 B2
(45) Date of Patent: *Apr. 22, 2014

(54) SYSTEM AND METHOD FOR CREATING A SECURE TRUSTED SOCIAL NETWORK

(75) Inventors: Chung Ming Tam, Ottawa (CA); Paramjit S. Gill, Ottawa (CA); Barjinderpal S. Gill, Los Gatos, CA (US)

(73) Assignee: ToPeer Corporation, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/524,279

(22) Filed: Jun. 15, 2012

(65) Prior Publication Data

US 2012/0324543 A1  Dec. 20, 2012

Related U.S. Application Data

(63) Continuation of application No. 12/783,270, filed on May 19, 2010, now Pat. No. 8,205,245, which is a continuation of application No. 11/267,668, filed on Nov. 4, 2005, now Pat. No. 7,797,732.

(30) Foreign Application Priority Data

Nov. 4, 2004 (CA) .................................. 2487327

(51) Int. Cl.
*G06F 7/04* (2006.01)
*G06F 17/40* (2006.01)
*H04L 29/06* (2006.01)
*G06F 21/10* (2013.01)
*G06Q 50/00* (2012.01)
*G06F 15/16* (2006.01)
*H04L 29/08* (2006.01)

(52) U.S. Cl.
CPC ................ *G06F 21/10* (2013.01); *G06Q 50/01* (2013.01); *H04L 63/08* (2013.01); *H04L 63/104* (2013.01); *H04L 67/104* (2013.01)
USPC ....... 726/3; 726/4; 726/28; 705/319; 709/205

(58) Field of Classification Search
CPC ........ G06F 21/10; G06Q 50/01; H04L 63/08; H04L 63/104; H04L 67/104
USPC ........................... 726/3, 4; 705/319; 709/205
See application file for complete search history.

(56) References Cited

U.S. PATENT DOCUMENTS 5,941,947 A    8/1999  Brown et al.
6,125,383 A *  9/2000  Glynias et al. ................ 709/202

(Continued)

FOREIGN PATENT DOCUMENTS

WO        0163423       8/2001
WO        02091206      11/2002
WO        WO2006047879 A1  5/2006

OTHER PUBLICATIONS

Feng, Jinjuan et al., "Empathy and Online Interpersonal Trust: A Fragile Relationship," Draft Research Paper, http://www.ifsm.umbc.edu/~preece/Papers/trust_paper_BIT2.pdf. Also published as "Empathy and Online Interpersonal Trust: A Fragile Relationship," Behav. Inform. Technol., 2004, vol. 23, No. 2.

(Continued)

*Primary Examiner* — Michael Simitoski

(57) ABSTRACT

A system for a plurality of users to share resources with access, control and configuration based on pre-defined relationships of trust between the users of the system. A computer-based authority provides the services of authentication, identification and verification of each user within network. Processes are described that leads to the formation of an electronic community, which facilitates electronic communication and transactions in a defined manner.

4 Claims, 53 Drawing Sheets

(56) References Cited

U.S. PATENT DOCUMENTS

| | | | |
|---|---|---|---|
| 6,134,327 A * | 10/2000 | Van Oorschot | 380/30 |
| 6,175,831 B1 | 1/2001 | Weinreich et al. | |
| 6,212,636 B1 * | 4/2001 | Boyle et al. | 713/168 |
| 6,215,872 B1 * | 4/2001 | Van Oorschot | 380/30 |
| 6,249,873 B1 | 6/2001 | Richard et al. | |
| 6,360,222 B1 | 3/2002 | Quinn | |
| 6,366,907 B1 | 4/2002 | Fanning et al. | |
| 6,519,629 B2 * | 2/2003 | Harvey et al. | 709/204 |
| 6,839,769 B2 * | 1/2005 | Needham et al. | 709/243 |
| 7,069,308 B2 | 6/2006 | Abrams | |
| 7,089,208 B1 | 8/2006 | Levchin et al. | |
| 7,246,164 B2 | 7/2007 | Lehmann et al. | |
| 7,716,140 B1 | 5/2010 | Nielsen et al. | |
| 7,797,732 B2 | 9/2010 | Tam et al. | |
| 7,845,000 B2 | 11/2010 | Viger et al. | |
| 8,010,458 B2 * | 8/2011 | Galbreath et al. | 705/319 |
| 8,205,245 B2 | 6/2012 | Tam et al. | |
| 2002/0029255 A1 * | 3/2002 | Glynias et al. | 709/218 |
| 2002/0059379 A1 | 5/2002 | Harvey et al. | |
| 2002/0194256 A1 | 12/2002 | Needham et al. | |
| 2003/0023677 A1 * | 1/2003 | Zuill et al. | 709/203 |
| 2003/0055898 A1 | 3/2003 | Yaeger et al. | |
| 2003/0115251 A1 | 6/2003 | Fredrickson et al. | |
| 2003/0158855 A1 * | 8/2003 | Farnham et al. | 707/102 |
| 2004/0006531 A1 | 1/2004 | Kwan | |
| 2004/0122803 A1 * | 6/2004 | Dom et al. | 707/3 |
| 2004/0148275 A1 | 7/2004 | Achlioptas | |
| 2004/0184478 A1 | 9/2004 | Donescu et al. | |
| 2004/0215793 A1 | 10/2004 | Ryan et al. | |
| 2005/0021750 A1 | 1/2005 | Abrams | |
| 2005/0038876 A1 | 2/2005 | Chaudhuri | |
| 2005/0091316 A1 | 4/2005 | Ponce et al. | |
| 2005/0198031 A1 | 9/2005 | Pezaris et al. | |
| 2005/0209999 A1 | 9/2005 | Jou | |
| 2005/0235062 A1 * | 10/2005 | Lunt et al. | 709/225 |
| 2005/0246420 A1 | 11/2005 | Little, II | |
| 2005/0267766 A1 | 12/2005 | Galbreath et al. | |
| 2006/0004789 A1 | 1/2006 | Lunt | |
| 2006/0021009 A1 | 1/2006 | Lunt | |
| 2006/0064739 A1 | 3/2006 | Guthrie et al. | |
| 2006/0080613 A1 | 4/2006 | Savant | |
| 2006/0117378 A1 | 6/2006 | Tam | |
| 2006/0224502 A1 | 10/2006 | McGowan | |
| 2006/0259957 A1 | 11/2006 | Tam et al. | |
| 2007/0027791 A1 | 2/2007 | Young et al. | |
| 2007/0061248 A1 | 3/2007 | Shavit et al. | |
| 2008/0255928 A1 | 10/2008 | Tomeny | |
| 2011/0004922 A1 * | 1/2011 | Bono et al. | 726/4 |

OTHER PUBLICATIONS

Web Page, "Napster," www.Napster.com, Archived at http://web.archive.org, Nov. 4, 2005.

Web Page, "eDonkey," www.eDonkey2000.com, Archived at http://web.archive.org, Nov. 4, 2005.

Web Page, "Kazaa," www.kazaa.com, Archived at http://web.archive.org, Nov. 5, 2005.

Tyson, Jeff, "How the Old Napster Worked," Web Page: HowStuffWorks(R), Archived at http://web.archive.org, Nov. 2, 2005.

International Preliminary Report on Patentability for PCT/CA05/01689, Mar. 12, 2007.

Written Opinion for PCT/CA05/01689, Mar. 9, 2006.

International Search Report for PCT/CA05/01689, Mar. 9, 2006.

"1st Workshop on Friend of a Friend, Social Networking and the Semantic Web", Sep. 2004, Galway, Ireland, Sponsored by SWAD-Europea and DERI, http://www.w3.org/2001/sw/Europe/events/foaf-galway/.

Dan Brickley and Libby Miller, About Foaf, foaf project, http://www.foaf-project.org/about, 2000.

Reagle, Joseph M. Jr., "Foaf—Spheres of Privacy", 2003, Web article, http://reagle.org/joseph/2003/09/foaf-spheres.html.

Sixdegrees.com, FAQ, http://web.archive.org/web/19980521125824/sixdegrees.com/about/faq.cfm, 1998.

Bedell, Doug, "Meeting Your New Best Friends Six Degrees Widens your Contacts in Exchange for Sampling Web Sites", Oct. 27, 1998, The Dallas Morning News, http:///www.dougbedell.com/sixdegrees1.html.

Zilberg, Shoshana, "Sixdegrees Product Launch Promises to Revolutionize Traditional On-Line Bulletin Boards", Business Wire, Oct. 14, 1997, http://www.allbusiness.com/technology/software-services-application-internet-social/7054085-1.html.

Business Wire, PhotoLoft.com Brings Picture Sharing to sixdegrees, Business Wire, Aug. 4, 1999, http://findarticles.com/p/articles/mi_m0EIN/is_/ai_55346526.

Freierman, Shelly, Screen Grab; 6 Degrees of Networking, NYTIMES.com, Jun. 4, 1998, http://query.nytimes.com/gst/fullpage.html?res=9C03E5D8123BF937A35755C0A96E958260.

Jardin, Xeni, Friendster patents social nets: SixDegrees cofounder responds, BoingBoing, Jul. 11, 2006, http://www.boingboing.net/2006/07/11/friendster-patents-s.html.

Festa, Paul, Investors snub Friendster in patent grab, Nov. 11, 2003, http://news.cnet.com/Investors-snub-Friendster-in-patent-grab/2100-1032_3-5106136.html.

Lian, Jian et al. "Understanding KaZaA", May 2004, retrieved from <http://cis.poly.edu/~ross/papers/>.

Popescu, Bogdan C. et al. "Safe and Private Data Sharing with Turtle: Friends Team-Up and Beat the System", Apr. 2004, retrieved from <http://www.cs.vu.nl/globe/publications.html>.

Goecks, Jeremy and Elizabeth D. Mynatt, "Leveraging Social Networks for Information Sharing", Nov. 2004.

BBC News. "Q&A: Online lending exchange", Mar. 2005, Retrieved from http://news.bbc.co.uk/go/pr/fr/-/2/hi/business/4325761.stm.

Fugger, R., "Money as IOUs in Social Trust Networks & A Proposal for a Decentralized Currency Network Protocol" (Version 2), Apr. 2004.

\* cited by examiner

| Terms and representative symbols | Description / Definition |
|---|---|
| Client | The software program supplied from a legitimate source that allows the user platform to connect to the Trusted Server and the rest of the network. This software can run on any computing device that has storage and one or more communication port |
| Client A | Represents a specific instance "A" of a client. |
| <br>Communication Service | Represents any means of contacting the trusted server which includes, for example, telephony, e-mail (preferred), instant messenging (IM), fax, mail, Web (HTTP) |
| Defined process<br> xxxx | Represents the processes as described in the present patent or in flow-chart. The numbers, XXXX, represents the corresponding process steps. For example, Steps 0020-0070, describes the communication between user and trusted server during the Setup process. |
| Logon / Logoff | Identification and authentication process for accessing the network. |
| Location Server | A computing device that has storage, computing capability and a communication port used for determining the location (for example, Internet Protocol (IP) address) of a client. It is part of the Trusted Servers. |
| Network | A collection of computing devices connected by a common communication protocol (for example, the TCP/IP protocol) |
| Platform (User Platform)<br>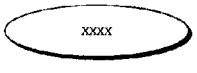 | Any computing device that has storage, computing capability and a communication port. |
| Propagation | Process describes how the user of Client A signs up one user who they trust and some form of relationship exists (e.g. friends, family, co-workers). Process can be repeated indefinitely to build up a list of trusted clients. |
| Searching | Finding information over the network |
| Setup | Describes the process of acquiring the client from the Trusted Server and installing the client on the user platform. |
| Trusted Server<br> | A computing device with one or more computing services and communication ports. Its main function is to provide the identification and authentication of clients on the network. |
| User / Member / Trusted Peer<br>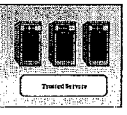 | The human element in the ownership and operation of a client. |

Figure 1

| Terms and Representative symbols | Description / Definition |
|---|---|
| Information flow  | Direction of information flow between processes/platforms |
| Connectors  | Used in flow charts to denote to connect flows from different locations |
| 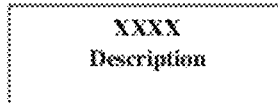 XXXX Description | Process description for a client |
| 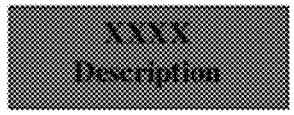 XXXX Description | Process description for the trusted user |
| 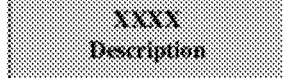 XXXX Description | Process description for another client |
| 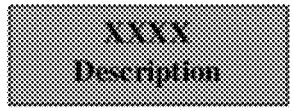 XXXX Description | Process description for location server |

Figure 1A

SYSTEM AND METHOD FOR CREATING A SECURE TRUSTED SOCIAL NETWORK

BACKGROUND

The history of computing and network architecture can be viewed as a spectrum between a more centralized approach as demanded in a Client-Server environment and the decentralized approach of a User-to-User network. Both approaches have their strengths and weaknesses. Each approach has been used to build electronic communities and create various forms of computer services.

A simple example of a client-server environment is a website. A website is a service provided by a server (specifically, a web server). Computing devices can access the website by connecting to the server through a network connection (via the Internet or through a local area network). One problem associated with Client-Server environments is that the server and the bandwidth required to service the number of request must also be able to scale with the growth of the number of clients.

User-to-user networks are a type of network in which each computing device connected to the network has equivalent capabilities and responsibilities. User-to-user networks are generally simpler, but they usually do not offer the same performance under heavy loads. Examples of User-to-User networks are file sharing networks such as Napster, E-donkey or Kazaa. Each of these services allow for direct connections between individual computing devices in the network to exchange files. The problem associated with User-to-User networks involves the lack of security, control and authenticity of the requested files. There are no limits on access to these networks and therefore users have no way to ascertain the quality or source of the received file.

A mixed Client-server and User-to-User system can be developed. For example, Fanning et al. (2002), created a centralized database to locate resources within a user-to-user network. However, Fanning et al. does not address the problems of security or control.

This present invention provides a solution to the problems of scalability of Client-Server environments and the security problems associated with User-to-User computing. The present invention uses a Client-Server environment to identify, authenticate and control the access to a User-to-User network. In addition, this invention applies the ideas of pre-defined social relationships to the access control of the user-to-user network to create a flexible and secure network.

The importance of social relationships and social networks were publicly recognized by Milgram (1967). A theory, known as the "Six degrees of separation" or "The Small World Problem", suggests that anyone on the planet can be connected to any other person on the planet through a chain of acquaintances that has no more than five intermediaries. Based on this idea, Weinreich, et al. (2001) created a process to build a database of linkages, and Quinn (2002) created a process to modify directory structures. However, neither Weinreich et al. (2001) nor Quinn (2002) deal with the issues of creating a flexible network based on the concept of social relationships in a user-to-user computing environment and do not address the issue of identification and authentication when accessing network services.

The key element in the establishment of a social network is the implicit understanding of the concept of "trust" between known users of a social network. Trust is defined in Merriam-Webster's Dictionary as "assured reliance on the character, ability, strength, or truth of someone or something". The nature of trust has proved to be elusive and been discuss extensively in the context of philosophy. The practical implication of trust can explained using game theory, human physiology and psychology and forms the basis of corporate strategy, and economics and sociology.

In the Republic (Plato, 390 BC), Plato suggests that trust exists because of the rules governing the transaction and the fear of punishment for disobedience. In this world view, self interest is the major component of trust. In contrast, other worldviews introduce the properties of innate goodness of humanity, sympathy or shared morality as the basis for trust. A clearer understanding of trust can be found in terms of applications and its impact on human transaction.

Strategic interactions among humans can be described using mathematics. This was first demonstrated by Von Neumann in 1944 in the field of game theory. In game theory, it can be shown that there is optimum strategy for dealing with a given situation or confrontation and the strategy depends on the goals of rational participants. For example, there are different strategies depending on whether one's objective is to maximize the probability of achieving a goal, maximizing one's gains, minimizing one's losses or risk, or ensuring that one's opponent(s) suffers the greatest damage. A classical example of game theory is known as the "Prisoners' Dilemma" (Tucker, 1950) which established the value of trust among participants. In this problem, the best possible outcome for the group as a whole occurs if each user trusts each other. In contrast, the worst possible results for the group occur when each user acts in their own interest.

Social organizations both formal and informal are a trait shared by all human beings. Every member of a society exists within a network of pre-existing relationships of trust. Interaction between relatives, family and kin can be explained based on a biological imperative. By including the element of trust to the psychological development of man, explanation of human interactions can be extended to friends and other users within a group, businesses, community and even nations. The key elements required for trust in a sociological context includes an expectation of future cooperation and a sense of reciprocity.

Trust is also recognized as a valuable component of business strategy. Trust exists within the human behaviour spectrum of confidence (result of specific knowledge built on reason and facts) and faith (belief that is largely immune to contradictory information or events). Trust for an individual can be characterized as a belief that those on whom we depend will fulfill our expectations of them. In a sense, therefore, predictability of behaviour engenders trust. For individuals, varying levels of trust can be established based on fulfilling expectations, acting with integrity and being empathetic.

The concept of trust is also a key element in the theories of macro-economics. In this context, trust can be characterized as an expectation within a community that users of the community will exhibit regular, honest, and cooperative behaviour, based on commonly shared norms. The existence of trust creates social capital, which in turn determines the size of firms, businesses and even economies. Therefore, it is known that one skilled in the art would appreciate that communities of individuals exist where the level of trust accorded to members of that community is greater than that given to the public at large based on the criterion of membership to that community. This could apply to a boy scout troupe, a sports group, a family, to citizens living in a small town or county or even to groups based on ethnicity, race, language, religion or other criteria where a higher level of trust is given to members of the community than to the general public.

The novelty in this invention is the realization that acceptable social behaviour or trust can be codified as a criterion and used to create a security rule, and through its implementation can create a secure electronic community. For example, the simple criterion of "I trust my friends and allow them access to my computing device" can be extended to include "I trust friends of my friends and allow them access" and this logic can be extended recursively until the list of friends and extended friends are exhausted. In this case, the criteria also include the degree of separation between the members of the community. A user might be willing to trust the friends of their trusted friends but not their friend's friend's friend. The underlying social expectation, a friend's trust, forms the security rule for this network. The trust that forms the basis of social relationships can also be found in the workplace. In these cases, the implicit trust is based on the roles of an individual. For example, the CEO of a company allows the vice presidents permission to access a company resource. The vice presidents can allow their managers access to the same resource without the intervention of the CEO or another central administrator. The implications for this type of network are that each user, through his/her role within an organization, is responsible and can make resource access decisions. This role-based trust can once again form the basis of the security rule for establishing the network.

As a result, the present invention provides a new approach to connecting computing devices and allows them to interact based on a secure and acceptable manner which is based on the roles and social connections of the users. The reach and extent of the resulting network can be adjusted according to the preference of the user.

SUMMARY OF THE INVENTION

An object of the present invention is to provide a system for a plurality of users to share resources. In accordance with an aspect of the present invention, there is a provided a system for a plurality of users to share resources comprising one or more software clients, each of said software clients installed on a computing device; one or more trusted servers; one or more communication means allowing communication between said one or more trusted servers and said one or more software clients, said trusted servers comprising: a network interface operable to receive data packets from the software clients and further operable to send processed data packets to the software clients; a processing engine in communication with the network interface, said engine operable to associate each data packet with an identifier and to thereby provide said processed data packets; a database containing an identifier associated with each software client in said system, and wherein each identifier in said database is related to each other identifier by means of a criterion.

In accordance with another aspect of the invention, there is provided a system for a plurality of users to share resources, said system produced by the process of providing a software client to a first user for installation on a first computing device; receiving a first set of data packets relating to said first user from said software client to a trusted servers via one or more communication means; compiling a database of said first data packets; receiving a second set of data packets relating to at least one second user with whom said first user has a pre-existing relationship defined by a criterion; adding said second set of data packets to the database and relating said second set of data packets to said first set of identifying data by means of said criterion; and providing the software client to the second user for installation on a second computing device; wherein, said first, second, or new user can repeat steps b to f resulting in additional users being added to said system.

In accordance with another aspect of the invention there is provided a method to search for information, resources or services contained on the computing devices connected to a system for a plurality of users to share resources, based on the properties of the object as well as a criterion as specified by the user, wherein the search type includes: a query through the software client including identification information of the initiator of the search, which is passed from trusted client to trusted client; a query through the software clients where requests and responses are passed from one software client to another; or a query through the trusted servers 3 whereby the trusted servers 3 performs the searching of trusted users.

The system is a network of computing devices designed to permit users to share resources. Users are understood to be human beings. Resources can include without being limited to: data, digital files, memory, processing power, and storage space. A computing device would be understood by a worker skilled in the art to include any electronic device with storage and computing capability and a communication means with which to communicate with other computing devices. Computing devices may include but are not limited to computers, cell phones, mp3 players, pagers, gaming consoles, handheld gaming devices, wireless devices, and personal digital assistants. The communications means would be understood by a worker skilled in the art to include any necessary elements of hardware, including but not limited to communications ports, wireless transmitter/receivers, wires or fibre optics; and software, including but not limited to telephony, e-mail, facsimile, Bluetooth®, TCP/IP, FTP, XML, and IRC, that allow a computing device to exchange data packets with another computing device.

Access, control and configuration of the system are based on user-defined social relationships. Trusted servers provide the services of authentication, identification and verification for each user within network. The trusted servers are computing devices connected to the network that can identify, verify and authenticate users of the network. This process defines who the users are, for example by means of a login and password, and where they are located in terms of the network, for example an IP address. The trusted servers can confirm these facts as part of an authentication process. Information regarding each user registered with the system is stored on the trusted servers for authentication and identification purposes.

A software client installed on each computing device connected to the network acts as an interface to allow the user to communicate with the trusted servers and other computing devices. Access to the system is controlled by the users who can invite members of their trusted social network to join the system. Once invited, a new user can download the software client, access the network and invite new members. Processes are described that lead to the formation of an electronic community, which facilitates communication between computing devices connected to the system and transactions between those computing devices in a defined manner.

As each user is added to the system they are assigned a criterion N, which can be defined as the degree of separation between the users. Users can be assigned other criterion such as whether they are trusted by another user. By means of these and other criteria every user on the system can be identified relative to every other user on the system. For example, User A invites a trusted friend, User Z to join the system. User A and User Z have a degree of separation of 0, thus N=0. If User Z invites another trusted friend, User Z1 to join the network then User Z and User Z1 will have a degree of separation of 0 and User Z1 and User A will have a degree of separation of 1. Users of the system can define the degree of separation that they are willing to allow access to the resources on their computing device. If User A wishes to restrict access only to his friends he or she sets N to equal 0. The effect of different definitions of N is explored in the following table:

TABLE 1

An example of network access based on degrees of separation.

| Degree of Separation (N) | Description |
|---|---|
| 0 | A trusted network, only friends can connect |
| 1 | Only friends of trusted friends can connect |
| 2 | Friends of trusted friends' friends can connect |
| . | . |
| . | . |
| . | . |
| N is a very large number | Everyone who has social relations on the network can connect |

Once users are connected based on their defined properties, they can communicate and share services and resources. Some examples include: transfer and exchange of electronic files, transfer or exchange of text messages and/or transfer and exchange of voice data.

Alternatively, in a business or professional environment, the social relationships are replaced by roles that are defined by the position/role and responsibility. The same trust and security issues exist and can be used to form a network using the present invention.

BRIEF DESCRIPTION OF THE FIGURES

Further features of the invention, its nature and various advantages will be more apparent from the accompanying drawings, and the following detailed description in which like reference numerals refer to like elements and in which:

FIG. 1 is a description of Terms and Symbols used in process diagrams, in the process details and in the flowcharts.

FIG. 1A is a table listing a description of terms and symbols describing flows of information in the process diagram and in the flow charts.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Process diagrams provide a high level view of the entire process. The system is comprised of various steps outlined below, with the numbers in brackets representing the corresponding steps in the detail process description and the corresponding flowchart:

Setup (0000-0100)
Propagation (0100-0499)
New User Contacted Through trusted servers (0100-0499)
Direct User-to-User Contact (0300-0402)
Linking known clients (0400-0499)
Logon-Logoff from Client (0500-0799)
Logoff gracefully (0600-0699)
Logoff suddenly (0700-0799)
Searching (4000-499)
Searching through trusted Client (4000-4099)
Searching through Location Server (4100-4250)
Transfer/Exchange/Communications (5000-5999)
Remote access (6000-6099)

FIG. 1A is a chart that defines the symbols used in the process charts and is meant to assist the worker skilled in the art in conceptualizing the invention.

Setup (0000-0100)

Figure 1B:
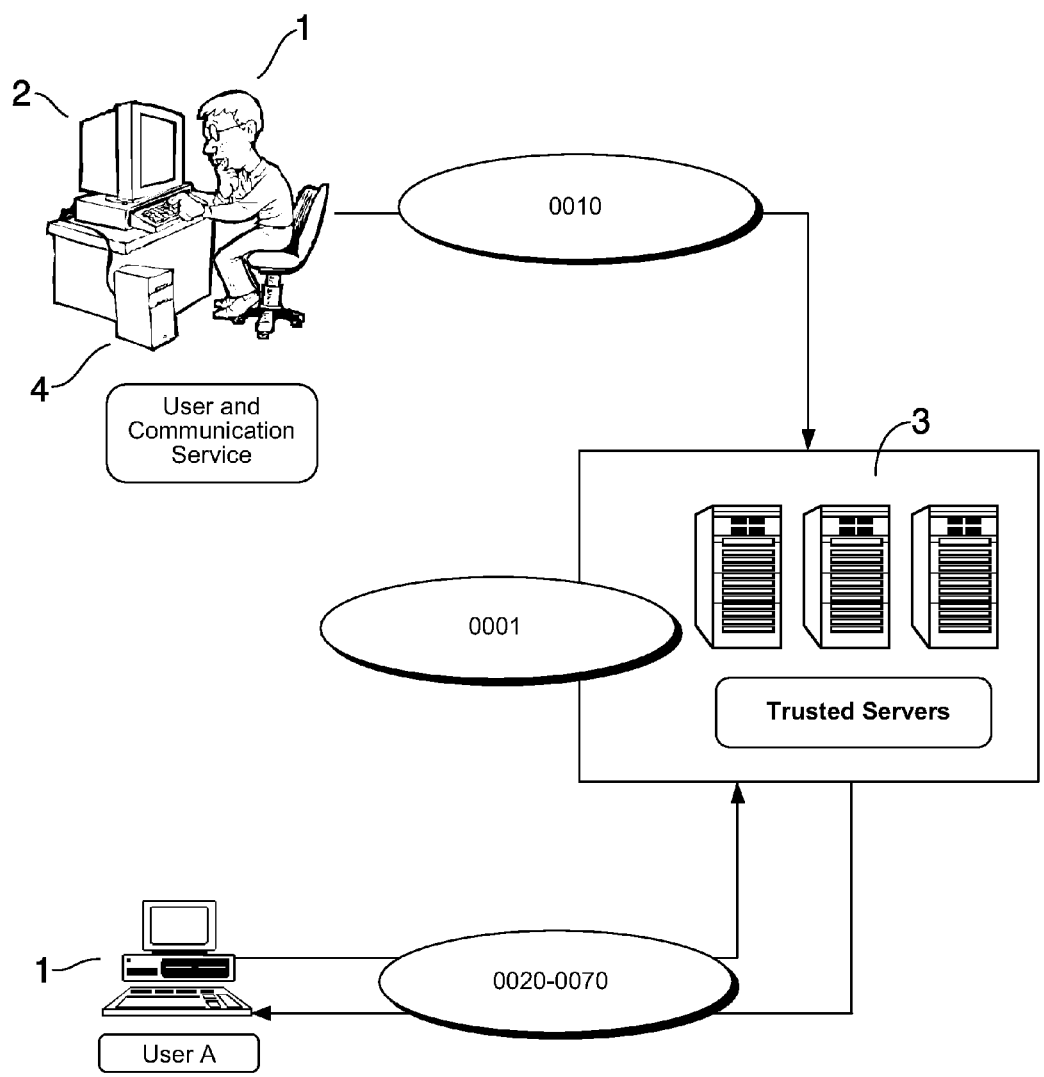
FIG. 1B is a process diagram for setting up the Network.
Figure 2:
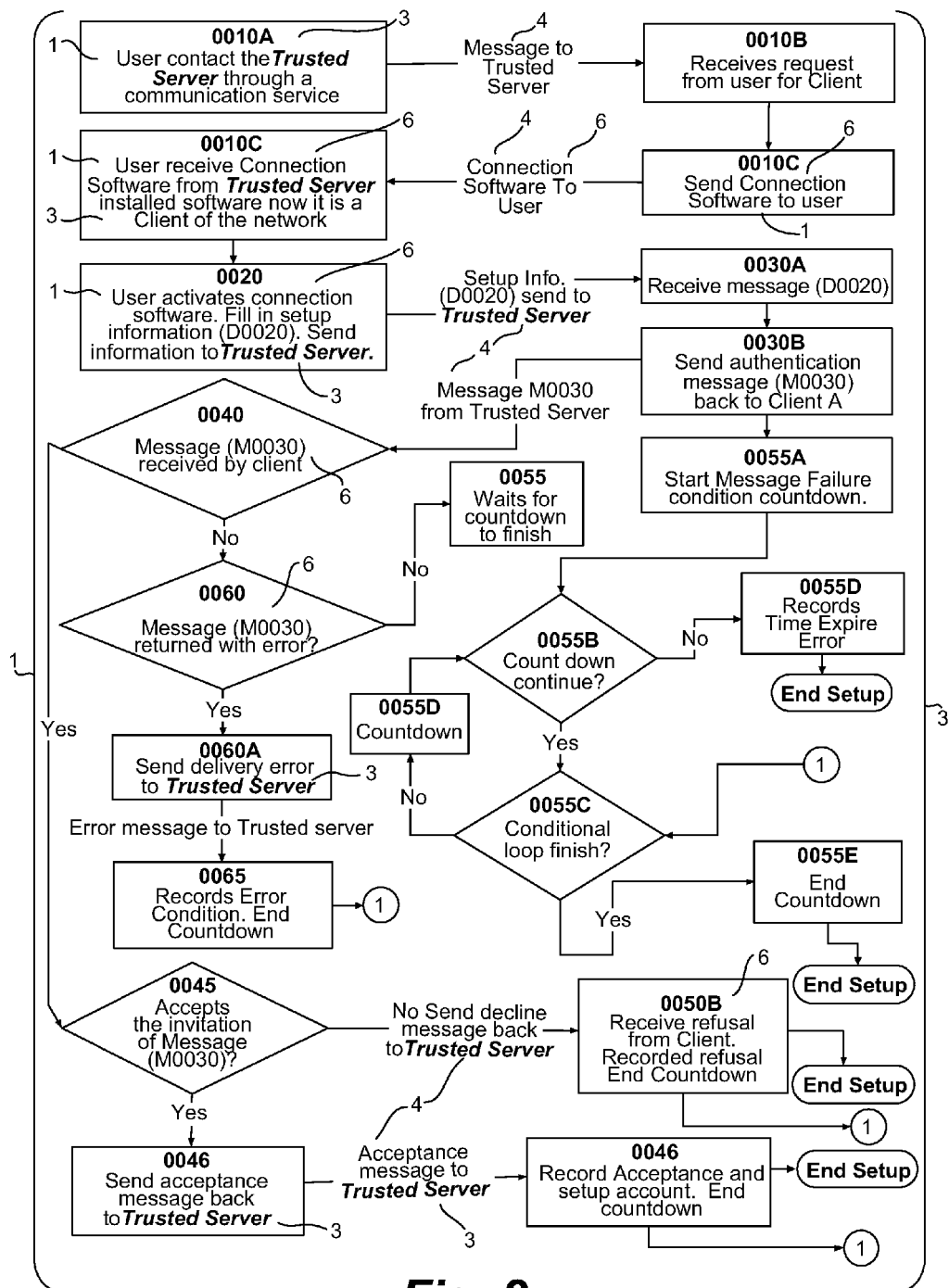
FIG. 2 is a flowchart diagram for setting up the Network.

Referring to FIG. 1B there is generally shown an overview of the setup process for the system. The user 1, a human being, uses a computing device 2. The computing device 2 has a software client installed on it, which is supplied from a legitimate source, namely the trusted servers 3. The user 1 uses the software client to connect to the trusted servers 3 and the rest of the network. The software client can run on any computing device that has the capacity to store and process digital information and one or more communication means. The user 1 of a computing device 2 communicates with the trusted servers 3 by means of a communications means 4, downloads the connection or "client" software, completes the setup process and is designated as User A 1. FIG. 2 is a representation of the same process as a flowchart. Descriptions of the steps required in the process are as follows. In steps 0010A to 0010C of the process, the user 1 contacts the trusted servers 3 through an appropriate communication service 4 and downloads the software client 6. After the installation of the software client 6, the user 1 can now be known as User A 1. Communication service 4 represents any means of contacting the trusted servers 3 which includes, for example, telephony, e-mail, instant messaging (IM), mail, fax, or Web (HTTP). Once the software client 6 is installed, step 0020 is for User A 1 to activate the software client 6. The software client 6 queries User A 1 for setup information (D0020). Setup information (D0020) contains at least the contact information for User A 1 (e.g. Telephone number, e-mail, mailing address). Examples of additional information include but are not limited to demographics, occupation, and other points of contact. User A 1 enters the required setup information D0020 which is sent through communication service 4 to trusted servers 3. In steps 0030A and B, trusted servers 3 receives the setup information (D0020) and sends an automatically generated authentication message (M0030) to User A 1 based on the contact information specified in D0020. This step represents a confirmation of contact information provided by the software client 6. In step 0040, User A 1 receives the message. User A 1 now has a choice of actions after receiving information (M0030) from the trusted servers 3. In step 0045 User A 1 accepts the terms and conditions of use, and, in step 0046, sends acceptance to trusted servers 3 3. The trusted servers 3 then create an account for User A 1. In step 0050B, User A 1 declines to accept the terms and conditions of use for the network, this refusal is send to the trusted servers 3 3. The trusted servers 3 note that User A 1 has abandoned the signup process. In steps 0055A to E User A 1 does not act on Message (M0030) after a set period of time. The trusted servers assume that the application has been abandoned. Alternatively, steps 0060A and B assume that the authentication message (M0030) was returned to trusted servers 3 with an error condition for message delivery. Examples of error conditions include but are not limited to a bounced back e-mail, a busy signal on a telephone or a returned mailing. In step 0065 the trusted servers 3 takes note of the failure and reacts accordingly.

Propagation (0100-0499)

Propagation describes the process of how a user, in this case, User A signs up one user who they trust through some form of relationship exists (e.g. friends, family, co-workers). This process can be repeated indefinitely to build up a list of trusted clients for User A. User A can define a trusted client in three ways:

ask trusted servers to contact a new user;
 redirect new user to the trusted servers, or
 linking two users already on the network.

Each of these scenarios will be described in more detail as follows.

New User Contacted Through Trusted Servers (0200-0299)

Figure 3:
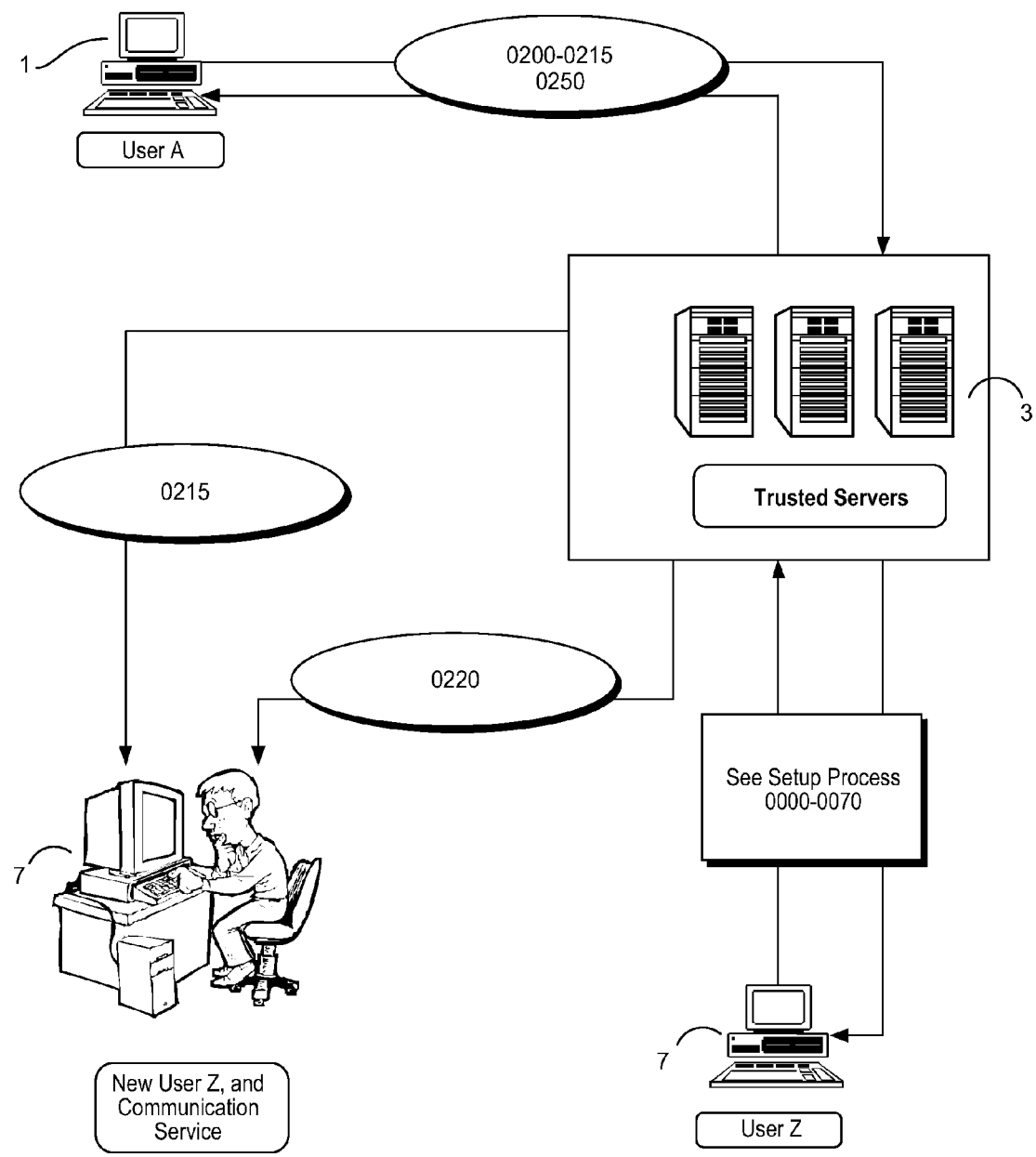
FIG. 3 is a process diagram describing the situation where a new user is referred and contacted through trusted servers 3.
Figure 4:
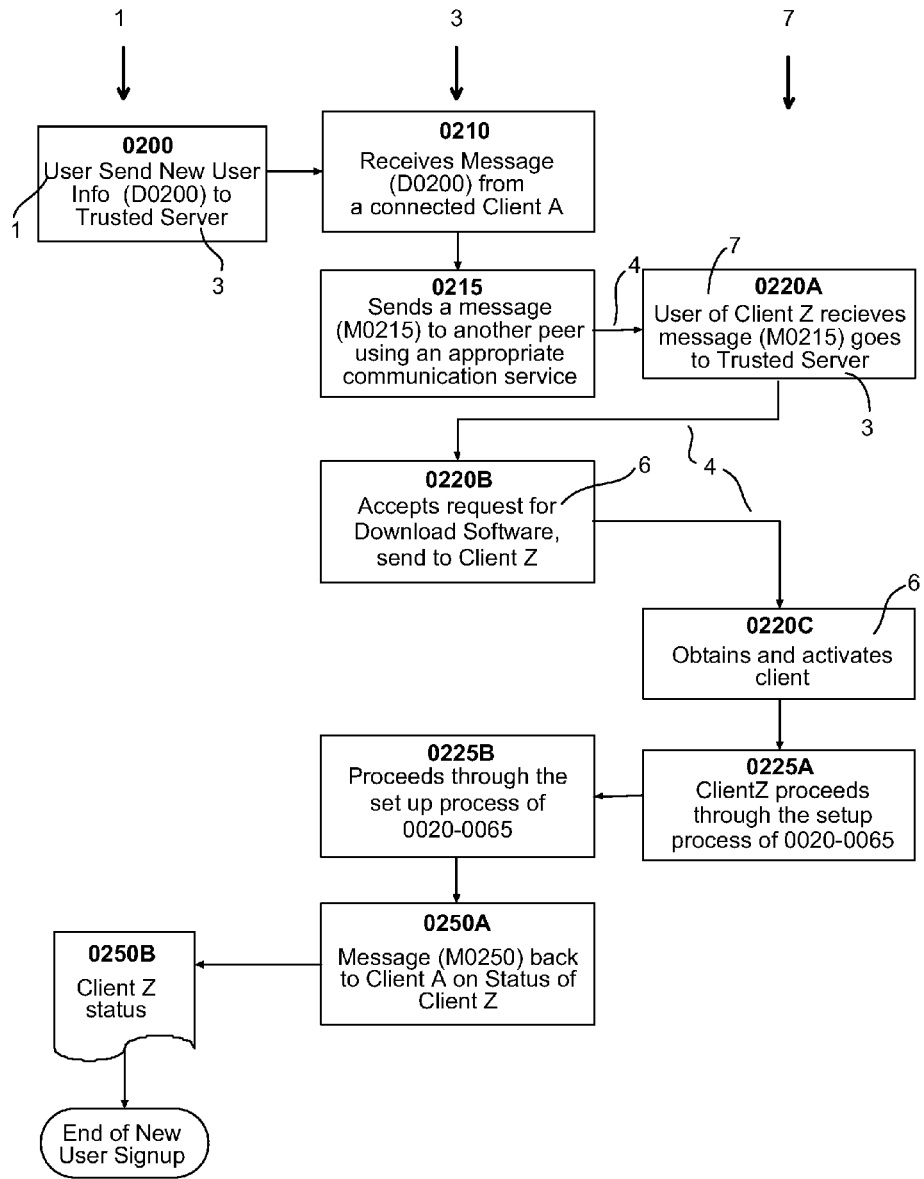
FIG. 4 is a flow chart describing the situation where a new user is referred and contacted through the trusted servers 3s

With reference to FIG. 3, a user of the network, User A 1, initiates the process by sending contact information of a trusted individual to the trusted servers 3. The new user, in this case defined as User Z 7, is contacted by the trusted servers 3 and prompted to sign up for the service. User Z 7 is a person with whom User A 1 has a pre-existing relationship of trust either through a social network or through predefined roles. With reference to FIG. 4, in step 0200 User A 1 logs on to the network and sends a message (D0200) to the trusted servers 3. Message D0200 should contain, at the minimum, contact information for another trusted User Z 7, as defined by User A 1 (for example, telephone number, e-mail, etc.). This is the start of the referral process for a new user, in this case, referred to as Z, a trusted user defined by User A 1. In step 0210 the trusted servers 3 receives message D0200 and initiates the referral process. In step 0215, the trusted servers 3 sends a message (M0215) to User Z 7, through an appropriate communication service 4 (as defined by the contents of message D0200) inviting User Z 7 to obtain the software client 6 from the trusted servers 3. The message (M0215) should contain but is not limited to the following: Greetings, Explanation of Service, How to Download Software Client from trusted servers. In step 0220, User of User Z 7 receives message (M0215), and then downloads and installs the software client 6. In step 0225 User Z 7 proceeds through the setup process defined above by steps 0020-0070, above. Once this process is complete, in step 0250, the trusted servers 3 sends a confirmation message (M0250) back to User A 1 indicating that User Z 7 is now a user of the electronic community. Step 0280 is the end of new user signup process.

Direct User to User Contact (0300-0399)

Figure 5:
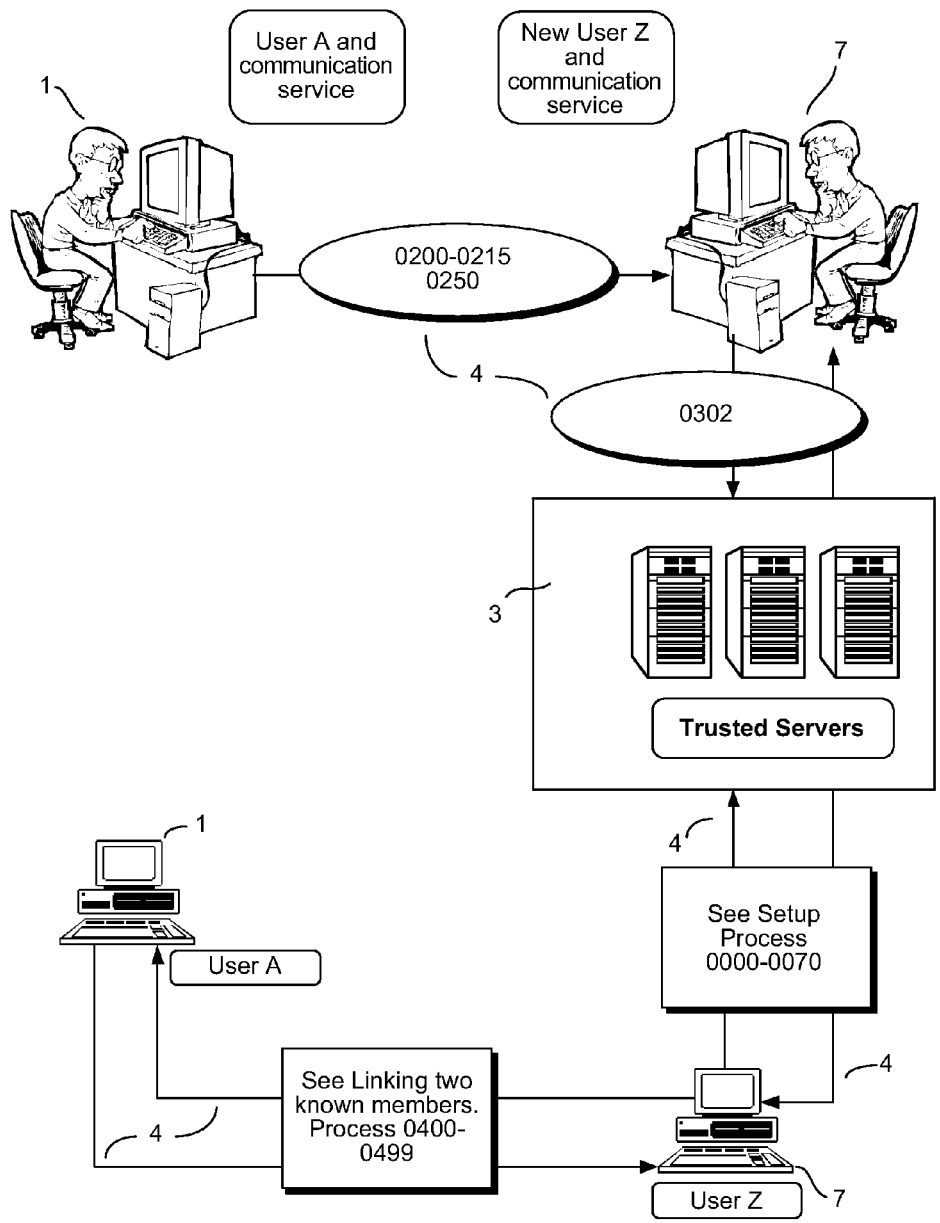
FIG. 5 is a process diagram describing the case when a user refers their friends to the trusted servers 3.
Figure 6:
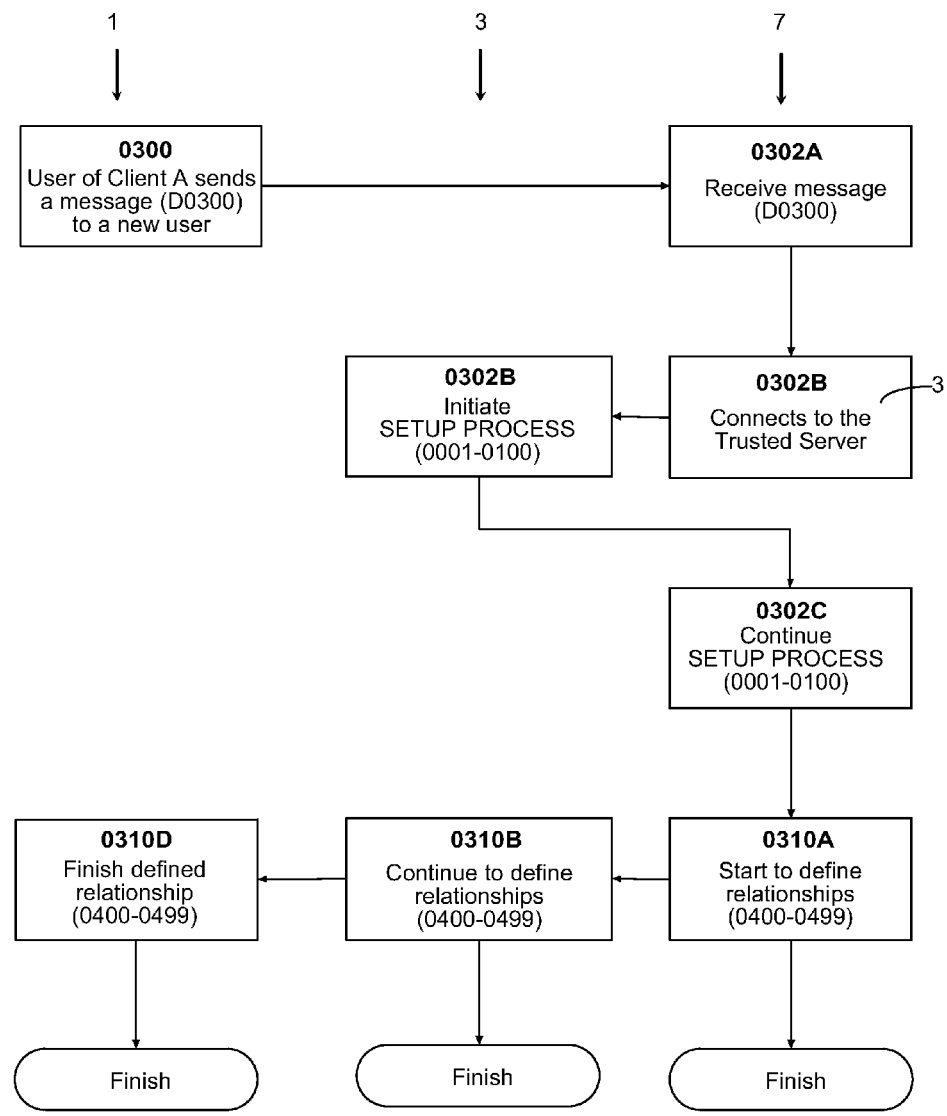
FIG. 6 is a flow chart describing the situation where a user is referred his friend to the service.

In this case, the new user is contacted by another user directly and prompted to sign up for the service. With reference to FIG. 5 User A 1 refers User Z 7 to a website where the software client can be downloaded and the User Z 7 goes directly to this website. The details follow and the accompanying flow chart is shown in FIG. 6. In step 0300 User A 1 sends a message (D0300) through an appropriate communication means 4 to a trusted user, User Z 7, to tell them to sign up onto the network. Message (D0300) contains at least the location where User Z 7 can download the software client 6. In steps 0302A to C User Z 7 receives Message (D0300), connects to the trusted servers 3 and proceeds through the Initial Setup process as discussed above in steps 0010-0100. In steps 0310A to C, after the account is set up, the User Z 7 proceeds to define his or her relationship with User A 1 as outlined in process 0400-0499 above.

Linking Users Already on the Network (0400-0499)

Figure 7:
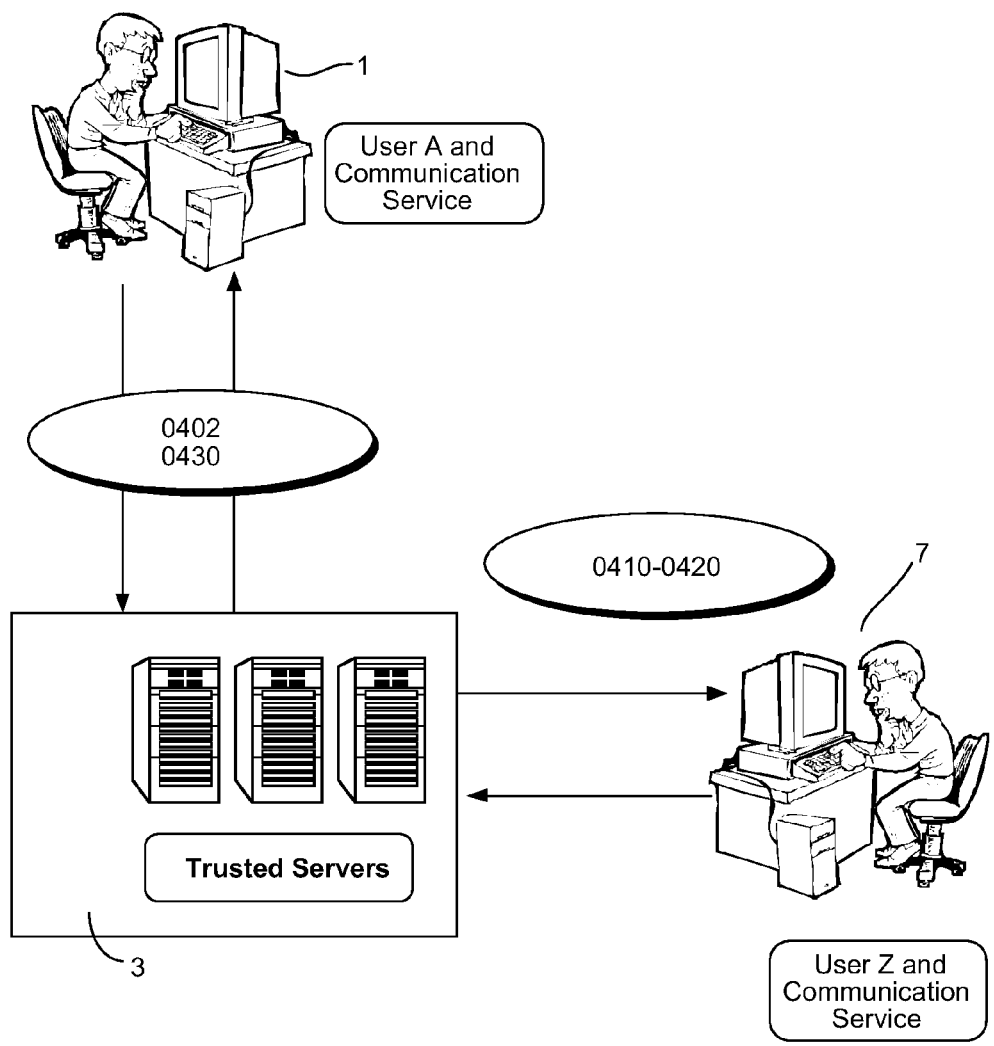
FIG. 7 is a process diagram describing the case when a user establishes a relationship with another user of the network.
Figure 8:
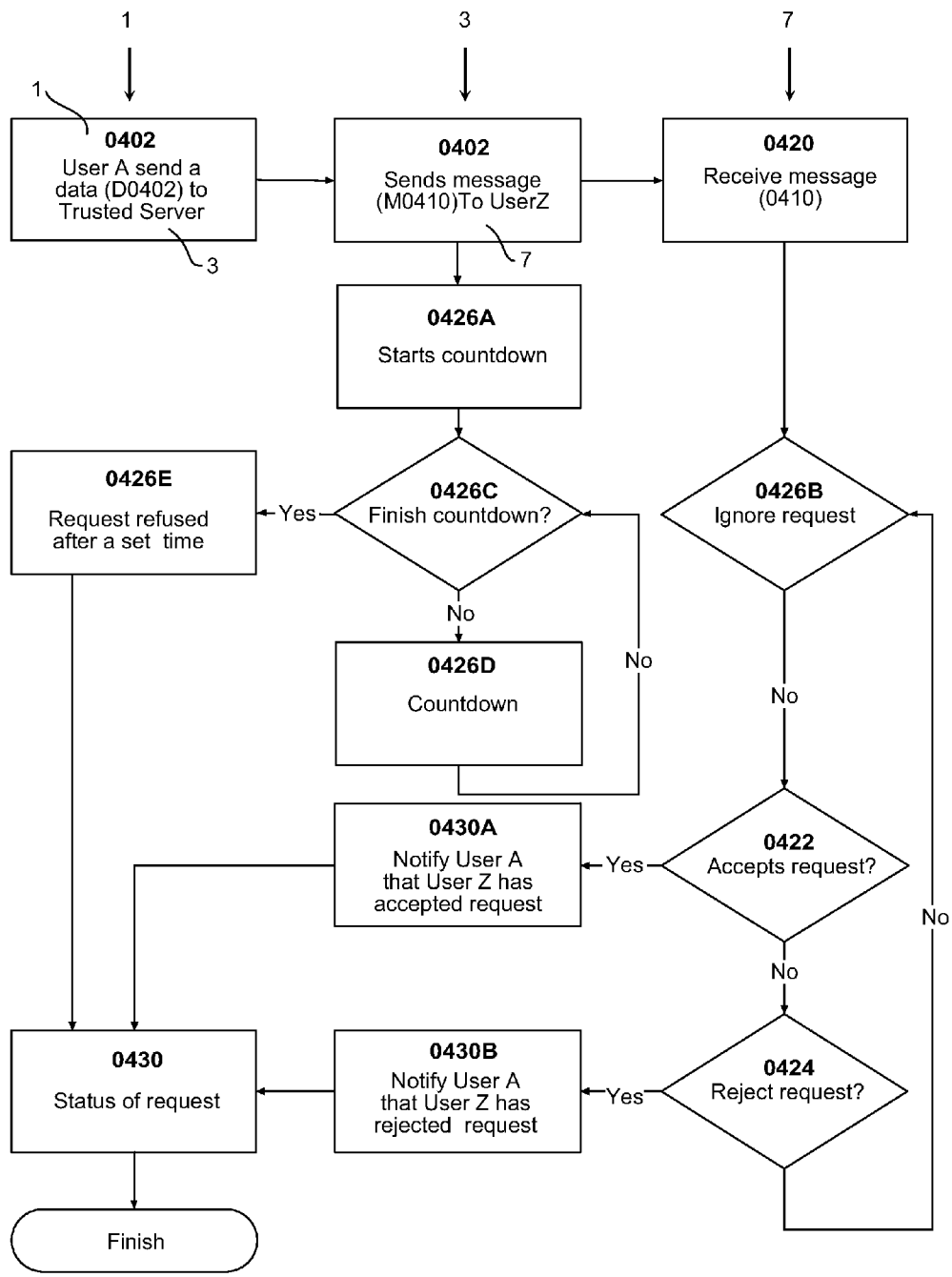
FIG. 8 is a flowchart describing the case when a user establishes a relationship with another user of the network.

In this case, a user wishes to establish a linkage with another user that is already on the network. With reference to FIG. 7 both User A 1 and User Z 7 are users of the network who are not already related and want to establish a direct relationship. User A 1 sends a message to the trusted servers 3, defining User Z 7 as a trusted user. User Z 7 can accept or reject this new definition, by communicating with the trusted servers 3. With reference to FIG. 8, in step 0402, User A 1 sends data (D0402) to trusted servers 3 defining User Z 7 as a trusted user. Data (D0402) is information that contains at least the network identification or other type of unique identifying information of User Z 7. In step 0410, the trusted servers 3 receives data (D0402) and sends message (M0410) to User Z 7 notifying them of a request to create a relationship with User A 1. In step 0420 User Z 7 receives message (M0410) and then takes one of several actions. In step, 0422 User Z 7 accepts the request and sends acceptance (D0422) back to the trusted servers 3. In step 0424, User Z 7 declines the request and sends refusal (D0424) back to the trusted servers 3. Finally, in steps 0426A to E, User Z 7 ignores the request and the request is considered to have been refused after a set time. In step 0430, the trusted servers 3 relay the action of User Z 7 to User A 1 and also note the action for the authentication and identification service.

Logon to the Network with a Client (0500-0599)

Figure 9:
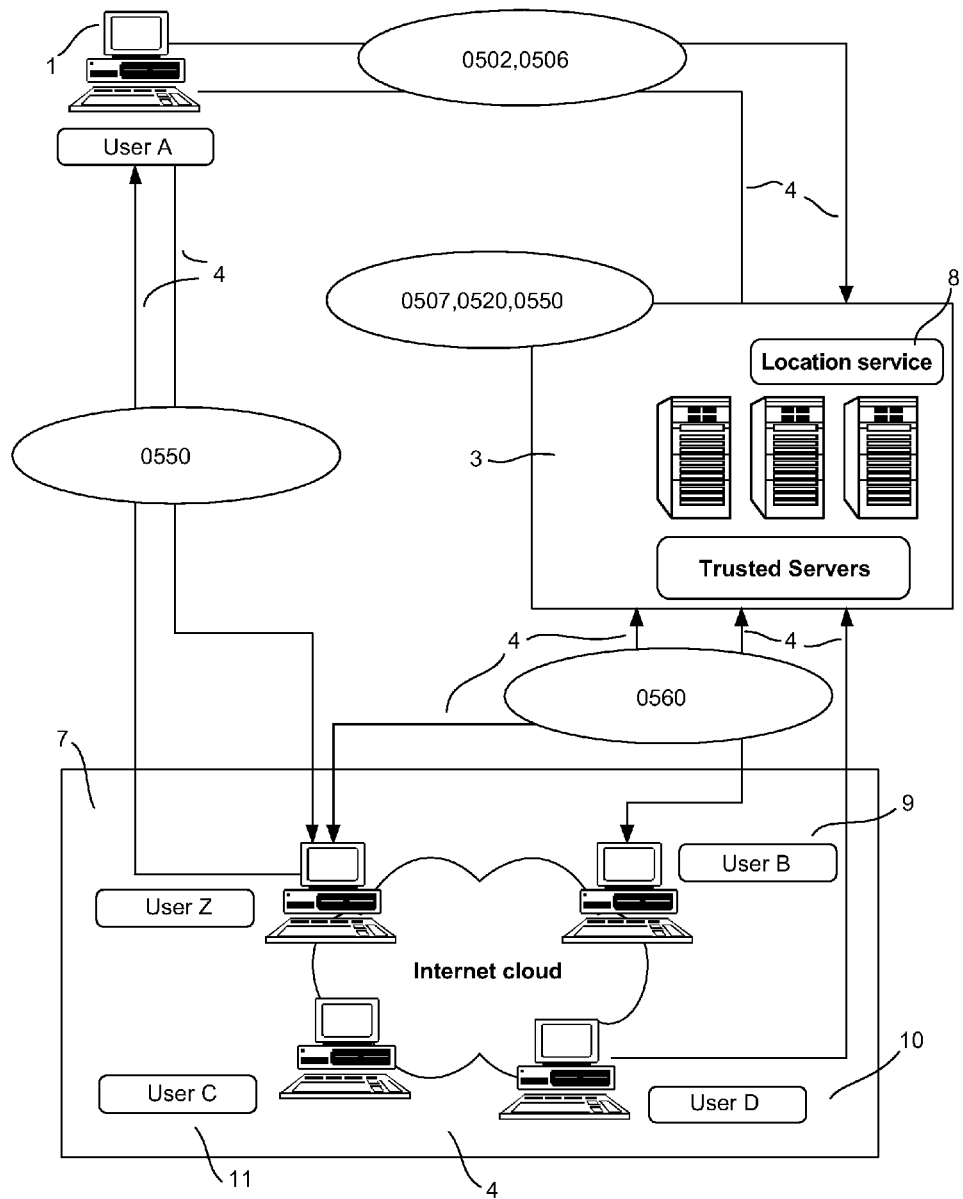
FIG. 9 is a process diagram describing the process of logon to the network.
Figure 10:
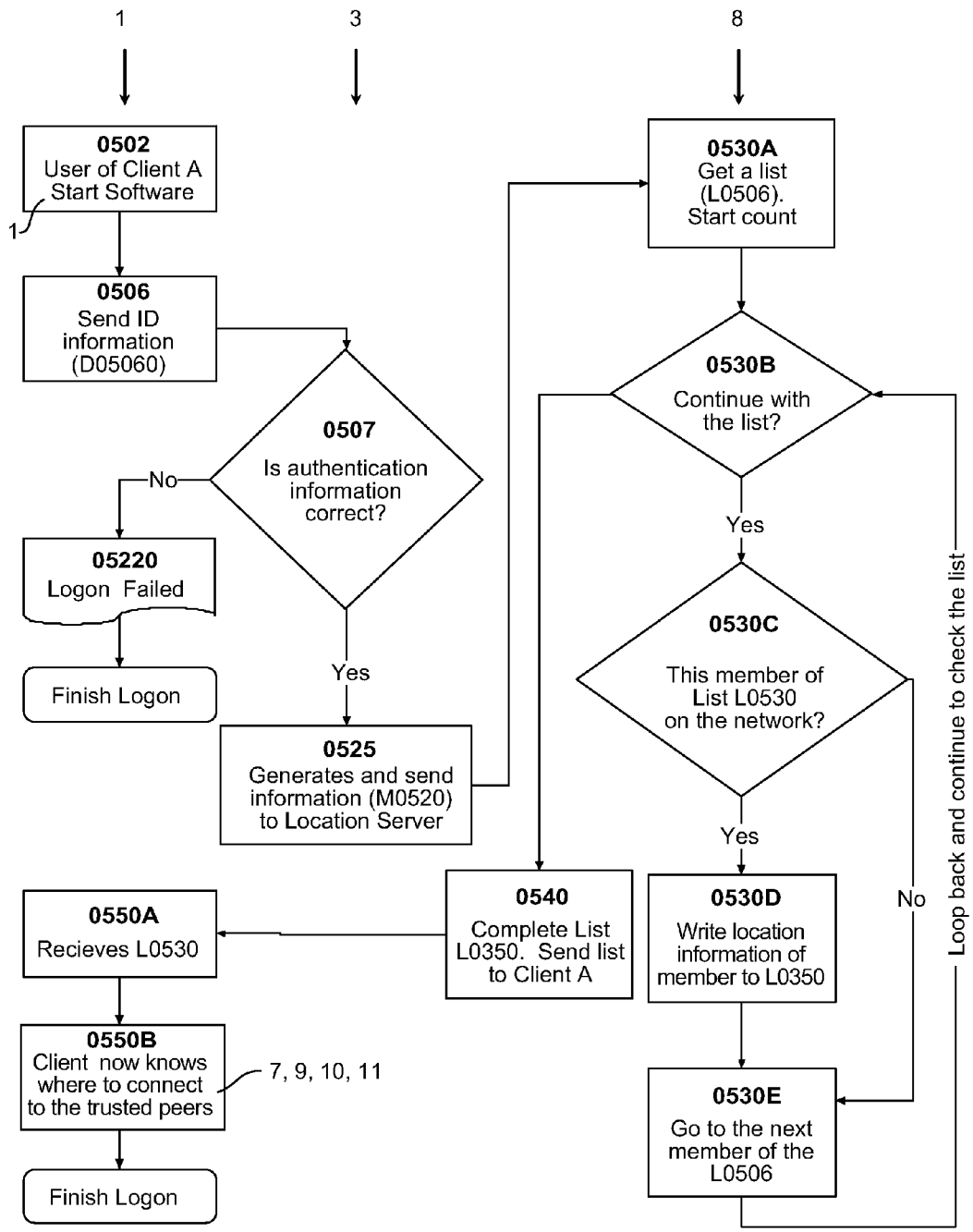
FIG. 10 is a flow chart describing the logon process.

The situation for logon to the network from a client is summarized in FIG. 9. The details of the process are shown in steps 0500-0599 and a flowchart in FIG. 10. In step 0502,
  User A 1 activates software client 6. In step, 0506 the software client 6 contacts the trusted servers 3 through an appropriate communication service 4 and sends the Identification Information (D0506) which can include but is not limited to a UserID and a Password. Additional information that can be provided for example, is contact information (e-mail, communication port, IP address), N (Level of trust), list of trusted users (L0506). In step 0507, User A 1 undergoes an authentication process on the trusted servers 3 wherein the authentication process includes at the minimum comparing UserIDs and passwords. Additional parameters can include, but are not limited to, biometrics, usage information and other types of metrics that are designed to verify the identity of User A. In step 0520, User A's 1 identity is verified. Then, in step 0525, the trusted servers 3 generate information and instructions (M0520) which are sent to the Location Service 8, a software program. The information and instructions (M0520) include at the minimum UserID and a list of trusted users for the particular User. The Location Service 8 is a specialized service that knows the connection point of each user on the network. The Location Service 8 is handled by a Location Server which is considered to be one of the trusted servers 3. For the purposes of this example, connection point is defined at the minimum as a socket connection for a TCP/IP network. In steps 0530A to E, the Location Service 8 goes through a list and determines which trusted users 7, 9, 10, 11 of User A 1 are currently on the network. The connection points of the users are summarized in a list (LIST0530). In step 0540, the Location Service sends list (LIST0530) back to User A 1. In step 0550, the list (LIST0530) has been received and User A 1 can now connect to each of the trusted users on the list if necessary. The trusted users for A that are currently not on the network are identified as "not available". In step 0560, the Location Service also goes through list (LIST0530) and notifies each user of the list, namely, User Z 7, User B 9, User D 10, and User C 11 that User A 1 is now available on the network. Alternatively, in step 0550, User A's 1 identity is not verified. trusted servers 3 will not allow software client 6 to proceed further. Step 0599 is the end of the logon process.

Logoff (0600-0799)

There are two ways to logoff or disconnect from the network. The two ways are:
  Logoff gracefully—when the user can exit the program using a series of predefined steps.
  Logoff suddenly—when the connection was terminated abruptly.

Each of those steps is described in this section.

Logoff Gracefully 0600-0699

Figure 11:
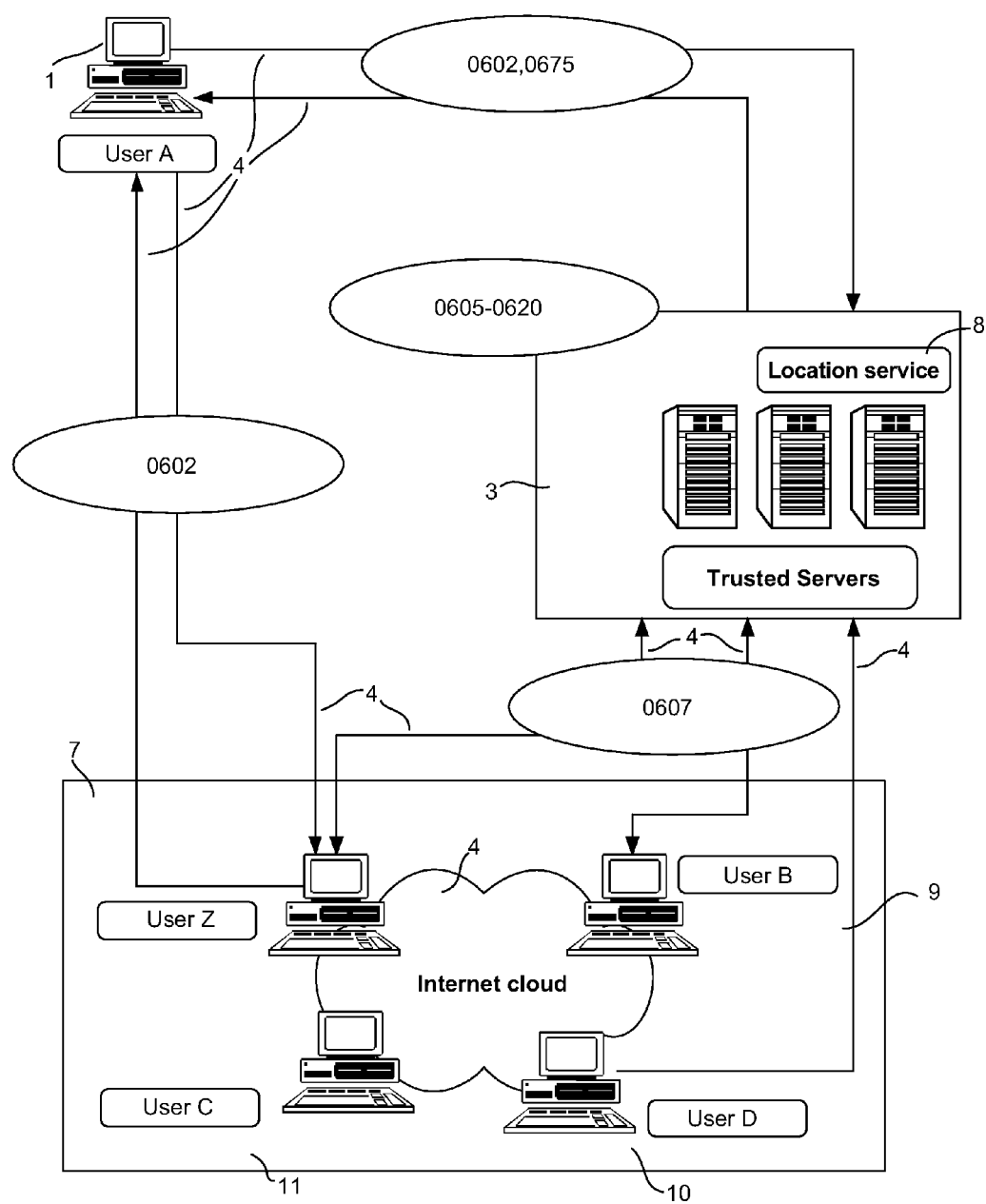
FIG. 11 is a process diagram describing the process to logon to the network.
Figure 12:
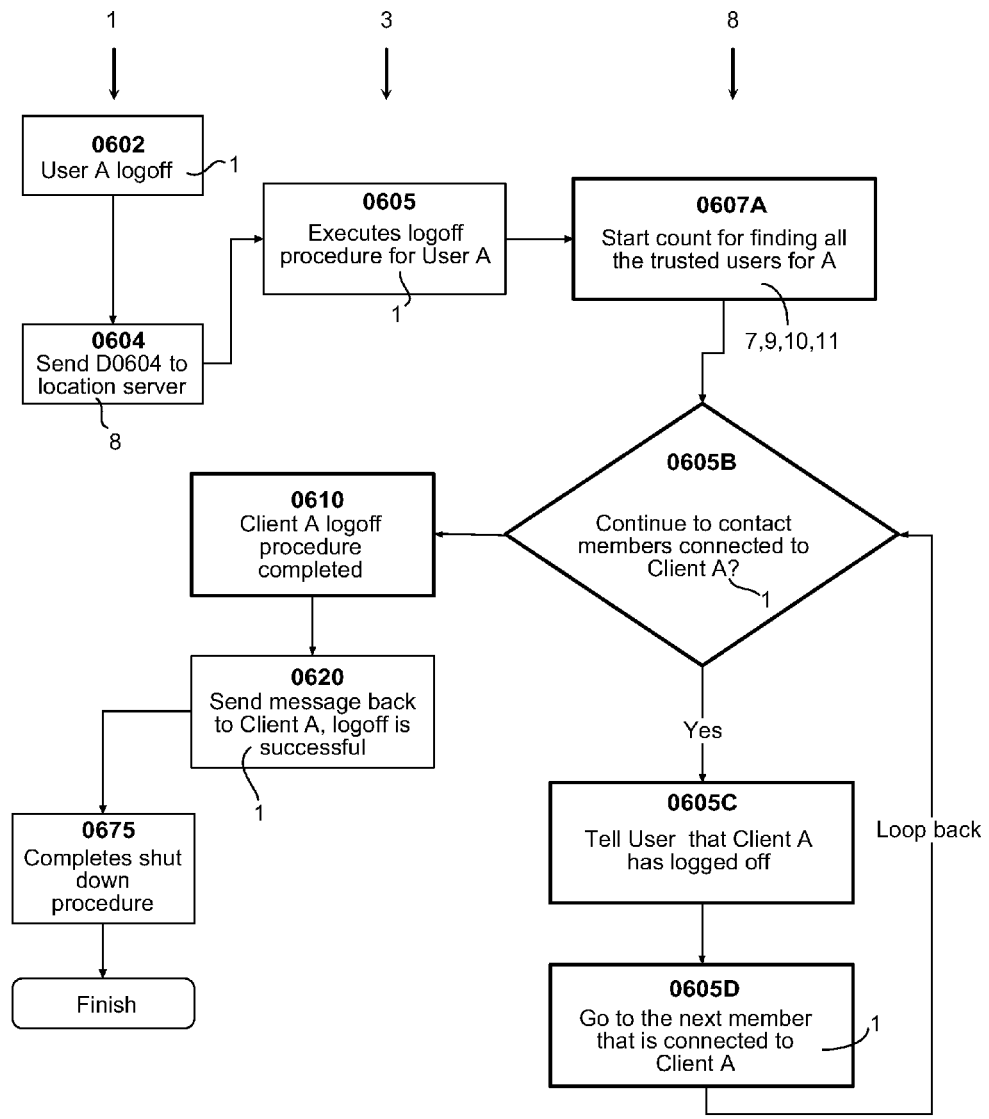
FIG. 12 is a flow chart describing the situation where the client logoff from the network gracefully.

The process details to logoff from the network gracefully are summarized in FIG. 11. The details of the process are given in steps 0600-0699 and a flow diagram given in FIG. 12. The graceful logoff process begins at step 0602 where User A 1 decides to logoff from the network and follows the standard logoff procedure. In this discussion, the logoff procedure includes but is not limited to suspending all activities and saving all key configurations. In step 0604, User A 1 uses the software client 6 to send a command to logoff from the network (D0604) to the trusted servers 3. In step 0605, the trusted servers 3 execute the logoff procedure for User A 1. The trusted servers 3 also inform the Location Server 8 that User A 1 is logging off. In step 0607, the Location Server 8 executes procedures to inform all the trusted Users with n=0 connected to User A 1 that User A 1 will be unavailable. For example, User Z 7 will be informed that User A 1 is no longer available. In step 0610, the Location Server 8 sends message to the trusted servers 3 that User A's 1 logoff procedure is completed. In step 0620, the trusted servers 3 send message to the software client of User A 1 that it is allowed to shut down. In step 0675, the software client of User A 1 completes the shutdown routine.

Logoff Suddenly 0700-0799

Figure 13:
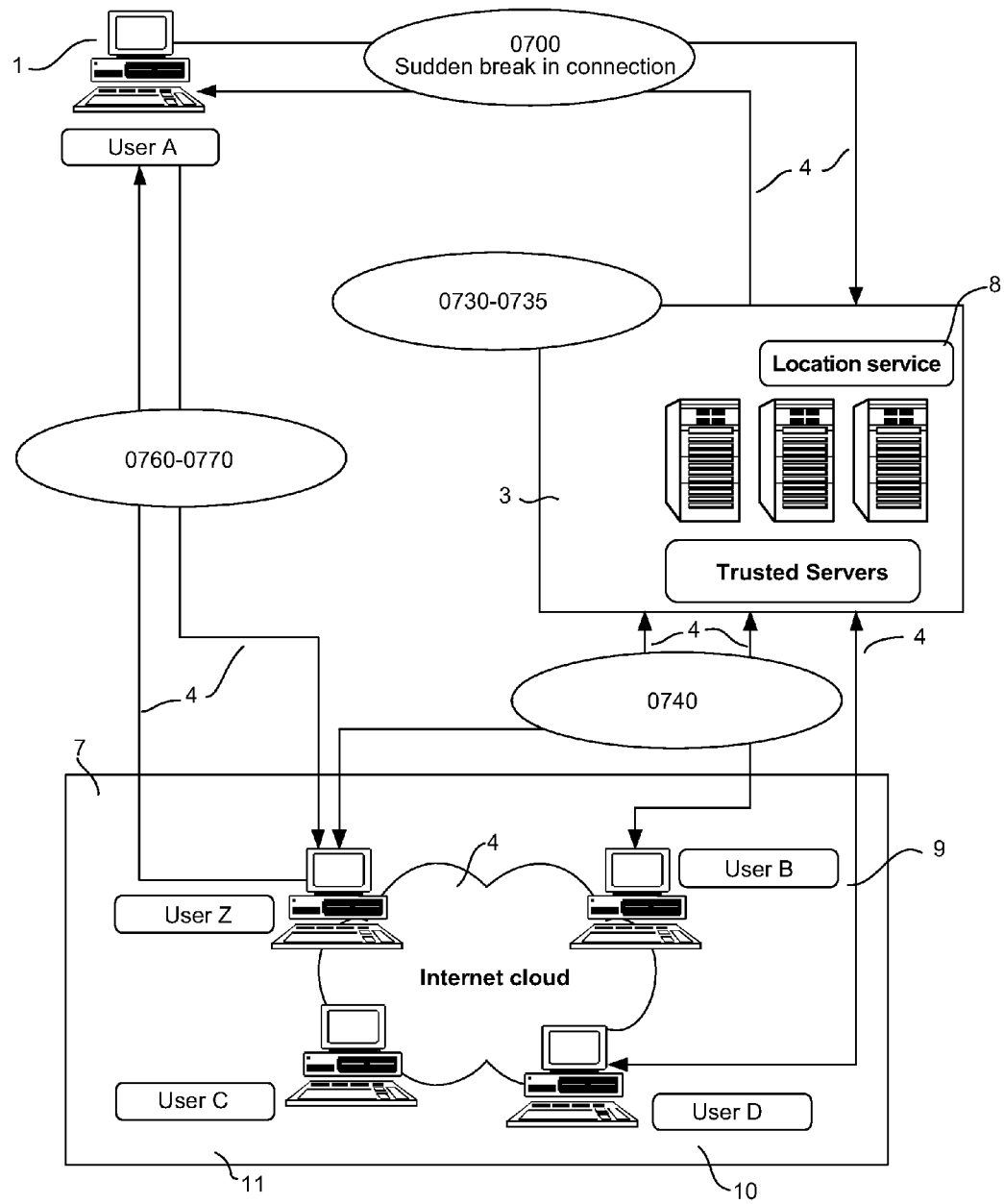
FIG. 13 is a process diagram describing the situation where the client logoff from the network suddenly.
Figure 14:
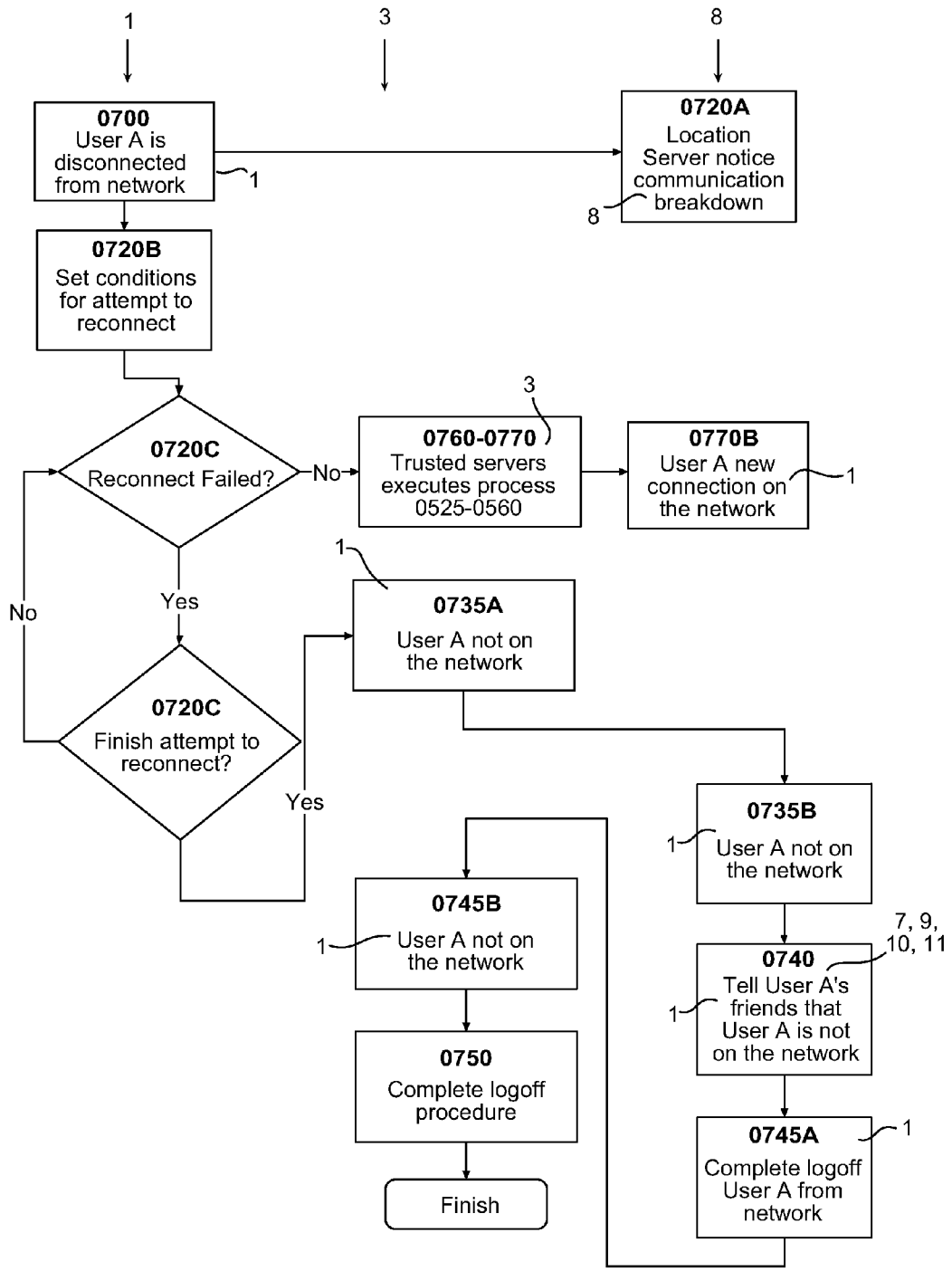
FIG. 14 is a flowchart describing the situation of sudden client logoff from the network.

The process details for when a client suddenly logoff from the network is summarized in steps 0700-0799. A process diagram for those steps is given in FIG. 13 and the corresponding flow diagram for this process given in FIG. 14. In step 0700, User A 1 is suddenly disconnected from the trusted servers 3 (i.e. the connection point between the location server 8 and the software client 6 is severed, for example, due to an equipment or power failure). In step 0720, User A 1 attempts to reconnect to the trusted servers 3. The number of attempts is defined by a set condition, such as a finite number of attempts or a defined period. In step 0730, the attempt to contact fails. At this point, in step 0735, User A 1 executes logoff procedure. In step 0740, the Location Server 8 executes procedures to inform all the trusted users connected to User A 7, 9, 10, 11 that User A 1 will be unavailable. In step 0745, the Location Server 8 sends message to trusted servers 3 that User A's 1 logoff procedure has been completed. As a result, in step 0750, the trusted servers 3 note that User A 1 is not on the network. Alternatively, in step 0760, User A 1's attempt to re-connect with the trusted servers 3 succeeds. In step 0765, the trusted servers 3 note the new connection point for the User and, in step 0770 starts process 0525-0560 to inform User A 1's trusted users 7, 9, 10, 11 that User A 1 is again available. Step 0799 is the end of the sudden logoff process.

Searching 4000-4999

There are three ways of searching or discovering resources through the network. The processes are defined as:
  Query through trusted clients including identification information
  Query using relays
  Query through the trusted servers All three processes have their advantages and disadvantage and are not mutually exclusive, that is, they can be used in conjunction with each other to search the network. The novelty of this searching mechanism is that the search is carried over a trusted social network. The implicit assumption is that the social relationship provides a predefined domain that is better suited to answer the query.

Searching Through Trusted Clients Including Identification Information 4000-4099

Figure 15:
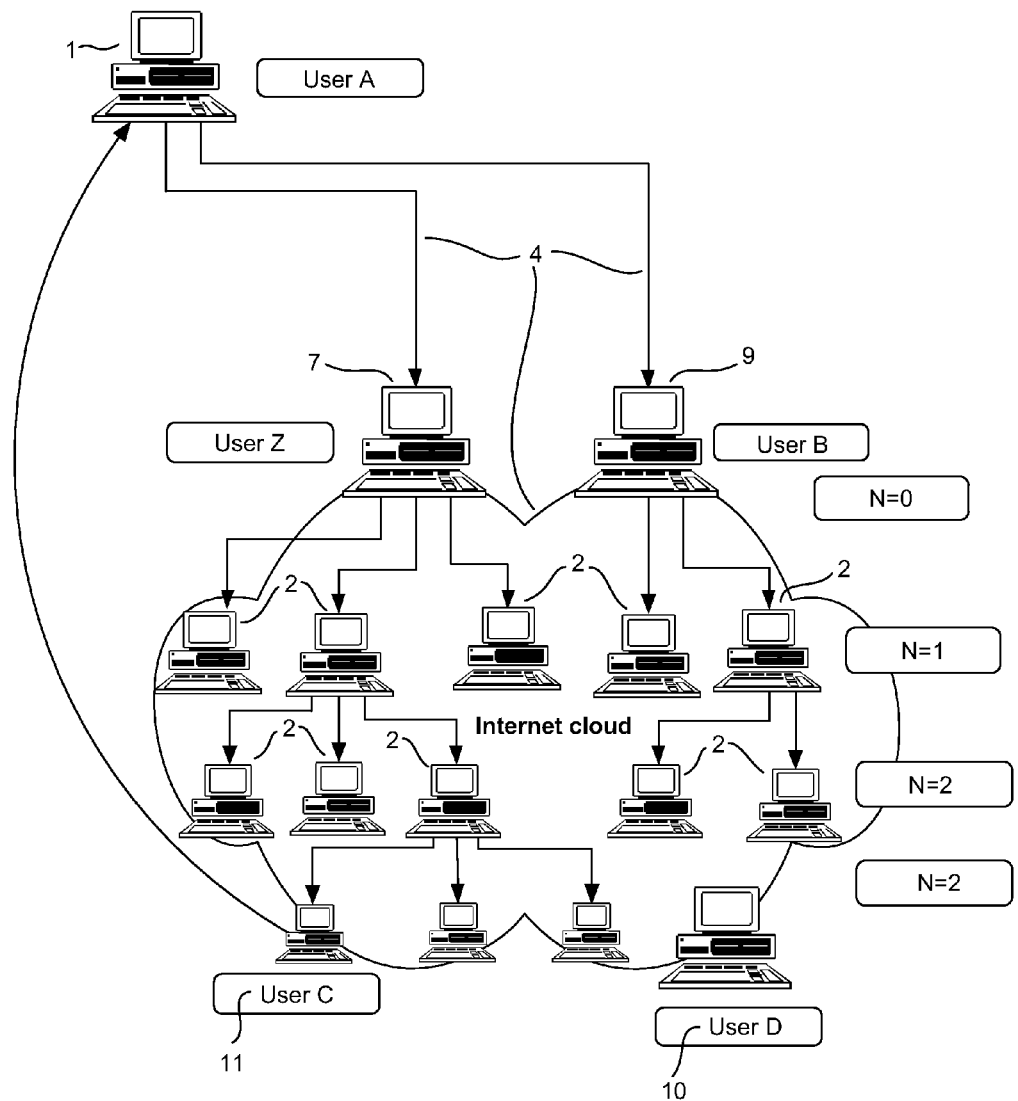
FIG. 15 is a process diagram describing searching through other trusted clients with information passing directly back to the initiator.
Figure 16:
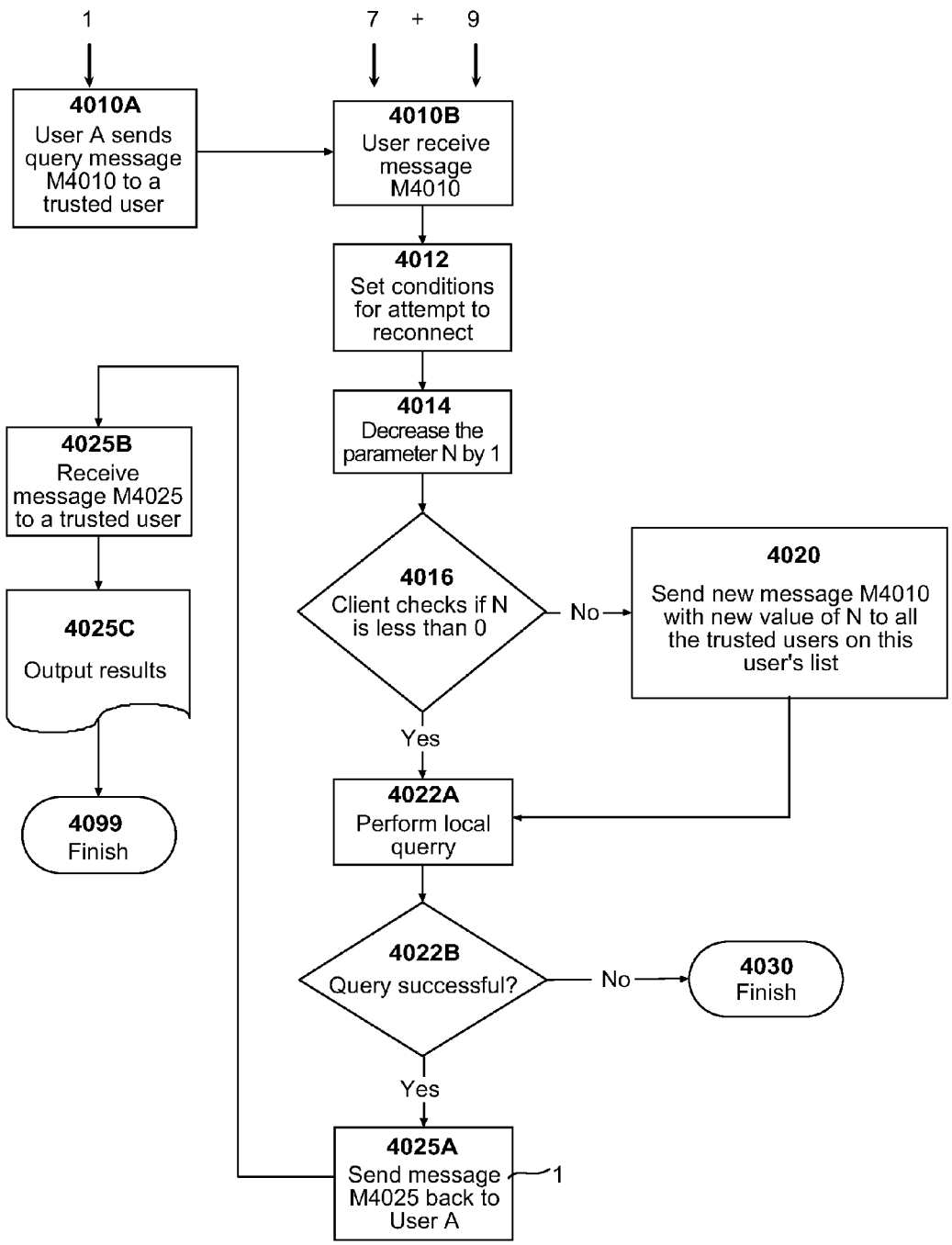
FIG. 16 is a flow-chart diagram describing the process of searching through other trusted clients with information passing directly back to the initiator.

In this case, the search is carried out on the trusted social network with the user identification being transmitted along with the query. The process details for searching through trusted clients are summarized in steps 4000-4099. The process diagram is given in FIG. 15 and the corresponding flow chart is given in FIG. 16. FIG. 15 is an example of a search carried out thorough three degrees of separation (N=3). User A 1 initially sends out a query to search through N=3 on the network. User A 1 therefore is known as the initiator of the query. For this case, the query is sent to User Z 7 and User B 9. They in turn, send the query from User A 1 to their list of trusted users. From the perspective of User A 1, the search depth has now increased by one level and the search is now defined as a search of one degree of separation (N=1). This search continues through all the trusted users of User A 1's network until the depth of N=3 is reached. In each case, the local machine 2 of each user is searched to see if the objective of the query can be satisfied. For this example, User C 11, who is N=3 levels away from User A 1, can answer the query and there can reply directly to User A 1, the initiator. In this example, User D 10 who is authorized to be on the network but bears no social relationship to User A 1, will not be queried. This example clearly shows the novelty of such searches on a social network. With reference to FIG. 16, In step 4010, User A 1 sends a message (M4010) containing a search query, the degree of separation (N) and identification information to each of the trusted users on the network. User A 1 is known as the initiator of the query. The search query can be, but not limited to, text string, file descriptors, commands or instructions. In step 4012, the message is sent to one of the trusted users on A, for example User Z 7. In step 4014, User Z 7's software client decreases the parameter N by 1, then, in step 4016, it checks to see if N is less then 0 then go to step 4022, performing a query of the system of User Z 7. Then, in step 4020, the client of User Z 7 sends a new message with the initial query and the new value of N to the trusted users defined by User Z 7. These steps generate a recursive process that will search through all the clients related to User A 1 by N degrees of separation. In step 4025, the query is successful send message M4025 to the original queror. In this case, User C 9 sends back a message to User A 1. Message M4025 includes, but is not limited to, the location and availability of the object and the parameter N. Alternatively, in step 4030, the query is unsuccessful and the search ends on that particular machine. In either case, step 4099 is the end search.

Query Using Relays 4100-4250

Figure 17:
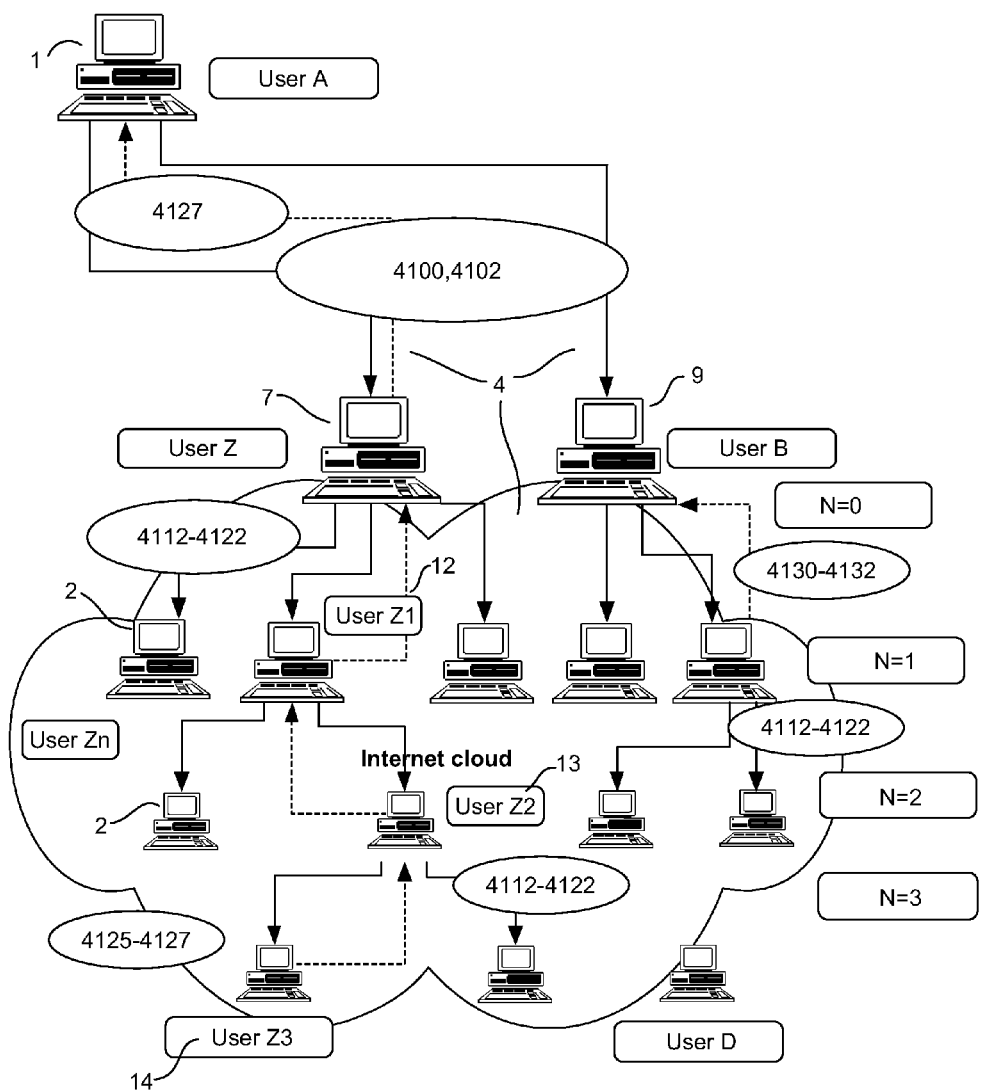
FIG. 17 is a process diagram describing the process of searching through other trusted clients with some degree of privacy

There are situations when the user wants to remain known only to those the User trusts. In this case, the identification information should not be passed on through the trusted network. The result can be passed back through each trusted User. The process details for searching through the location server are summarized in steps 4100-4250. The process diagram is given in FIG. 17 and a flow chart is given in FIG. 18. In FIG. 17, User A 1, the initiator of the query, performs a search that is defined for three degrees of separation (N=3). In this case, User A 1 sends the query to two trusted users, User Z 7 and User B 9. Both User Z 7 and B 9 keep an internal record of the query and then pass on the query to the trusted users on their list. For example, User Z 7 passes the query to Z1 12 and Zn 2. This process continues until the degree of separation of three (N=3) is reached. In each case, the User performs a search on their own local resources to see if they can satisfy the query and records the originator of the query. In this example, User Z3 14 is finally reached and a local search on Z3's 14 system indicates that Z3 14 has an answer. The answer to a query is passed back to the immediate user that submitted the query—in this case, User Z2 13. This process continues through the network until the initiator, in this case, User A 1, receives the answer. In this example, User Z3 14 passes the answer back to User Z2 13, who in turn passes the information back to Z1 12. Z1 12 passes back to Z 7 and finally Z 7 responds to User A 1.

Figure 18:
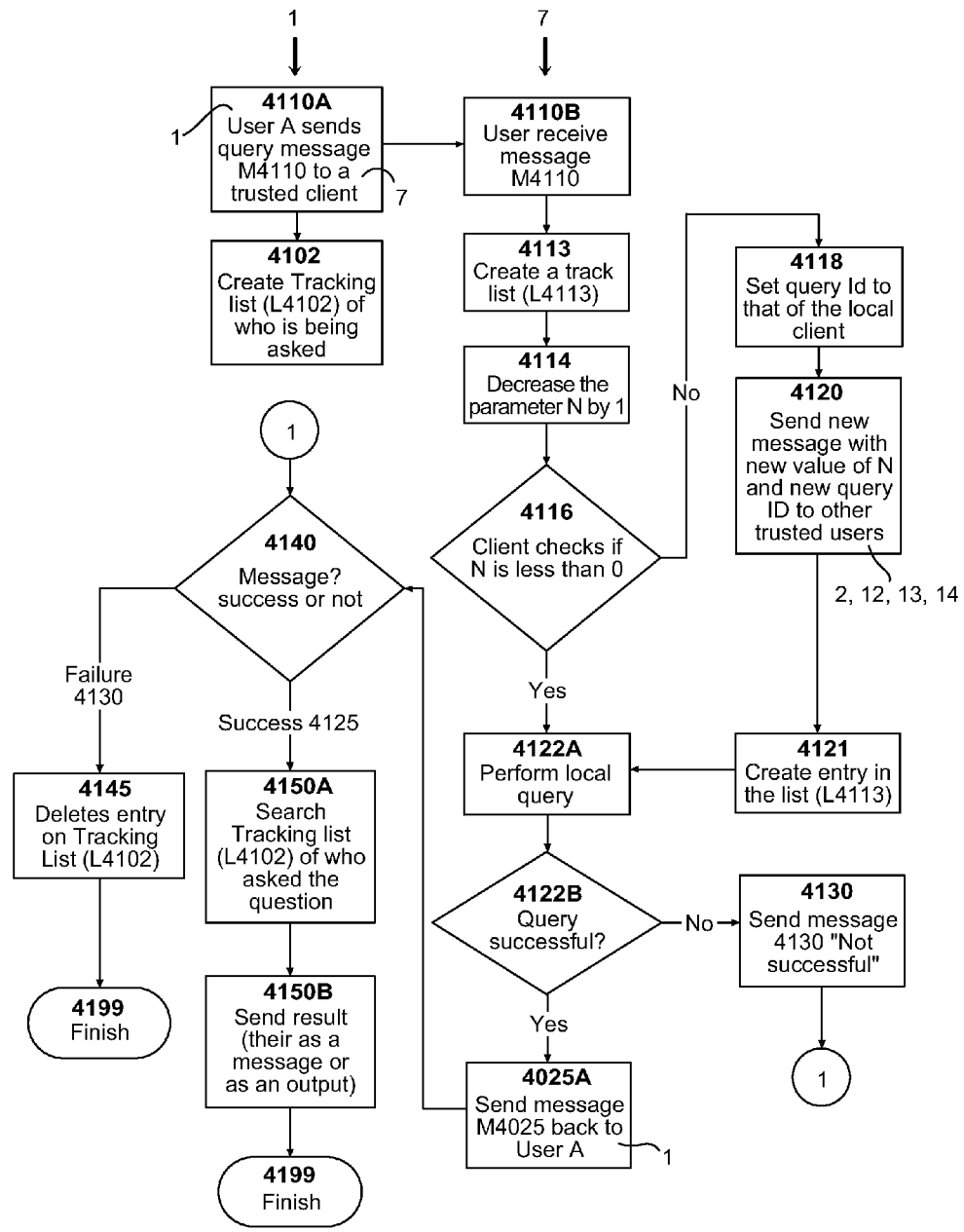
FIG. 18 is a flow chart describing the process of searching through trusted clients with some degree of privacy

In this method, only those that are directly related to the initiator know the information about the query. The local system for each User must maintain information on who requested the information and who has answered the query. With reference to FIG. 18, in step 4100, User A 1 sends a message (M4010) containing a search query, the degree of separation (N) to each of the trusted users on the network and query identification information. The search query can be, but is not limited to, a text string, file descriptors, commands or instructions. For the purposes of this example, degree of separation (N) defines the number of extended friends that are to be queried. The query identification information includes but is not limited to a unique identifier of a query, the originator of the query and the recipient of the query. In this case, User A 1's question Q1 is sent to User Z 7. In step 4102, the software client creates a tracking list (L4101) of trusted users that were asked the question. For example, User Z 7 and User B 9 were asked the question Q1. In step 4113, on one of the trusted users of A, for example User Z 7, the software client creates a list to track the trusted users (L4113) that are searched to respond to a query. For example, all the trusted Users for Z 2, 12, 13, 14 that are queried about Q1 from User A 1. In step 4114, the software client decreases the parameter N by 1. In step 4016, the software client checks if N is less than 0. If N is greater than 0 then the software client proceeds to step 4122, below and, in step 4018 sets the query identification to be that of the local client. In this case, the new query identification is now User Z 7 and Q1. In step 4020, the software client sends a new message from User Z 7, with the new query identification information and the new value of N to each trusted users as defined by User Z 7. For example, a search message to User Z1 12 and a search message to User Zn 2. In step 4021, the software client creates an entry on the list (L4113) for each query sent to each particular trusted User of Z 7. If, in step 4016 above, N is less than 0 then the software client does not forward the query on to further trusted users. This series of steps generates a recursive process that will search through all the clients related to User A 1 by N degrees of separation. Once the above chain of steps is completed the software client moves on to step 4122 and performs the query on the local system .... If the query is successful the software client moves to step 4125 and sends a message (M4125) to the trusted User that requested the information based on the query identification information. For example, User Z3 14 sends message M4125 back to User Z2 13 that the search was successful. Message M 4125 includes but is not limited, to the location and availability of the object that is separated by N=0. If the query is unsuccessful on the local machine, the software client sends a message (M4130) back to the contact as specified in the query identification information. Message M4130 should indicate at a minimum "Not successful". In step 4140, the software client of the user that initiated the request checks to see if the message is 4125 (successful query) or 4130 (unsuccessful query). In step 4145, a software client that receives the message 4130 deletes this entry from the tracking List L4113. In step 4150, the software client that receives message 4125 (successful query) searches on list L4113 to see who made the query and sends a response back to this initiator on the success of this query. This information is relayed from one trusted user to another until the original initiator of the query is contacted. As outlined in the process diagram, User Z3 14 can satisfy User A 1's query. User Z3 14 sends an affirmative message back to Z2 13. Z2 13 searches on his list L4113 to see that Z1 12 made the query. Z2 13 then informs Z1 12 that Z2 13 has an answer. This process continues until User Z 7 informs User A 1 that an answer to the query is available. At this point User A 1 can access the information on User Z3's 14 system using the process described elsewhere in this specification.

Searching Through Location Server 4300-4399

Figure 19:
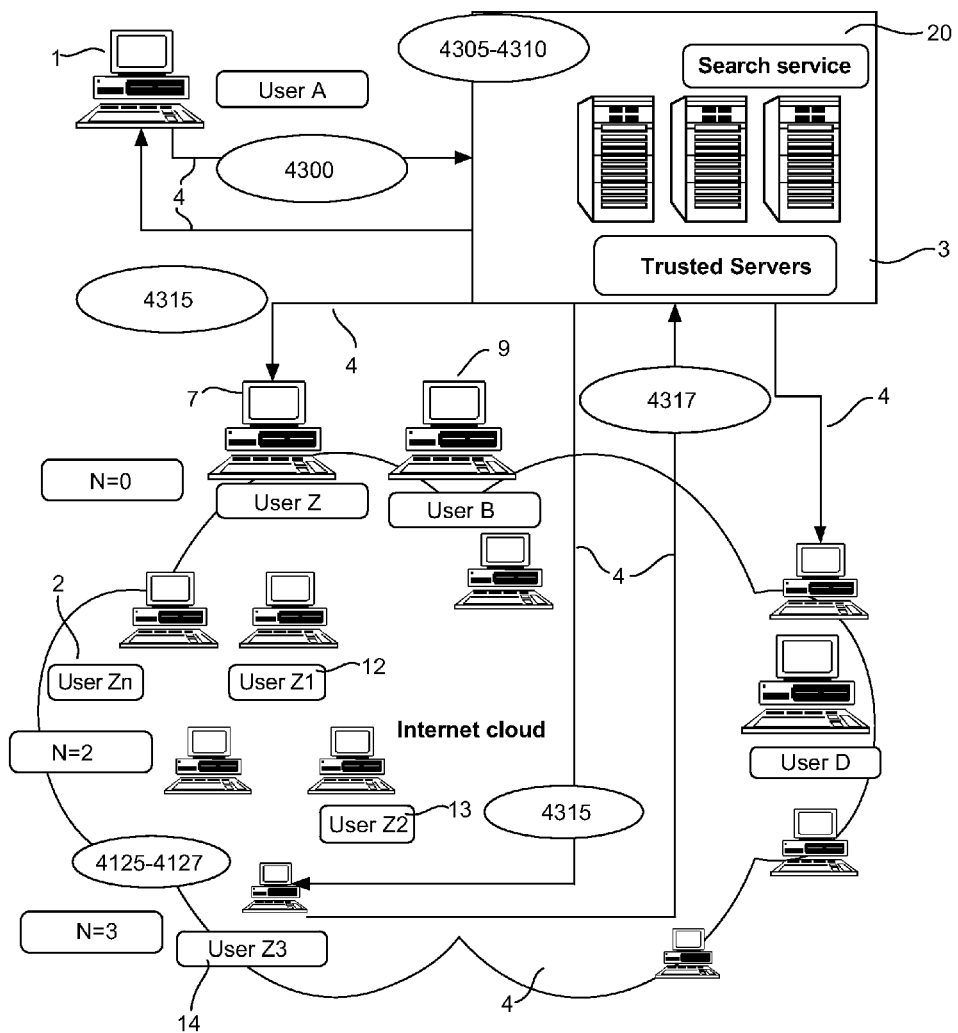
FIG. 19 is a process diagram describing the process of searching through the trusted servers 3s.
Figure 20:
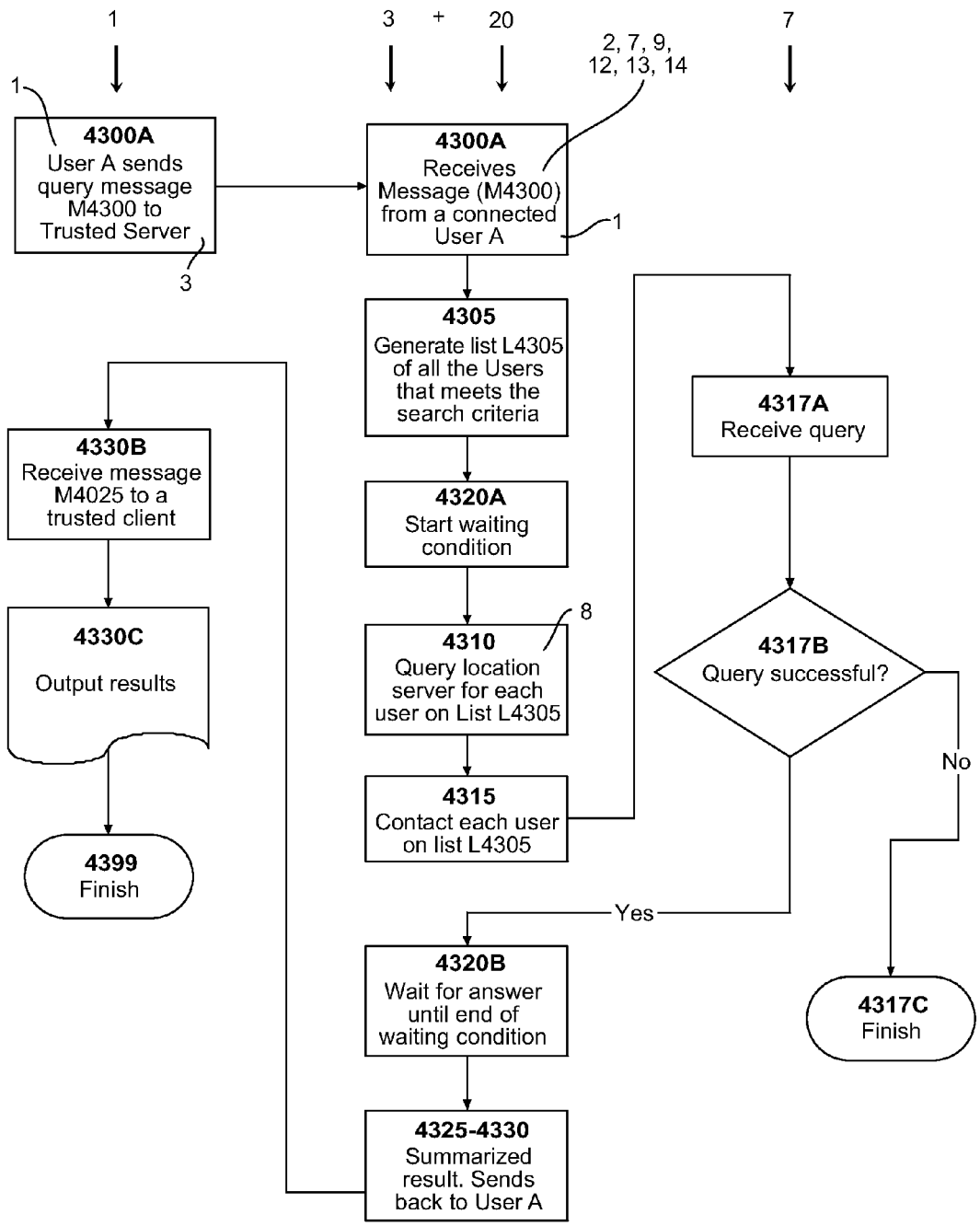
FIG. 20 is a flow chart describing the process of searching through trusted servers 3s.

The search process can also be carried out through the use of a search service that can be a part of the trusted servers. The search service in this case will be used to generate the list of users that needs to be contacted, contact each user with the query, summarize the response and send this response back to the originator of the query. The process details for searching through the location server are summarized in steps 4300-4399. The process diagram is given in FIG. 19 and a flow chart is given in FIG. 20. In step 4300, User A 1 sends a message (M4300) containing a search query, the degree of separation (N) to the trusted servers 3. Again, the search query can be, but is not limited to, text string, file descriptors, commands or instructions. In step 4305, the search service 20 on the trusted servers 3 receives a message M4300. The search service 20 then generates a list (L4305) of all the trusted clients that can be reached by User A 1 based on N. In step 4310 the search service queries the location server for the connection point for each of the trusted users on list L4305. Then, in step 4315, the search server 20 contacts each of the trusted users on list L4305 2, 7, 9, 12, 13, 14 and sends them a query based on message M4500. In step 4317, the software clients of the users on list L4305 receive the query and search the local machine. If query is successful, the software client sends back a message to the trusted servers 3. This message includes at the minimum the answer to the query. In step 4320, the search service waits for a set condition to make sure that all contacted users have an opportunity to reply. In step 4325, the search service summarizes the results, which include at the minimum the answer to the query. In step 4330, the search service sends the results back to User A 1.

Services and Applications Over the Trusted Network (5000-5599)

There are three ways in which actions and applications can be carried out over the trusted network. The three ways are
Direct connection
Connection through a trusted proxy
Delivery though relays
Example of actions and applications are, for example,
Electronic resource sharing
Communication
Data exchange
Service sharing The implementation details will be described in the following sections. More specific examples of actions and applications are described in the embodiments of this patent.

Direct Connections (5000-5200)

Figure 21:
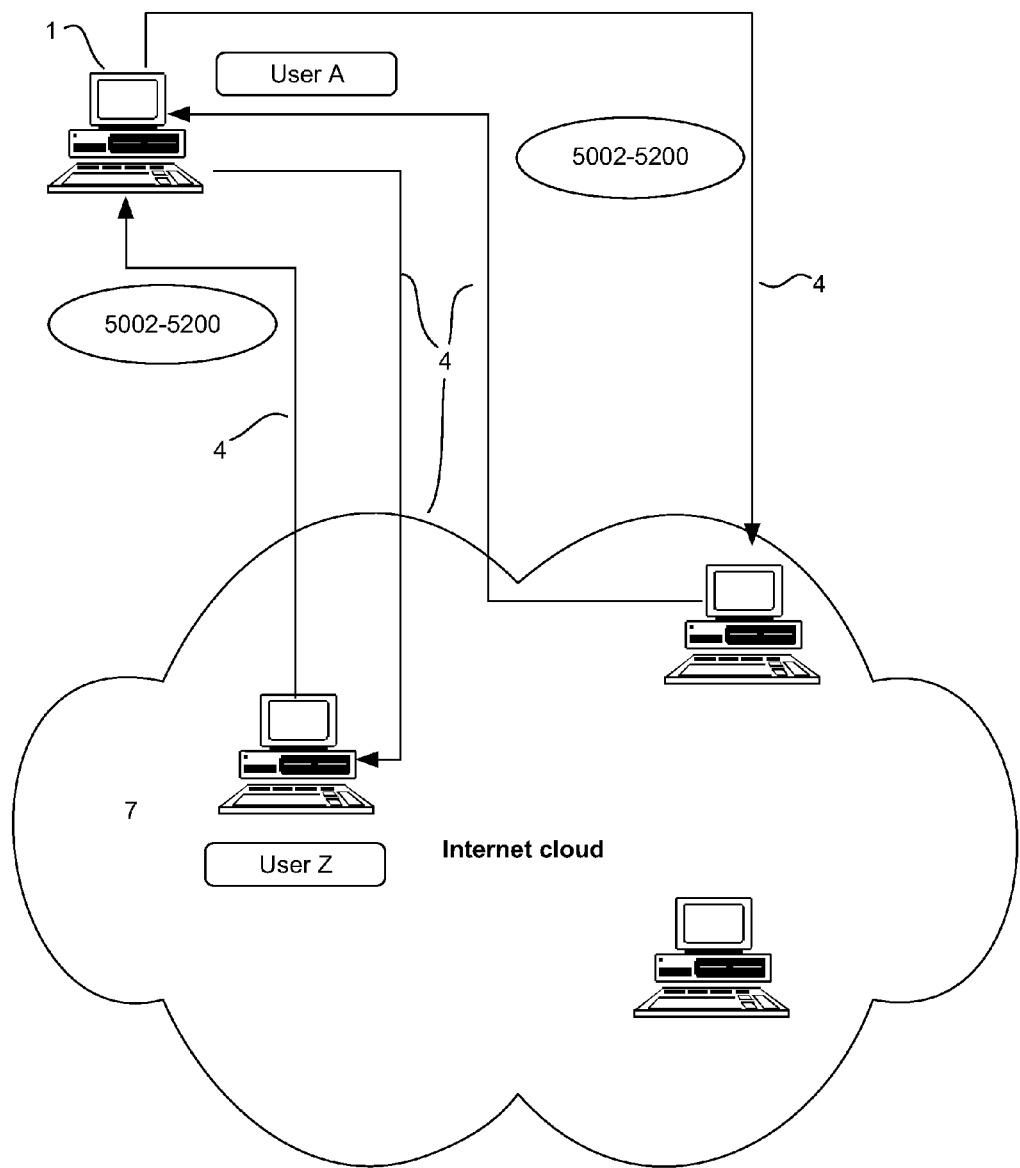
FIG. 21 is a process diagram describing the process of transfer/exchange/communication through the network.
Figure 22:
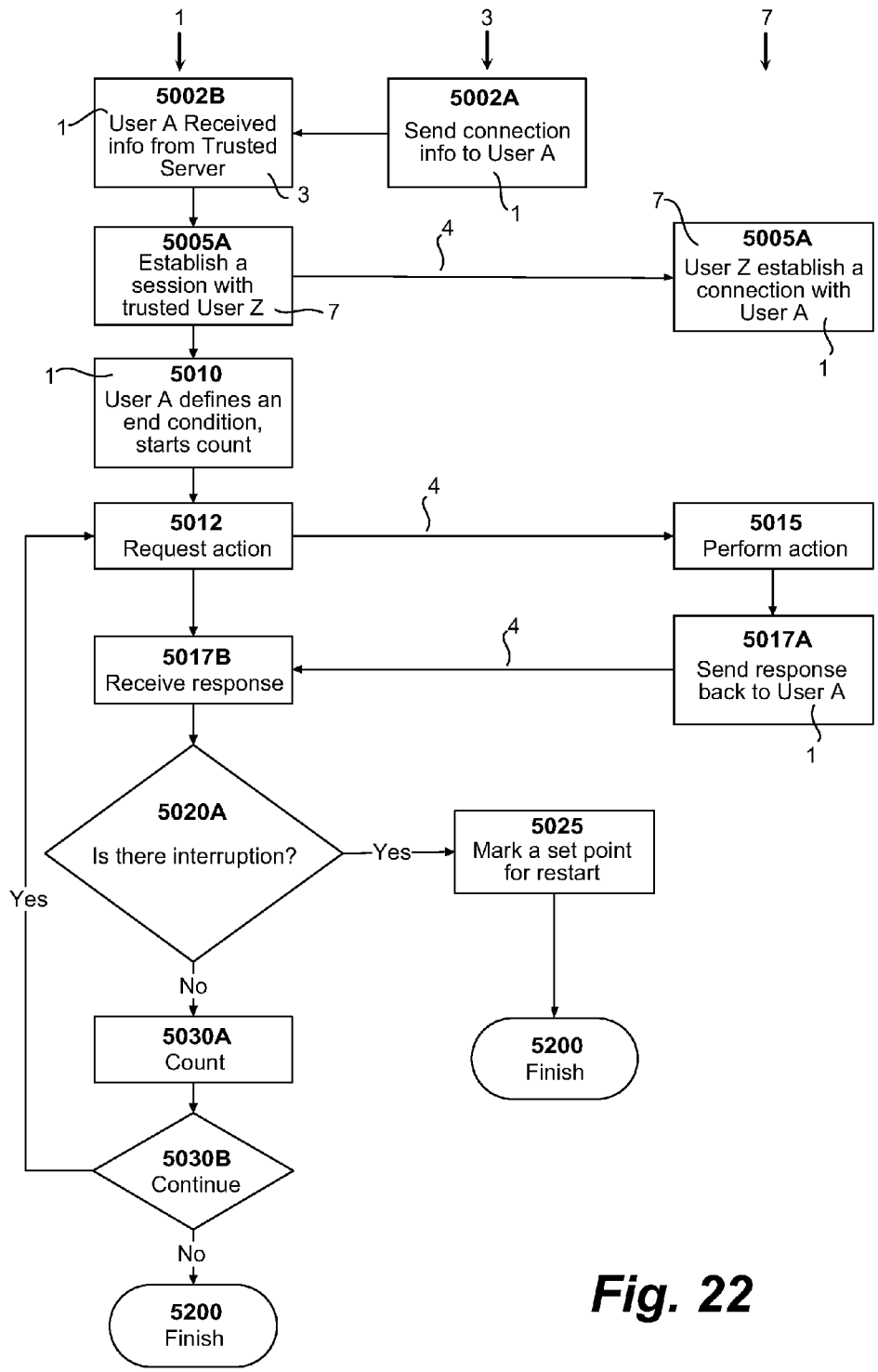
FIG. 22 is a flow chart describing the process of transfer/exchange/communication through the network.

Direct connections can be established through the Login process (0500-0599). Through the Searching process (4000-4999) a user can be connected directly to another trusted user on the network. In this case, any actions and applications can be carried out directly between the two users. FIG. 21 is a process diagram illustrating this connection and FIG. 22 is the corresponding flow chart detailing the steps required in this process. In FIG. 21, User A 1 is directly connected to User Z 7 and therefore can exchange services. With reference to FIG. 22, the details of the process are described as follows. In step 5002, User A 1 establishes a link with User Z 7 based on information supplied by trusted servers 3. Users A 1 and Z 7 must be within the same network and have defined N such that they both fall within N for each other. In step 5005 a session is established that connects the two users. In step 5010 User A 1 defines an end condition and starts a count for the end condition. The end condition can be a time for the connection to last or be defined by the time to complete a file transfer, etc. In step 5012, User A 1 sends a request to User Z 7. In step 5015, the software client on User Z's 7 computing device performs the action requested by User A 1. In step 5017, User Z 7 sends a response back to User A 1. In step 5020, if there is an interruption, such as a sudden disconnection caused by a power failure, the software client on User A 1's computing device, in step 5025 creates a set point, which can be used to restart action on reconnection. In step 5030, the software client of User Z 7, continues the action requested by User A 1 until end point is reached. In step 5200, the end condition is satisfied and the session is ended.

Connection Through a Trusted Proxy (5200-5399)

Figure 23:
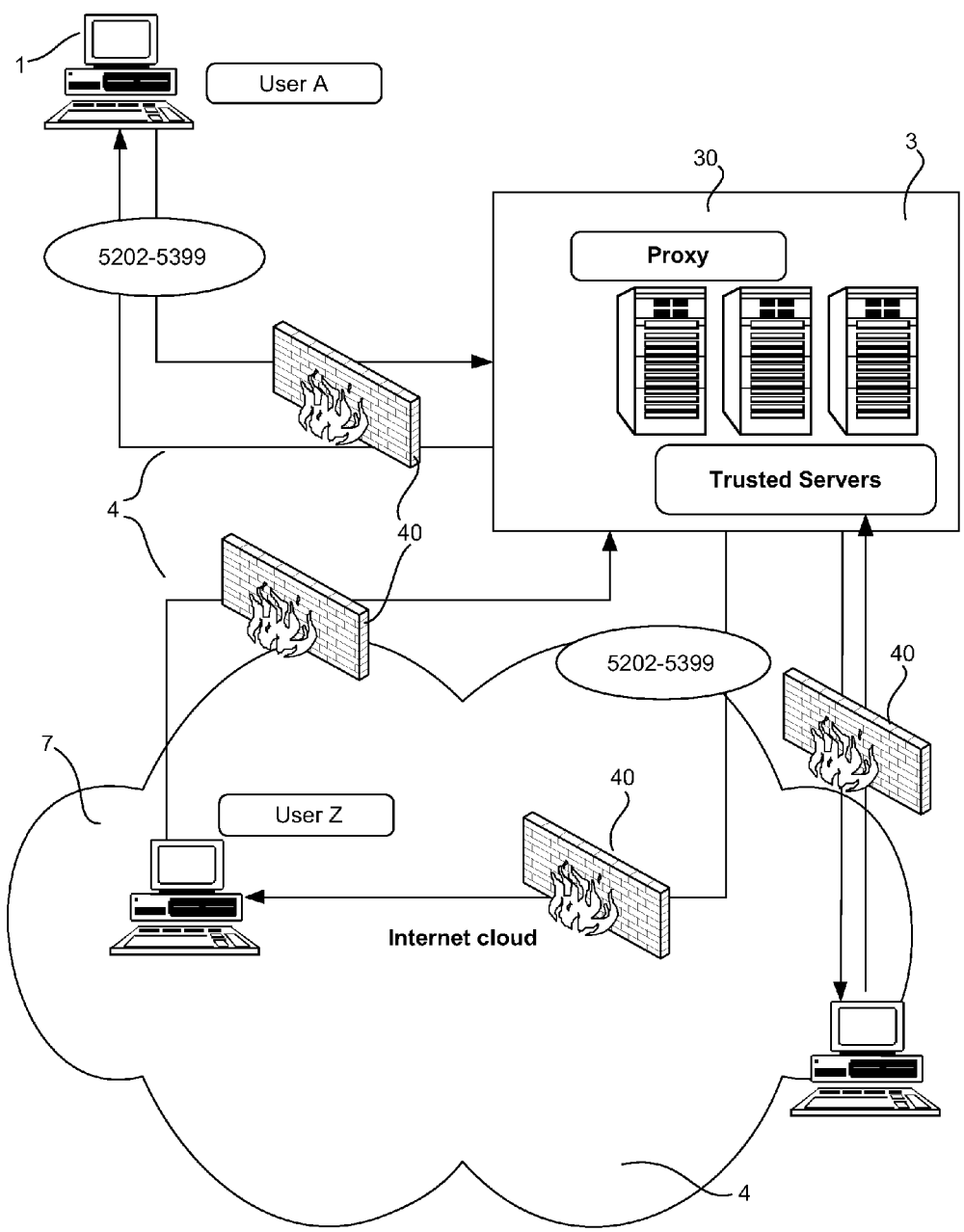
FIG. 23 is a process diagram describing the process of transfer/exchange/communication through the network.
Figure 24:
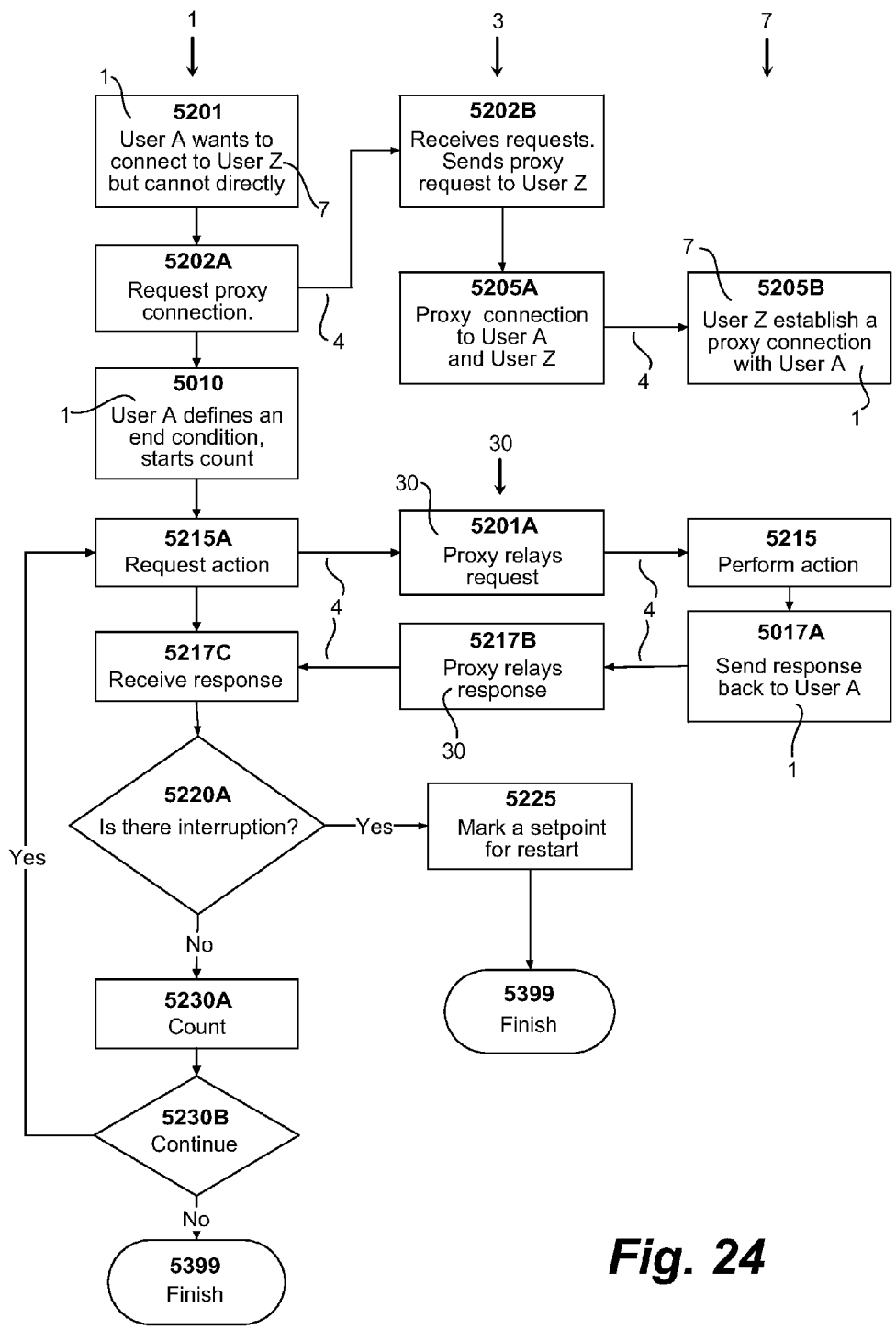
FIG. 24 is a flow chart describing the process of transfer/exchange/communication through the network.

In some cases, direct connections cannot be established between trusted users on the network due to the presence of a firewall or other protective measures available on a network. In this case, the user must first request a connection to a trusted proxy server before connecting to the other user. A proxy is a service that allows clients to make indirect network connections to other users. A User connects to the proxy server, and then requests a connection, file, or other resource available on another trusted user. The proxy provides the resource, possibly by connecting to the specified user, or by serving it from a cache. FIG. 23 is a process diagram illustrating this connection through a trusted proxy and FIG. 24 is the corresponding flow chart detailing the steps required. In FIG. 23, User A 1, who is behind a firewall 40, first connects to a proxy 30 and then requests a connection to User Z 7. The trusted servers 3 then direct User Z 7 to the appropriate proxy 30. The actions or operations can then be carried out through the proxy 30. The details of the process are described as follows. In step 5201, User A 1 performs a search as described in process 4000-4999 and receives the information that User Z 7 has the required service. In step 5202, User A 1 requests a proxy connection from the trusted servers 3 because User A 1 and User Z 7 cannot connect directly. In this example, a proxy 30 is a service that allows the software client to make indirect network connections to other users. User A 1 and User Z 7 must be related by N degree of separation. In step 5205, a session is established that connects the two users through the proxy 30. In step 5210 an end condition for the length of the session is defined. In step 5215 the requested action is performed by User Z 7 through the proxy 30. In step 5217, User Z 7 sends a response back to User A 1 via the proxy 30. Step 5220 governs the possibility of an interruption in the connection between Users A 1 and Z 7. If an interruption occurs, in step 5225 the software client of the initiator of the connection, in this case User A 1 creates a set point which can be used to restart action on reconnection. In step 5230, the action is continued until end condition is satisfied. In step 5399 the end condition is satisfied and the session is ended.

Delivery Through Relay (5400-5599)

Figure 25:
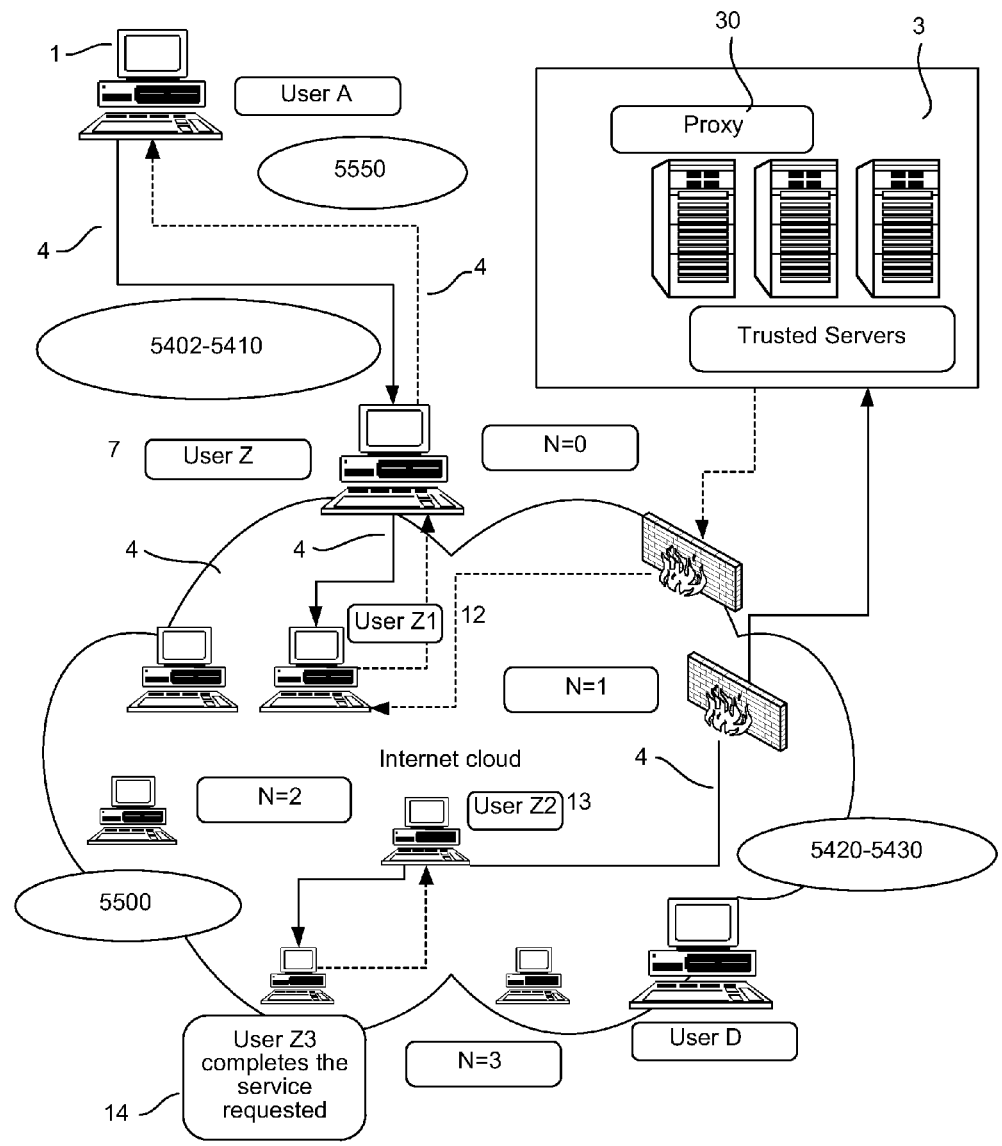
FIG. 25 is a process diagram describing the process of service delivery through relay.
Figure 26:
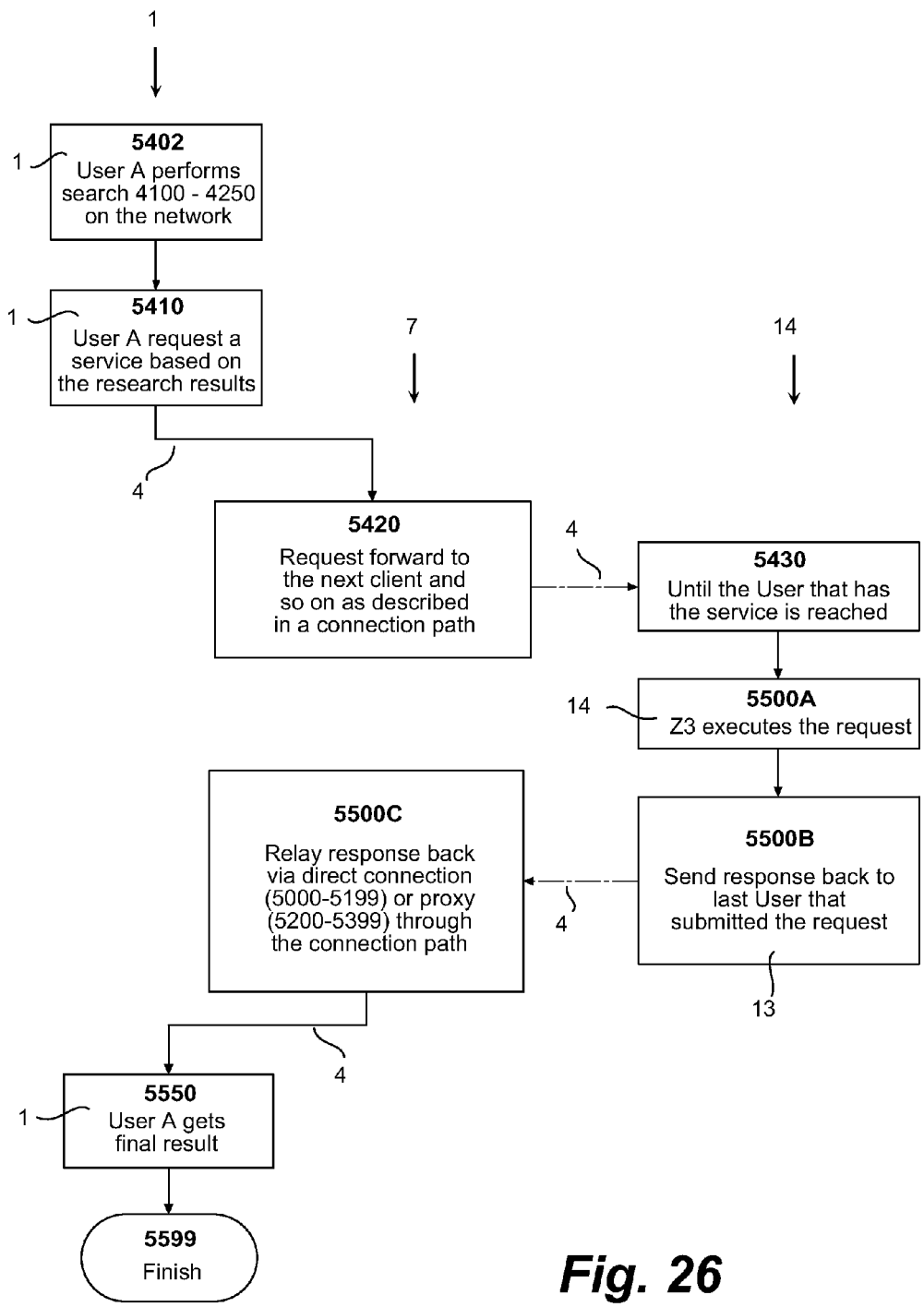
FIG. 26 is a flow chart describing the process of service delivery through relay.

In some cases, the user wants to remain known only to those the User trusts (i.e. users that are directly related to them i.e. N=0). Services and actions can still be delivered through a series of relays if the initial search and discovery for the services and action is performed using the search with some degree of privacy option (4100-4250). In which case, the application or service can be delivered based on the path developed by the search. The process diagram is given in FIG. 25 and a flow chart is given in FIG. 26. In FIG. 25, User Z3 14 has the service requested by User A 1. In order to deliver the service without known that User A 1 requests the service, User Z3 14 performs the service and delivers the result to the trusted User Z2 13. Z2 13 in turn delivers the result back to User Z1 12, and Z1 12 delivers it back to Z 7. Z 7 finally fulfils the request of User A 1. Based on this scenario, User A 1 only knows that those immediately related to him, that is User Z 7, has responded to the request. User A 1 does not need to know the User Z3 14 is the one that actually fulfils the request. The connection between any users can be a direct connection in which case the process details are described in steps 5000-5199 or connections via a proxy in which case the process details are described in steps 5200-5399. A detailed description of service delivery through relays is as follows. In step 5402, User A 1 performs a search as defined in steps 4100-4250 on the network. However, in this case the subject of the search requires a degree of privacy. In step 5410, User A 1 requests a service based on the results of the search. In step 5420, the service request is passed to each user in the connection path between the initiator and the User that has the resources being requested. The identity of the originator of the search is only known to the first user in the connection path with whom User A 1 has an N of 0, in this case User Z 7. In step 5430, the service request reaches the User that has the resources, in this example, Z3 14. In step 5500, Z3 14 executes the service request and delivers the result back to the next User in the connection path who relays it to the next User etc. until it reaches the originator, User A 1. The delivery of the result can be via a direct connection as described in steps 5000-5199 above or through a proxy connection as described in steps 5200-5399 above. In step 5550, the initiator of the query, User A 1, receives the results of the User Z 7.

Remote Access and Control of the Client (6000-6099)

Figure 27:
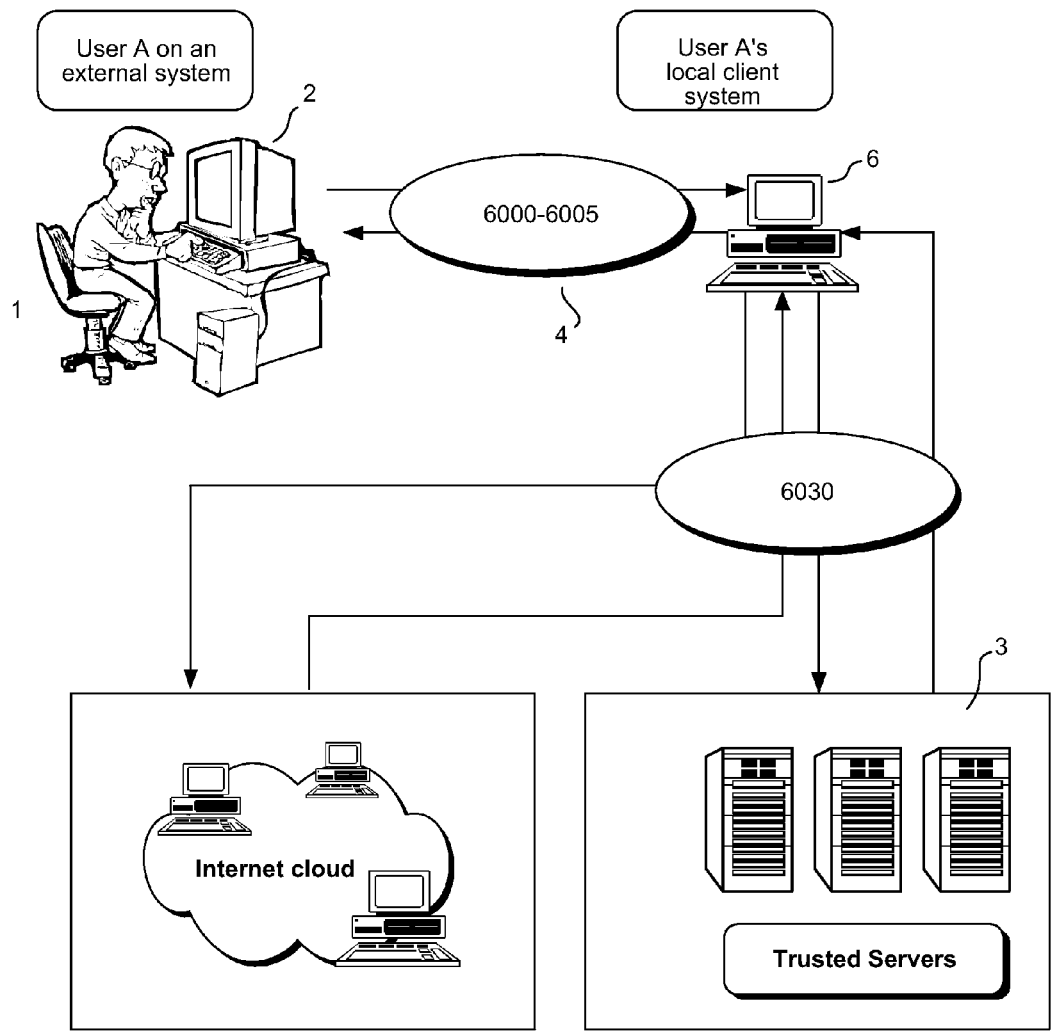
FIG. 27 is a process diagram describing the process of remote client access.
Figure 28:
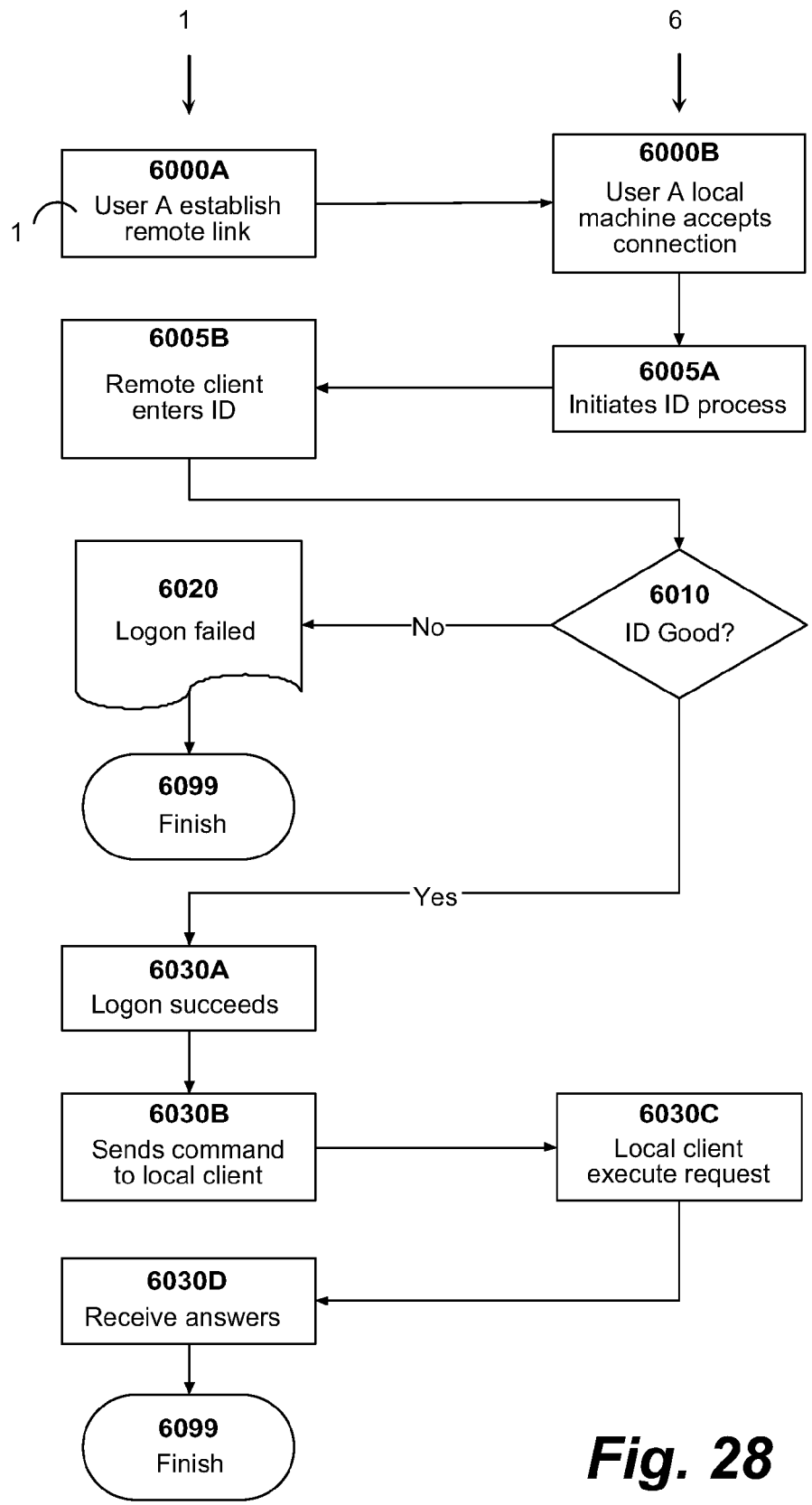
FIG. 28 is a flow chart describing the process of remote client access.

The services of the software client on a computing device can be accessed remotely if the proper communication, authentication and identification processes are built into the software client. The process diagram for remote access is given in FIG. 27 and the corresponding flowchart is given in FIG. 28. In FIG. 27, User A 1 remotely establishes a communication channel 4 with his software client 6. For example, via an http connection, and undergoes an identification and authentication process. Once authorized, User A 1 can then control the local services such as searching and service requests remotely. In step 6000, User A 1 establishes a link through a communications means 4 with the software client 6 from an external system 2 and establishes a communication session. In this case, communication means 2 is defined as a connection that allows for a transfer of information. For example, an http session using TCP/IP as the transport protocol. In step 6005, the software client 6 provides an authentication and identification process for the remote User A 1. In step 6010 the software client 6 reviews the identifying data provided by the remote User A 1. At this point, either, in step, 6020 authentication fails and the remote request will not be considered, or, in step 6030, the authentication succeeds and the remote request can continue until the session is terminated. In effect, the external system 2 can issue commands and receive replies through the communication link to the software client. In step 6099, User A 1 terminates the remote link and ends remote access.

The proposed network is not limited to the sharing of electronic resources such as electronic files but creates new work processes for the user. The following are provided for exemplification purposes only and are not intended to limit the scope of the invention described in broad terms above. All references cited in this disclosure are incorporated herein by reference. Each example applies the main claims of the patent, which are:

Authentication and authorization from trusted servers
Obtain service from a trusted entity
Establishing a user-to-user connection
Connecting within a defined social network
to solve a specific problem.

EXAMPLE 1

Sharing on a Trusted Social Network

The basic principle covered by this patent is the ability to create a secure and trusted user to user network so that users of this network can connect, communicate and transfer information or objects. There are no limitations to the type of objects and as an example; we describe in detail the transfer of generic files, digital photographs and digital videos over this network. In the last example, we describe the situation where the local client is controlled remotely and the same functions on the local clients can be activated.

EXAMPLE 1A

File Sharing on a Trusted Social Network

Figure 29:
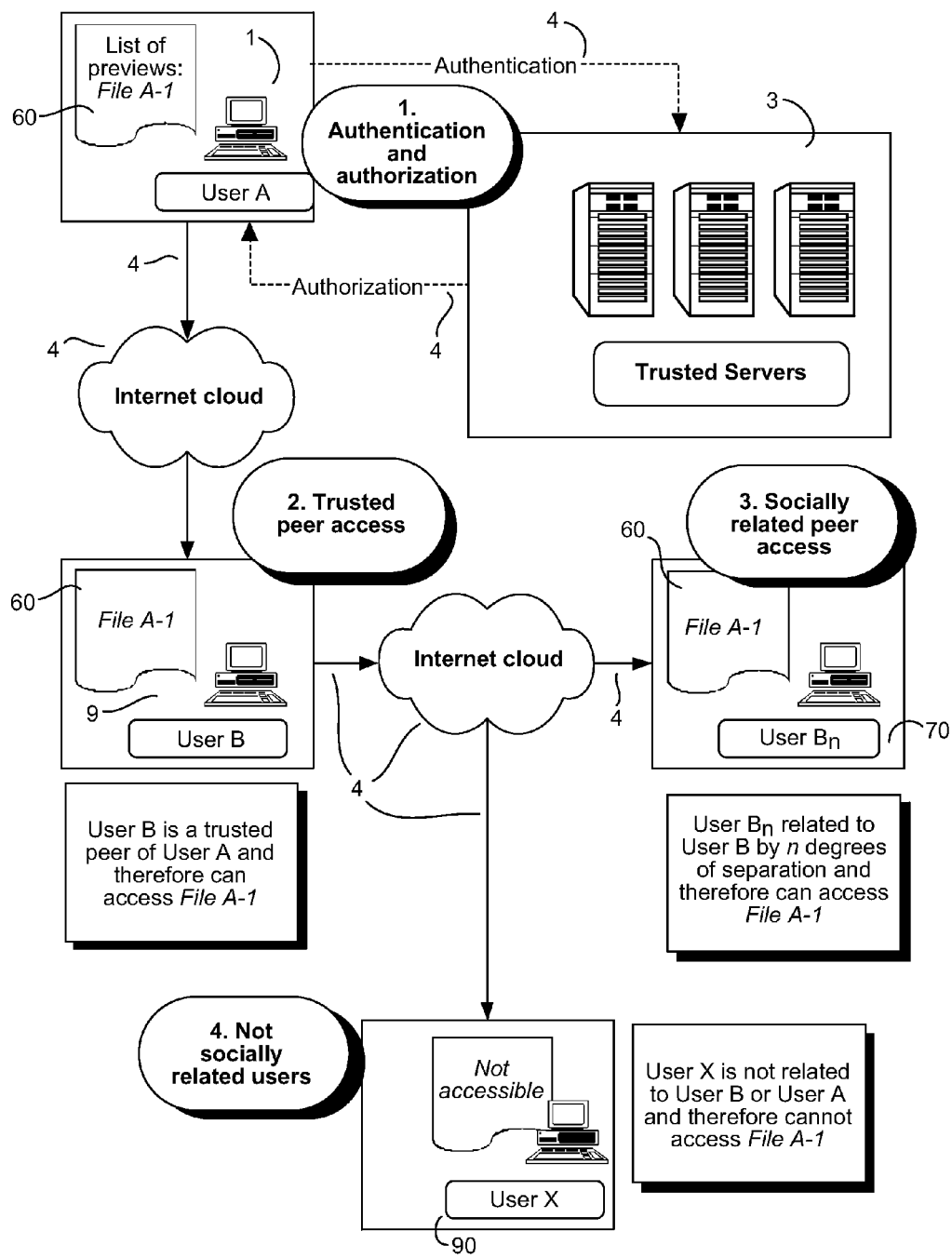
FIG. 29 is a process chart demonstrating an example of a file transfer through a trusted social network.

This example describes the process of file sharing on a trusted social network. FIG. 29 is a schematic illustrating an example of file transfer through a trusted social network. The detail implementation is covered by the claims of this patent. FIG. 29 illustrates the following steps:
1. Authentication and Authorization User A 1 has a list of files (File A-1 60) on a shared folder. User A 1 must first be identified and receive authorization from the trusted servers 3 in order to access the network.
2. Trusted user of User A 1 can access File A-1 A trusted user for A, in this case User B 9, who is already authorized to be on the system can now access File A-1 60.
3. Socially related users can access Any connected user that are related to User A 1 or User B 9, in this case, $B_n$ 70 ($_n$ representing the degree of separation from User B 9) can also access File A-1 60 depending on the permission first declared by User A 1. For example, A 1 can limit the degree of separation (n) for which the file can be accessed.
4. Non socially related users cannot access Users on the network that do not have a social connection to A or B, in this case User X 90, cannot have access to File A-1.

This example assumes that all users are connected to the Internet without limits on network access such as firewalls. The use of proxies on trusted servers is necessary when there are limits to network access. This scenario is discussed more fully elsewhere in the body of the patent.

EXAMPLE 1B

Photo Sharing on a Trusted Social Network

Figure 30:
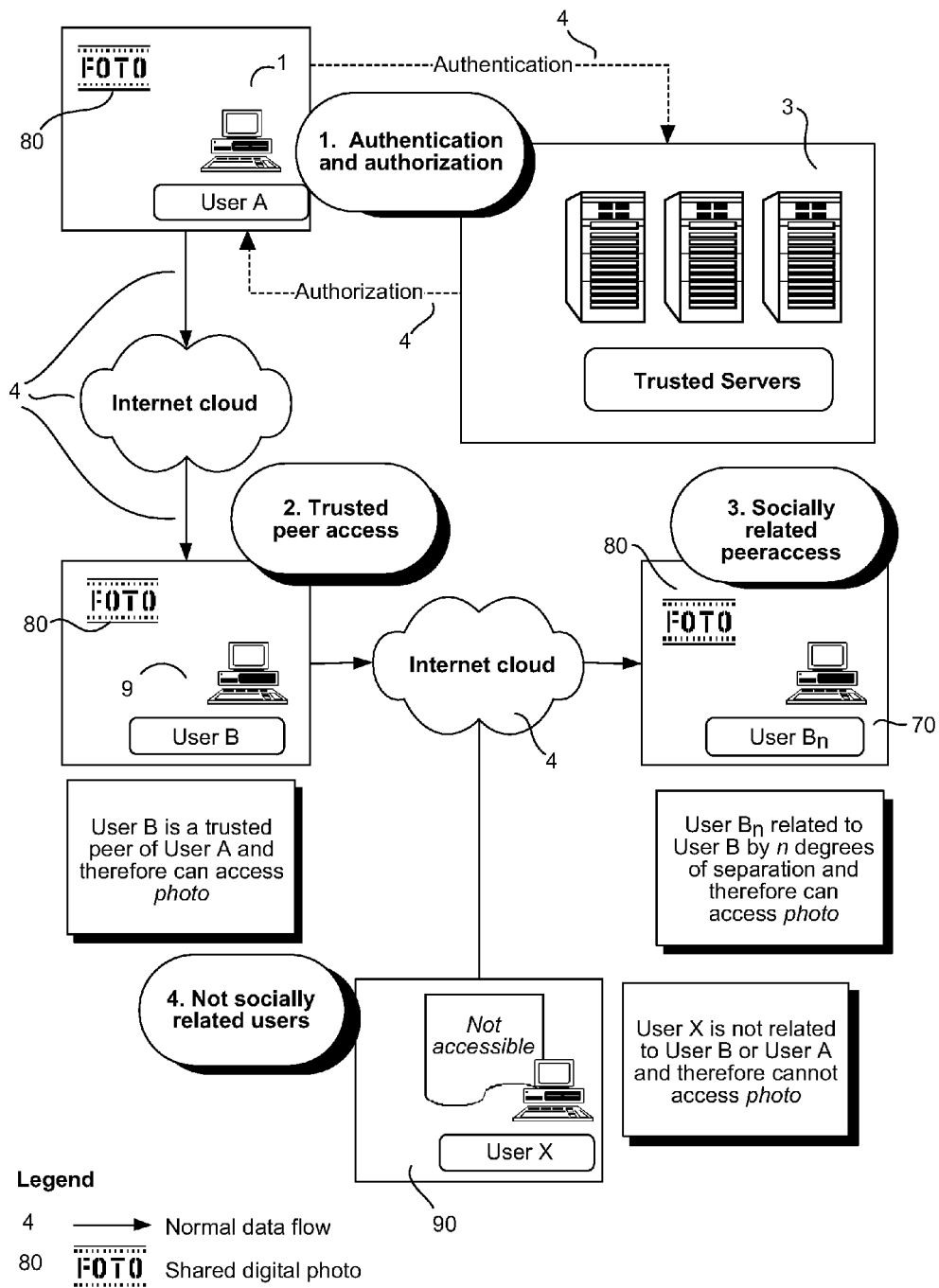
FIG. 30 is a process chart demonstrating an example of photo file sharing through a trusted social network.

This example describes the process of sharing digital photographs on a trusted social network. Digital photographs are a specific example of file transfer that involves file sizes ranging from kilobytes to megabytes depending the size of the photo, its resolution and the format of the digital file. FIG. 30 is a schematic illustrating an example of sharing photograph through a trusted social network. The detail implementation is covered by the claims of this patent. FIG. 30 illustrates the following steps:
1. Authentication and Authorization User A 1 has a digital photograph file 80 on a computing device connected to the network. User A 1 must first be identified and receive authorization from the trusted servers 3 in order to access the network.
2. Trusted user of User A 1 can access A trusted user to A 1, in this case User B 9, who is already authorized to be on the system can now access the photograph 80.
3. Socially related users can access Any connected user that is related to User A 1 or User B 9, in this case, $B_n$ 70 ($_n$ representing the degree of separation from User B 9) can also access the photo depending on the permission first declared by User A 1. For example, A 1 can limit the degree of separation (n) for which the photograph 80 can be accessed.
4. Non socially related users cannot access Users on the network that do not have a social connection to A 1 or B 7, in this case User X 90, cannot have access to the photograph 80.

This example assumes that all users are connected to the Internet without limits on network access such as firewalls. The use of proxies on trusted servers is necessary when there are limits to network access. This scenario is discussed more fully elsewhere in the body of the patent.

EXAMPLE 1C

Video Sharing on a Trusted Social Network

Figure 31:
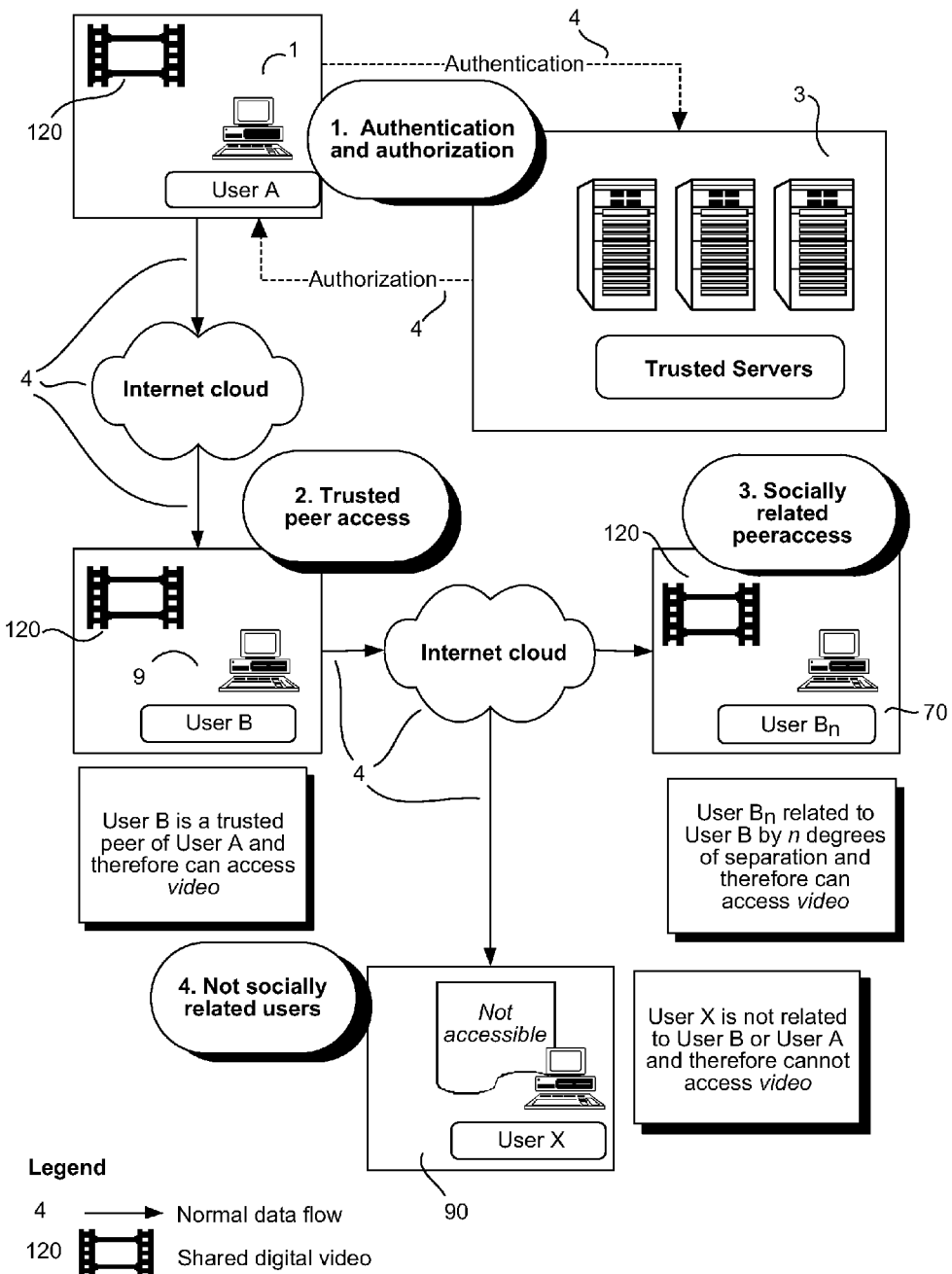
FIG. 31 is a process chart demonstrating and example of video file sharing through a trusted social network.
Figure 32:
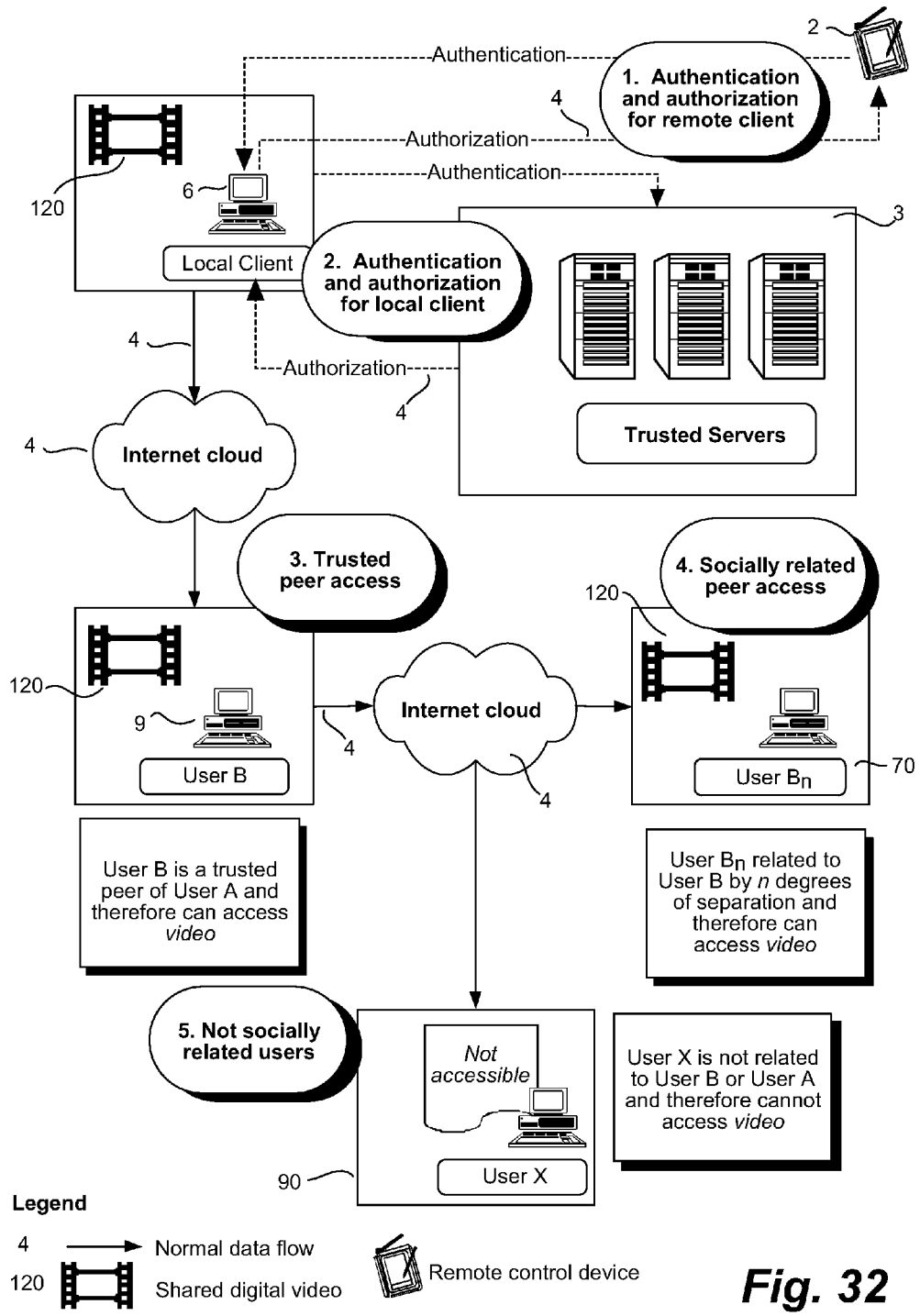
FIG. 32 is a process chart demonstrating an example of remote access and file sharing through a trusted social network.

This example describes the process of sharing digital videos on a trusted social network. Digital videos are a specific example of rich media file transfers that involves extremely large files ranging from megabytes to gigabytes in size. FIG. 31 is a schematic illustrating an example of sharing a digital video through a trusted social network. The detail implementation is covered by the claims of this patent. FIG. 31 illustrates the following steps:
1. Authentication and Authorization User A 1 has a digital video file on a shared folder. User A 1 must first be identified and receive authorization from the trusted servers 3 in order to access the network.
2. Trusted user of User A 1 can access A trusted user for A 1, in this case User B 9, who is already authorized to be on the system can now access the video 120.
3. Socially related users can access Any connected user that are related to User A 1 or User B 9, in this case, $B_n$ 70 ($_n$ representing the degree of separation from User B 9) can also access the video 120 depending on the permission first declared by User A 1. For example, A 1 can limit the degree of separation (n) for which the video can be accessed.
4. Not socially related users cannot access Users on the network that do not have a social connection to A for B 9, in this case User X 90, cannot have access to video 120.

This example assumes that all users are connected to the Internet without limits on network access such as firewalls. The use of proxies on trusted servers is necessary when there are limits to network access. This scenario is discussed more fully elsewhere in the body of the patent.

EXAMPLE 1D

Remote Access and File Sharing on a Trusted Social Network

This example describes the process of remote access of the client to share digital videos on a trusted social network. The process by which a user can access the system remotely is discussed elsewhere in the body of the patent. Once the system authorizes the remote access, the user can then carry out all the activities that are permitted on the network. FIG. 31 describes the sharing of digital videos through a remote access. The following steps are illustrated:
1. Authentication and authorization for remote client User A 1 must first establish a communication channel between the remote device 2 (i.e. a computer, a PDA, or a cell phone) and the software client 6. The software client 6 will issue and challenge and User A 1 must then complete the logon steps to gain access to the software client. Once the logon process is successful, User A 1 can then issue commands to the software client through the remote device 2.
2. Authentication and Authorization User A 1 starts and completes the logon process for the software client 6 and the trusted servers 3. User A 1 has a digital video file 120 on a shared folder.
3. Trusted user of User A 1 can access A trusted user for A 1, in this case User B 9, who is already authorized to be on the system can now access the video 120.
4. Socially related users can access Any connected user that are related to User A 1 or User B 9, in this case, $B_n$ 70 ($_n$ representing the degree of separation from User B 9) can also access the video depending on the permission first declared by User A 1. For example, A 1 can limit the degree of separation (n) for which the video 120 can be accessed.

5. Not socially related users cannot access Users on the network that do not have a social connection to A 1 or B 9, in this case User X 90, cannot have access to video.

This example assumes that all users are connected to the Internet without limits on network access such as firewalls. The use of proxies on trusted servers is necessary when there are limits to network access. This scenario is discussed more fully elsewhere in the body of the patent.

EXAMPLE 2

An Electronic Market on a Trusted Social Network

This patent can also be used to setup an electronic marketplace for digital goods. Such markets are created when the system can assign an explicit value to the transactions between users on their trusted social network. Markets differ in the information being tracked when an item is transferred between two users. For markets based on transactions, the system automatically assigns value based on the interaction between two socially related users. For market based on transfer of digital right, an additional service, known as a digital rights manager, is required to track the legitimate ownership of a particular piece of content. A natural extension of this concept is in the transfer of non-digital goods. The following systems are not mutually exclusive and can be used in conjunction with each other.

EXAMPLE 2A

Market Based on Transactions

Figure 33:
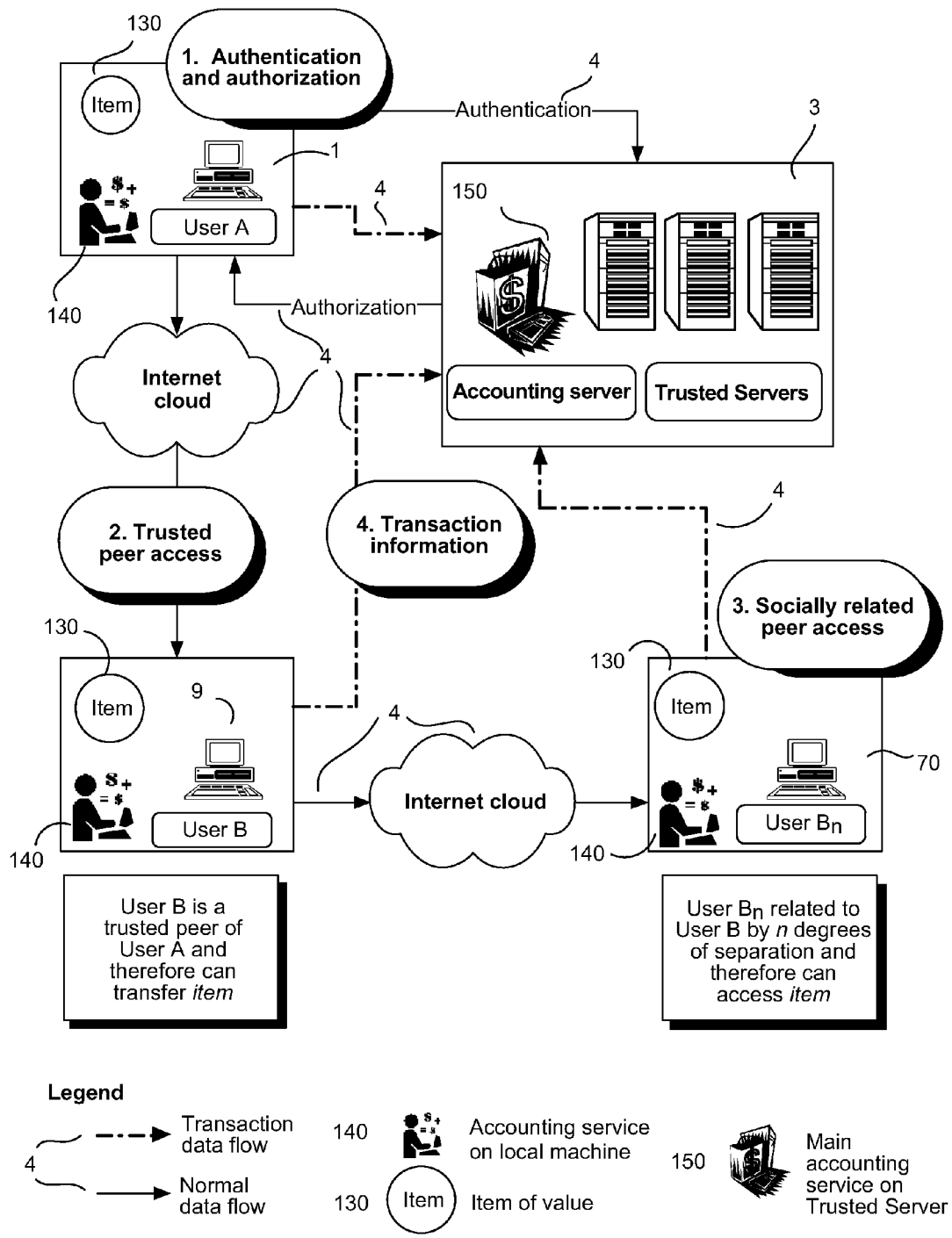
FIG. 33 is a process chart demonstrating a transaction based electronic markets on a trusted social network.

FIG. 33 is an example of an electronic market built on a trusted social network. In this case, the main components of this electronic market involves:
1. Authentication and Authorization User A 1 has an item 130 on a shared folder. User A 1 must first be identified and receive authorization from trusted servers 3 to access the network.
2. Trusted user of User A 1 request and obtain item A trusted user, for example User B 9, who is already authorized to be on the system and is defined by User A 1 to be a trusted user, can now obtain the item 130 from User A 1. This transaction is recorded in an accounting service 140 on the local machine for both users 1 and 9.
3. Socially related users access Any connected user that are related to User A 1 or User B 9, in this case, $B_n$ 70 (n representing the degree of separation from User B 9) can also obtain the item 130 depending on the permission first setup by User A 1 and subsequently, all the other related users. This transaction is also recorded in an accounting service 140 on the local machine.
4. Transaction information For each user, the local accounting service reports the transaction information to the Accounting Server 150 on the trusted servers 3. The Accounting Server 150 can then assign values to each transaction. Examples of transaction information include, but are not limited to file type, file size, speed of transfer, value of transfer, user satisfaction. Examples of assign values for transactions include, but are not limited to, cash or system credits.

An electronic market is thereby created which assign value to an activity over the network.

EXAMPLE 2B

Market Based on Transfer of Digital Rights

Figure 34:
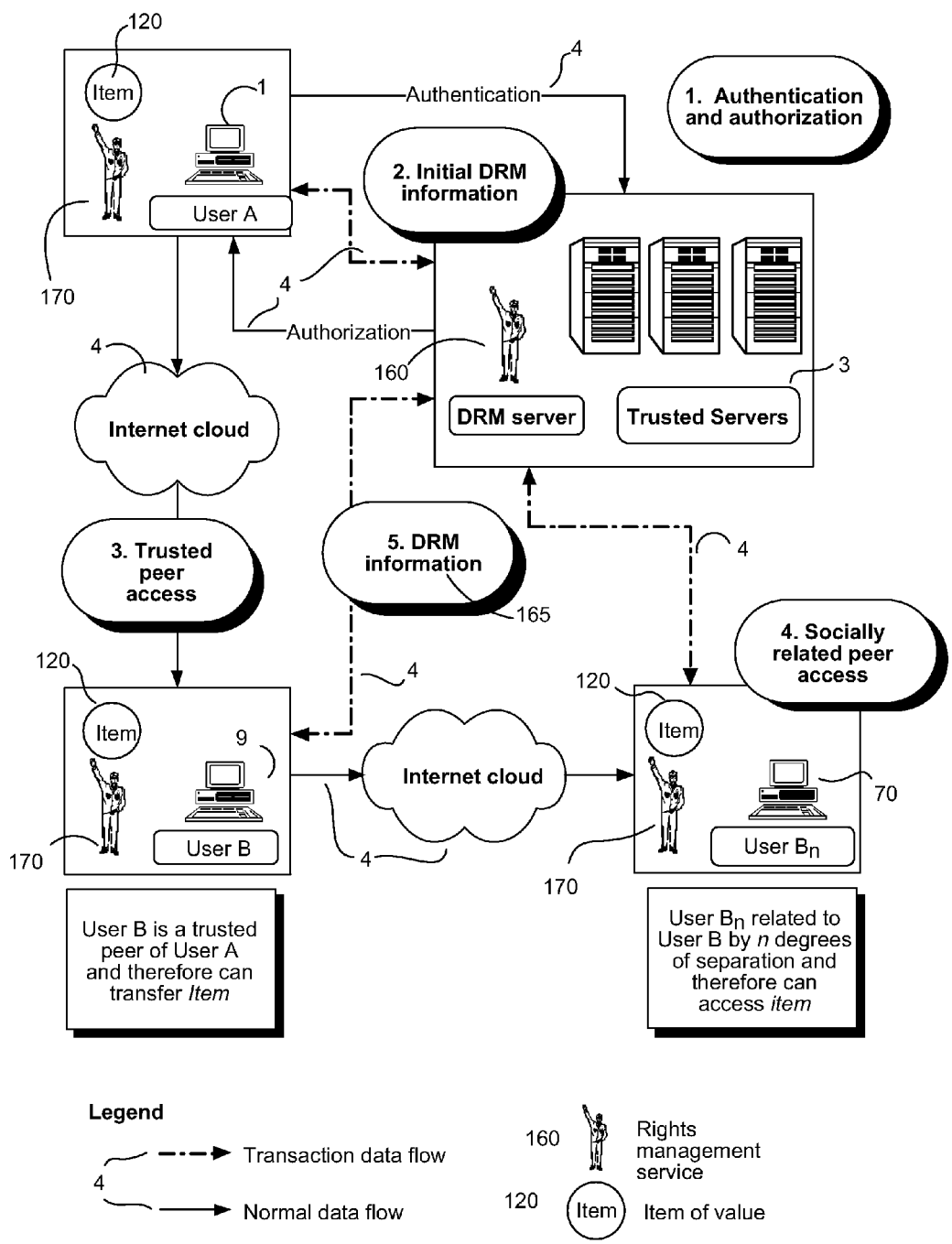
FIG. 34 is a process chart demonstrating an electronic market based on the transfer of digital rights.

FIG. 34 illustrates an electronic market built on a trusted social network based on the transfer of digital rights. In this case, the system requires the addition of a DRM (Digital Rights Management) server, to manage the rules and regulations governing the ownership of the object. The main components of this system are:
1. Authentication and Authorization User A 1 is the digital rights holder of an item (such as a digital music file protected by copyright) 120 on a shared folder. User A 1 must first be identified and receive authorization from the trusted servers 3 to access the network.
2. Initial DRM information User A 1, sends the Digital Rights Management (DRM) 165 information to the DRM server 160.
3. Trusted user of User A 1 can request and obtain item. A trusted user, defined as User B 9, who is already authorized to be on the system can now obtain the item 120 from User A 1.
4. Socially related users can access Any connected users that are related to User A 1 or User B 9, in this case, $B_n$ 70 (n representing the degree of separation from User B 9) can also obtain the item 120 depending on the permission first setup by User A 1 and subsequently, all the other related users. The digital rights information is sent to the local digital rights manager installed on the local system 170.
5. Digital rights information For each user, the local accounting service 140 reports the digital rights information to the DRM Server 160 on the trusted servers 3. The DRM Server 160 can then assign the appropriate access rules and regulation governing the use of the item as defined by the digital rights owner 1.

The addition of a DRM server can therefore effectively enforce copyrights in digital files in a flexible and effective manner throughout the network. The social element of this network provides an additional level of security and enforcement for transactions involving digital rights.

EXAMPLE 2C

Extension of Electronic Market to Identifiable Non-Digital Goods

Figure 35:
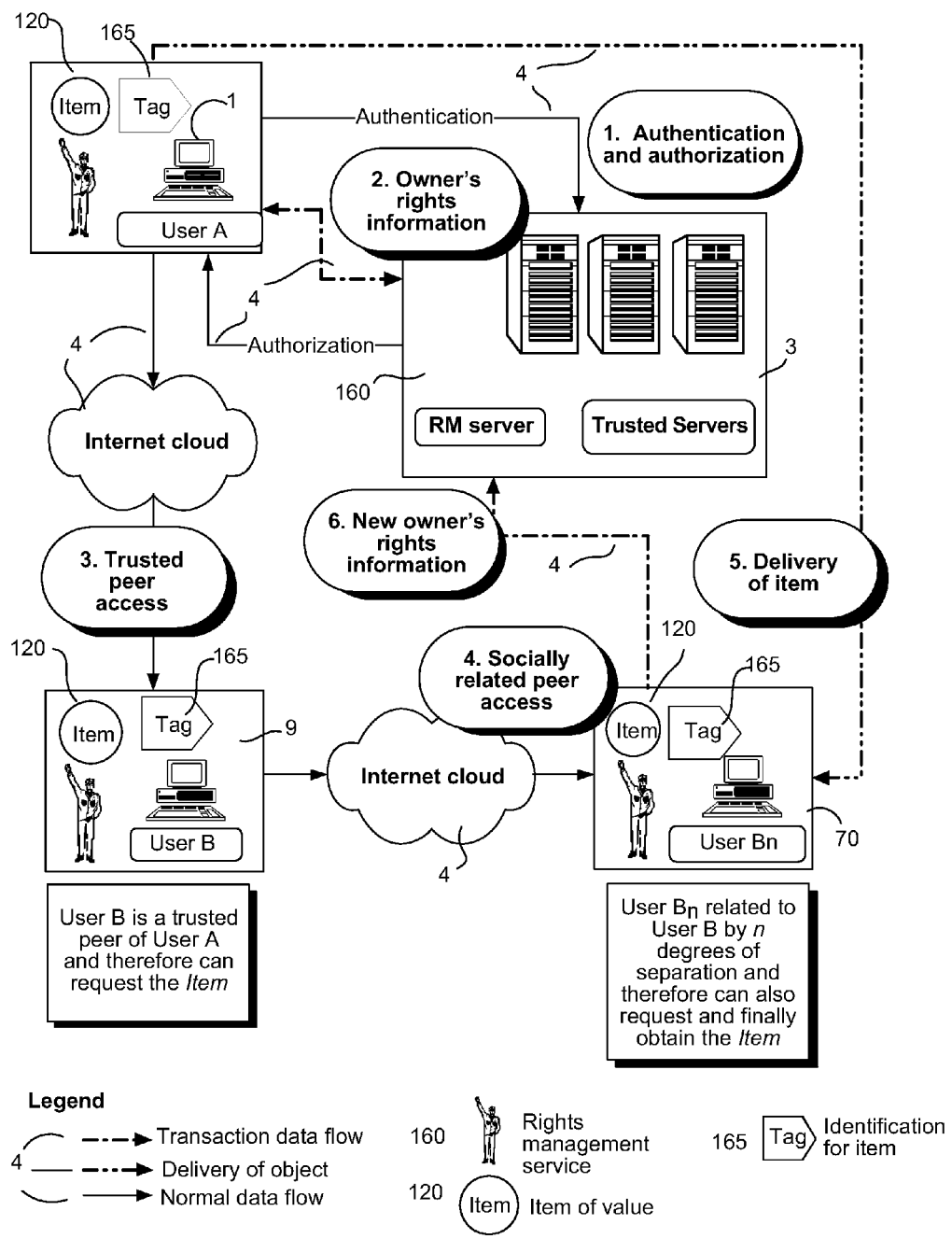
FIG. 35 is a process chart demonstrating an example of extending the electronic market to include identifiable non-digital goods.

An electronic market built on a trusted social network as described in this patent can also be used for the trading of non-digital goods. This embodiment describes the use of the electronic market to exchange non-digital goods. Additional requirements to implement this example are the availability of a unique identifier for the object of interest and a Rights Management (RM) server. Examples of unique identifiers include but are not limited to the following: manufacturer's serial numbers, Radio Frequency Identification (RFID) tags and/or Universal Product Code (UPC). The RM server will manage the rules and regulations governing the ownership of the object. FIG. 35 illustrates an electronic market built on a trusted social network based on the availability of unique identifiers for an object. The main components of this system are:
1. Authentication and Authorization User A 1 is the owner of an item 120 that can be identified uniquely with a tag. User A 1 must first be identified and receive authorization from the trusted servers 3 to access the network.
2. Owner's rights information User A 1 sends the unique identifier and ownership information 165 to the Rights Management (RM) server 160.
3. Trusted user of User A 1 can access A trusted user, defined as User B 9, who is already authorized to be on the system can now request the item from User A 1.

4. Socially related users can access Any connected users that are related to User A 1 or User B 9, in this case, B$_r$, 70 (n representing the degree of separation from User B 9) can also obtain the item 120 depending on the permission first setup by User A 1 and subsequently, all the other related users.
5. Delivery of Item In this example, User A 1 accepts the request of User Bn 70 and delivers the item 120 together with its unique identifier 165. The item 120 can be delivered an external process for example: mail, courier service or direct delivery.
6. New owner's rights information Once User B$_n$ 70 receives the item, rights information is sent back to RM server 160 to conclude the transaction.

The addition of a RM server can therefore effectively enforce ownership in a flexible and effective manner throughout the network. The social element of this network provides an additional level of security and enforcement for transactions involving non-digital goods.

EXAMPLE 3

Electronic Auction Through a Trusted Social Network

The trusted social network as outlined in this patent can also be used as the basis for different types of auctions.

EXAMPLE 3A

Normal Auctions on a Trusted Social Network

Figure 36:
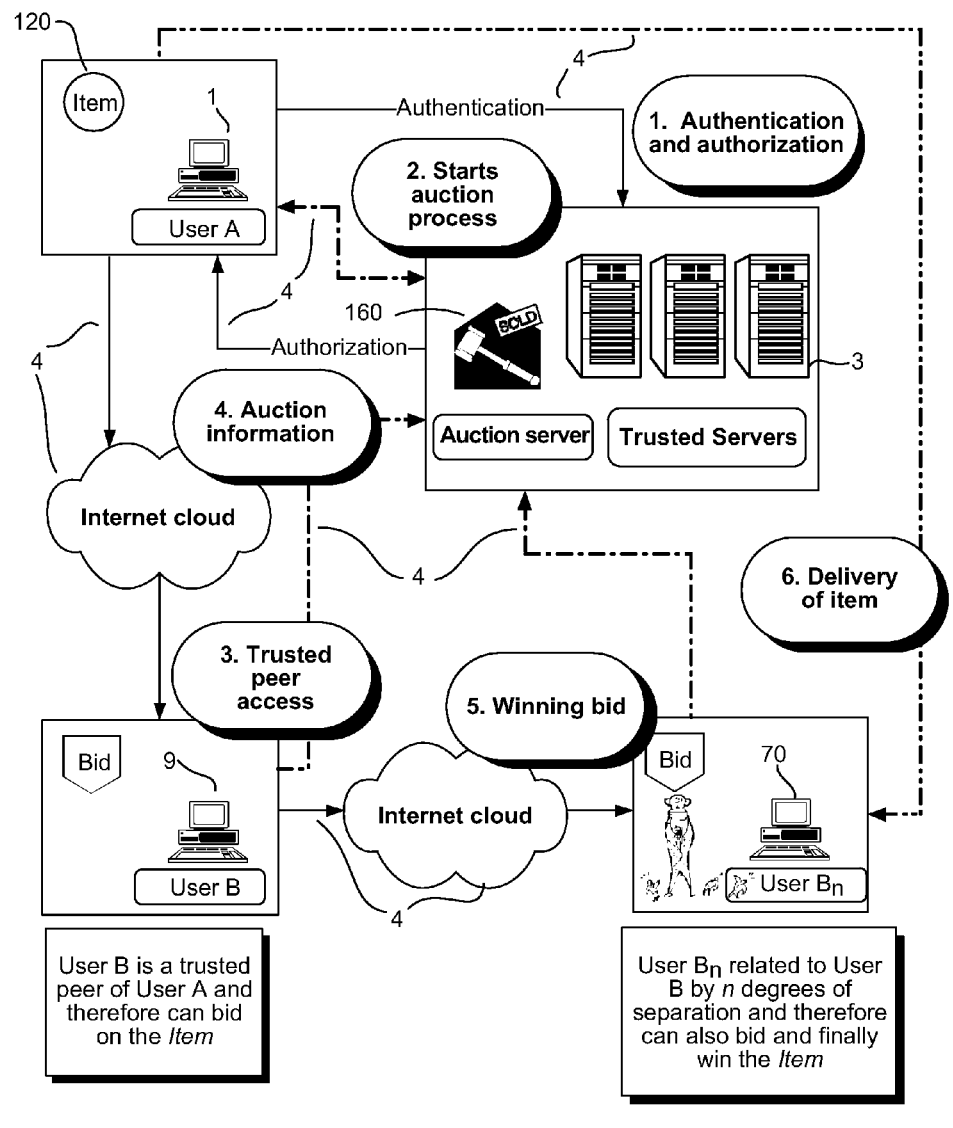
FIG. 36 is a process chart demonstrating an example of auction over a trusted network

In a normal auction there is a single seller and many potential buyers bidding for the item being sold. On a trusted social network as described in this patent, the buyers are limited to the extended social network of the seller. FIG. 36 is an example of an electronic auction where a user, defined as A, initiates and carries out an auction though this trusted social network.
1. Authentication and Authorization User A 1 is the owner of an item 120 for auction on the network. User A 1 must first be identified and receive authorization from the trusted servers 3 to access the network.
2. Starts auction process User A 1 initiates the auction process by sending the appropriate information to an Auction server.
3. Trusted user Bidding A trusted user, defined as User B 9, who is already authorized to be on the system can now obtain the auction information concerning the item 120 from the auction server 160. Any other users that are related to A 1 or B 9 can also access this information through defined social relations.
4. Auction information sends to auction server Any connected users that are related to User A 1 or User B 9, can bid on the item 120 by contacting the auction server 160. The auction server can enforce such rules as
   Time limit for auction
   Price limit for item
   Volume discounts
   Exclusions (for example, based on location, reputation, etc.)
The auction server 160 maintains control of the auction process until the auction is finished.
5. Winning bid The auction server notifies both User A 1 and the winner of the result of the winning bid. In this case, User B$_n$, 70 has the winning bid.
6. Delivery of item The owner of the item, User A 1, can then deliver the item to the winner, User B$_n$ 70. At the minimum, verification of transaction is done via the trusted servers 3.

The novelty of this embodiment is that the entire auction process is carried out on a trusted social network.

EXAMPLE 3B

Reverse Auctions on a Trusted Social Network

Figure 37:
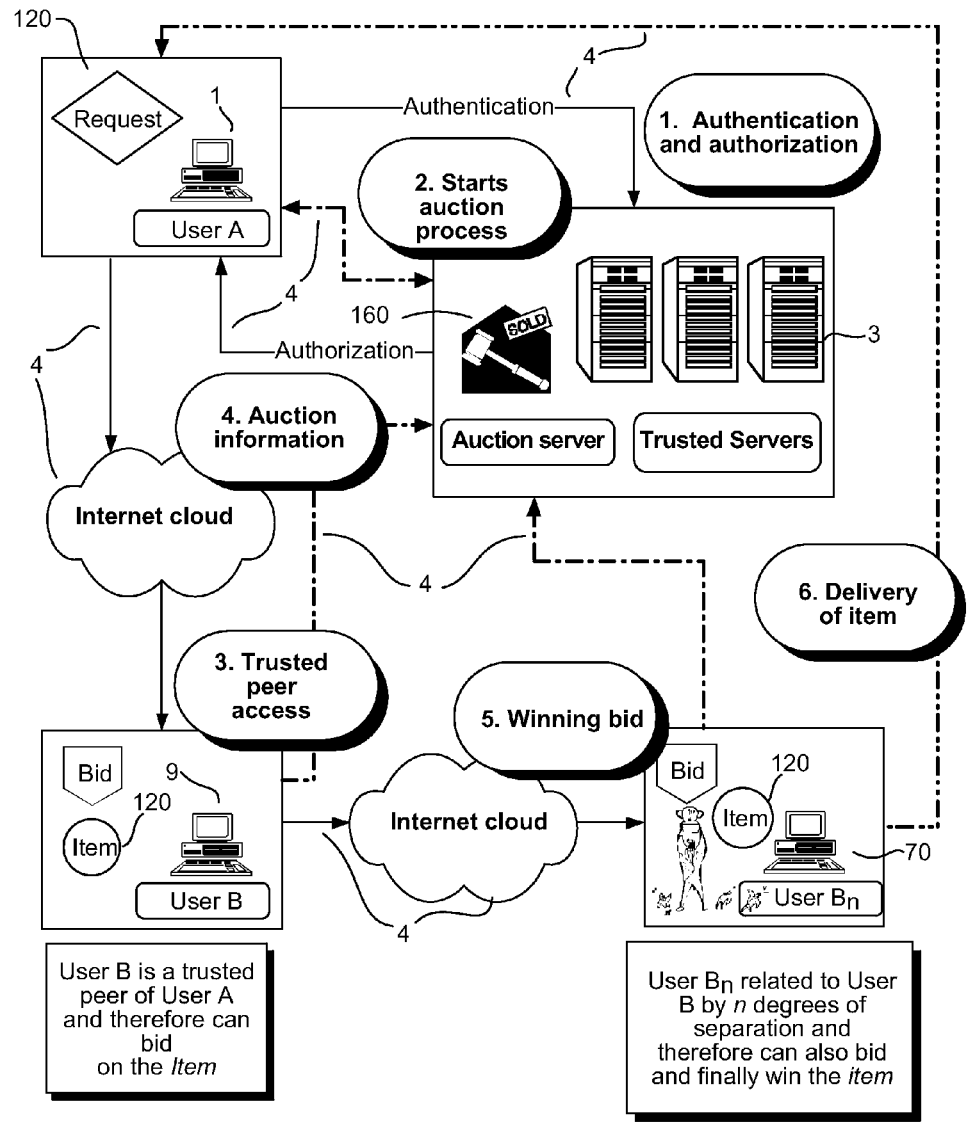
FIG. 37 is a process chart demonstrating a reverse auction on a trusted social network.
Figure 37:

The auction system can also support reverse auctions. In a reverse auction there are one buyer and many sellers. The general idea is that the buyer specifies what they want to purchase and offers it to many suppliers. Normally, each buyer must be qualified to ensure that the winner is suitable for the buyer. As a result this type of process will usually produce the lowest possible price when all sellers are of equal quality. Qualification is implicitly defined in a social network since access to the network is by invitation only. Therefore, this type of network is suitable for carrying out reverse auctions. An example of a reverse auction is shown in FIG. 37. A description of the main elements in this process is as follows:
1. Authentication and Authorization User A 1 has a request for an item 120 that might be on the network. User A 1 must first be identified and receive authorization from the trusted servers 3 to access the network.
2. Starts auction process User A 1 initiates the auction process by sending the appropriate information to an auction server 160 requesting the item.
3. Trusted user Bidding A trusted user, defined as User B 9, who is already authorized to be on the system can now obtain the auction information concerning the request from the auction server 160. Any other users that are related to A 1 or B 9 can also access this information through defined social relations.
4. Auction information sent to auction server Any connected users that are related to User A 1 or User B 9, can bid to satisfy the demands of User A 1 by contacting the auction server 160. The auction server can enforce such rules as
   Time limit for auction
   Price for item
   Volume discounts
   Acceptance (for example, based on location, reputation, etc.)
The auction server 160 maintains control of the auction process until the auction is finished.
5. Winning bid The auction server notifies both User A 1 and the winner of the result of the winning bid. In this case, User Bn 70, has the winning bid.
6. Delivery of item The owner of the item, User Bn 70, can then deliver the item 120 to the requesting user, User A 1. At the minimum, verification of transaction is done via the trusted servers 3.

EXAMPLE 4

Other Types of Communications Through a Trusted Social Network

The network as outlined in this patent represents a platform that can support a myriad of communication services. Example 4 lists various communication services that can be implemented on a trusted social network.

EXAMPLE 4A

Instant Messaging (IM)

Figure 38:
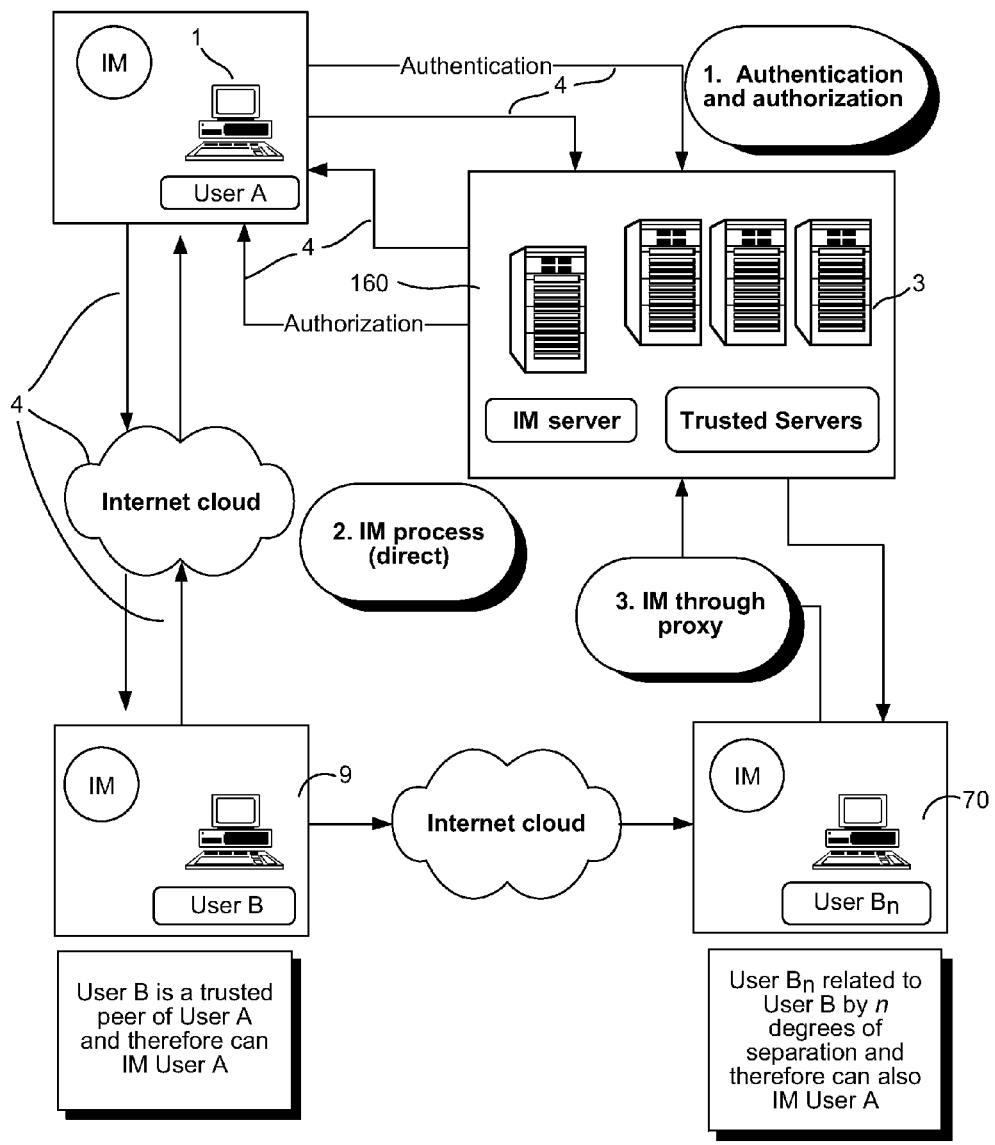
FIG. 38 is a process chart demonstrating an application of instant messaging (IM) services on a trusted social network.

Instant messaging (IM) is an exchange of text-based messages over the Internet between two or more people who must all be online at the same time. FIG. 38 is an illustration of how an IM service can be implemented on the network covered in this patent. The process includes:
1. Authentication and Authorization. User A 1 wants to communicate with a trusted user. User A 1 logs in to the system and undergoes a process of authentication and authorization.
2. IM process (direct). Once on the network, User A 1 can communicate with those trusted users that are also on the network, in this case, User B 9. User A 1 can also contact anyone that is socially related to the User B 9, for example, User Bn 70, depending on their mutual preference settings.
3. IM through proxy. In some cases, Users are behind firewalls or other security devices and cannot be connected directly. In such cases, the IM service is available through the IM server 160 on the trusted servers 3.

The novelty of this embodiment is that an IM process is carried out on a trusted social network.

EXAMPLE 4B

Voice Over Internet Protocol (VOIP)

Figure 39:
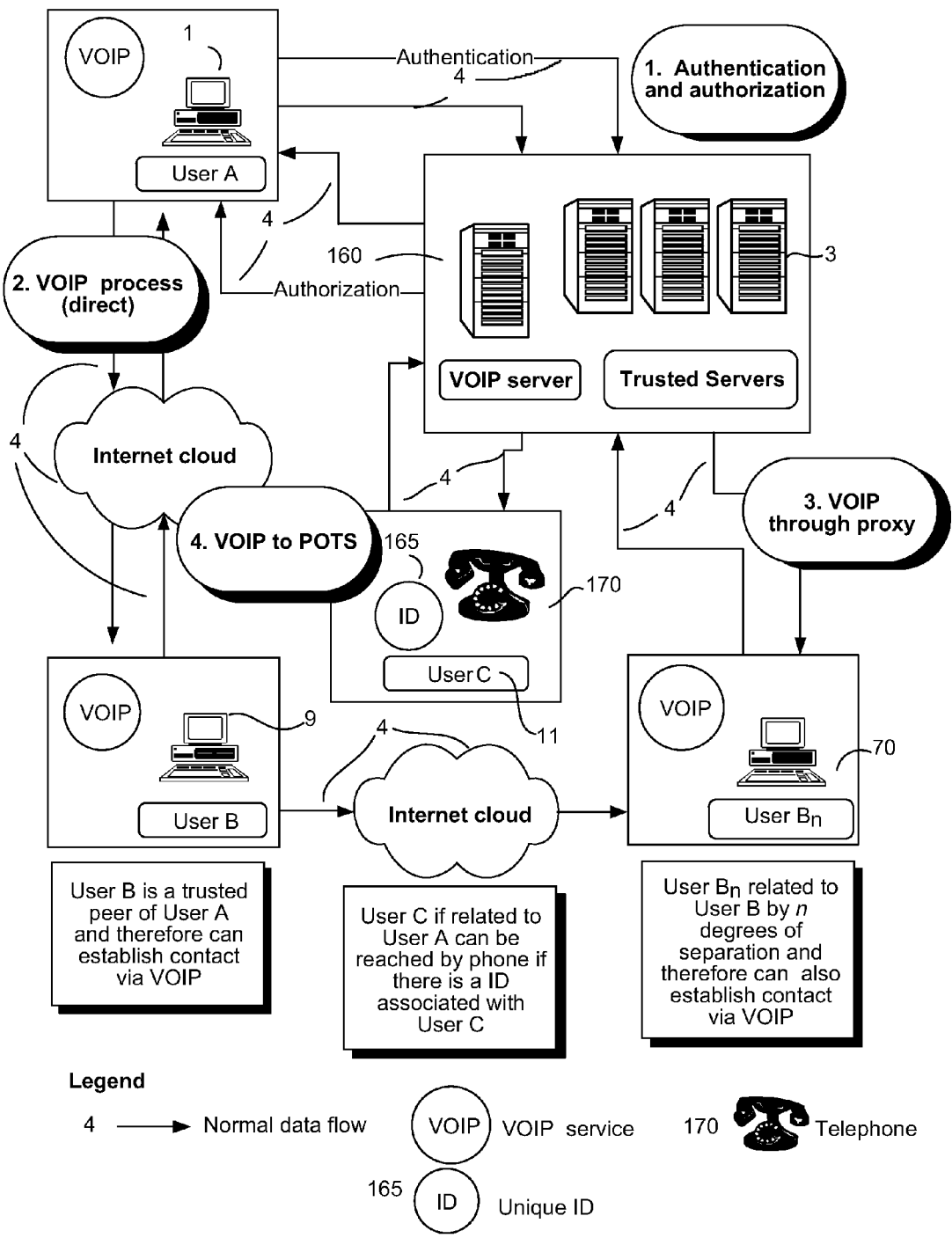
FIG. 39 is a process chart demonstrating Voice Over Internet Protocol (VoIP) services on a trusted social network.

Voice over Internet Protocol is a technology for transmitting ordinary telephone calls over the Internet using packet-linked routes. FIG. 39 is an illustration of how a VoIP service can be implemented on the network covered in this patent. The process includes:
1. Authentication and Authorization. User A 1 wants to communicate with a trusted user via VoIP. The user logs in to the system and undergoes a process of authentication and authorization.
2. VoIP process (direct). Once on the network, User A 1 can communicate using VoIP, with those trusted users that are also on the network, in this case, User B 9. User A 1 can also contact anyone that is socially related to the User B 9, for example, User Bn 70, depending on their mutual preference settings.
3. VoIP through proxy. When Users are behind firewalls or other security devices and cannot be connected directly. In such cases, the VoIP service is available through the VoIP server 160 on the trusted servers 3.
4. VoIP to POTS. This service can be extended to include traditional telephony (POTS) systems 170. In this case, User C 11, must have some unique identifier (for example, telephone number, password) 165 that allows the user to access the network and be contacted by trusted users. VoIP communication from User A 1 to User C 11 is through the VoIP server 160.

The novelty of this embodiment is that a VoIP process is carried out on a trusted social network.

EXAMPLE 4C

Interactive or Streaming Video

Figure 40:
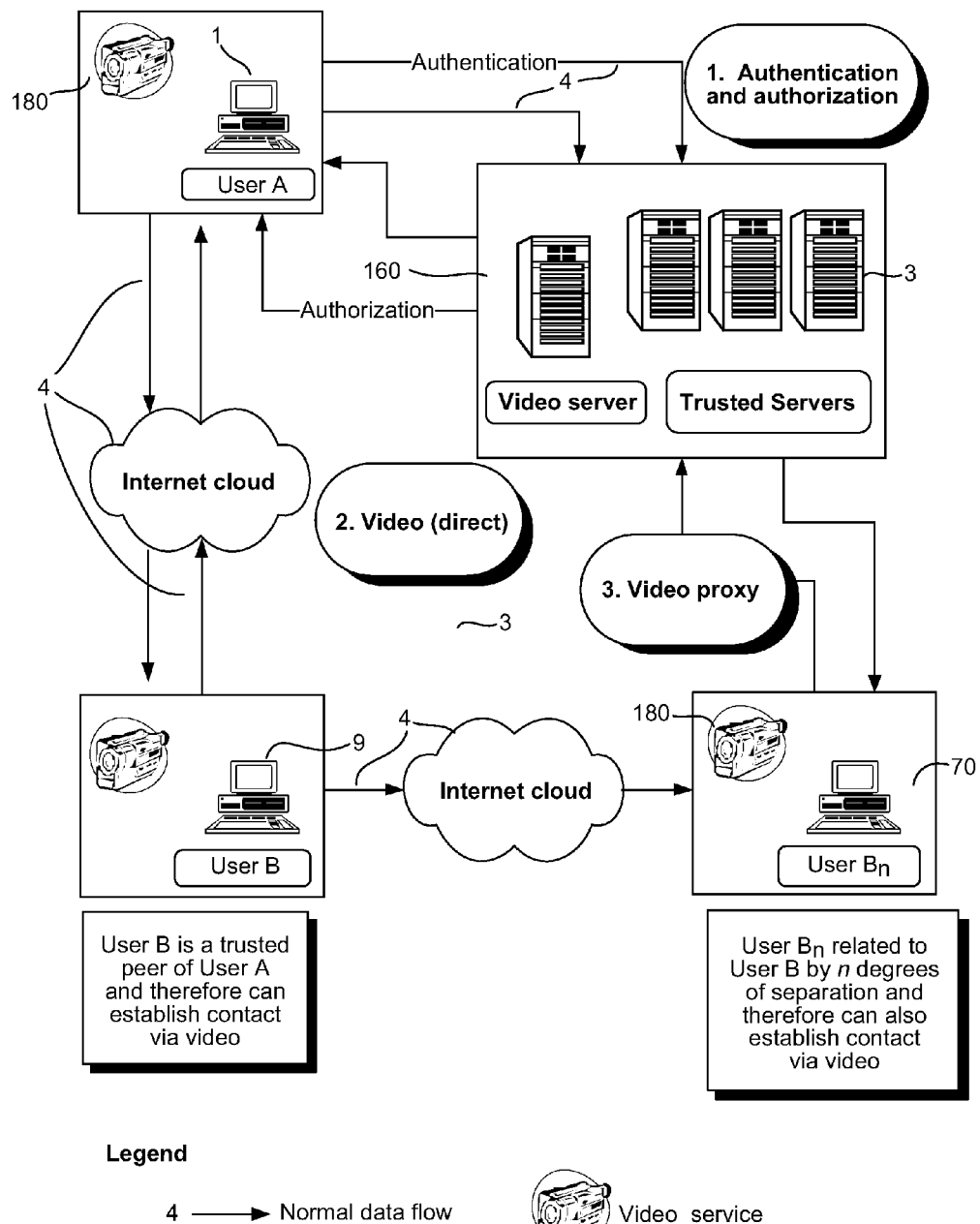
FIG. 40 is a process chart demonstrating Interactive Video services on a trusted social network.

Interactive or streaming video is a technology for video communication using the Internet. FIG. 40 is an illustration of how an interactive video service can be implemented on the network covered in this patent. The process includes:
1. Authentication and Authorization User A 1 wants to communicate with a trusted user via video. User A 1 first logs in to the system and undergoes a process of authentication and authorization.
2. Video (direct) Once on the network, User A 1 can communicate using video streams 180, with those trusted users that are also on the network, in this case, User B 9. User A 1 can also contact anyone that is socially related to the User B 9, for example, User Bn 70, depending on their mutual preference settings.
3. Video through proxy When Users are behind firewalls or other security devices and cannot be connected directly. In such cases, the interactive service is available through the Video server 160 on the trusted servers 3.

The novelty of this embodiment is that an interactive process is carried out on a trusted social network.

EXAMPLE 5

Resource Sharing Through a Trusted Social Network

The application of this patent is not limited to the communication or the transfer of electronic files but can also extend to the sharing or grouping of resources both electronic and non-electronic. The common element in the resource sharing through a social network is the addition of a trusted source that manages the resources. The following are representative examples of resource sharing on this type of network.

EXAMPLE 5A

Electronic Resource Sharing on a Trusted Social Network

Figure 41:
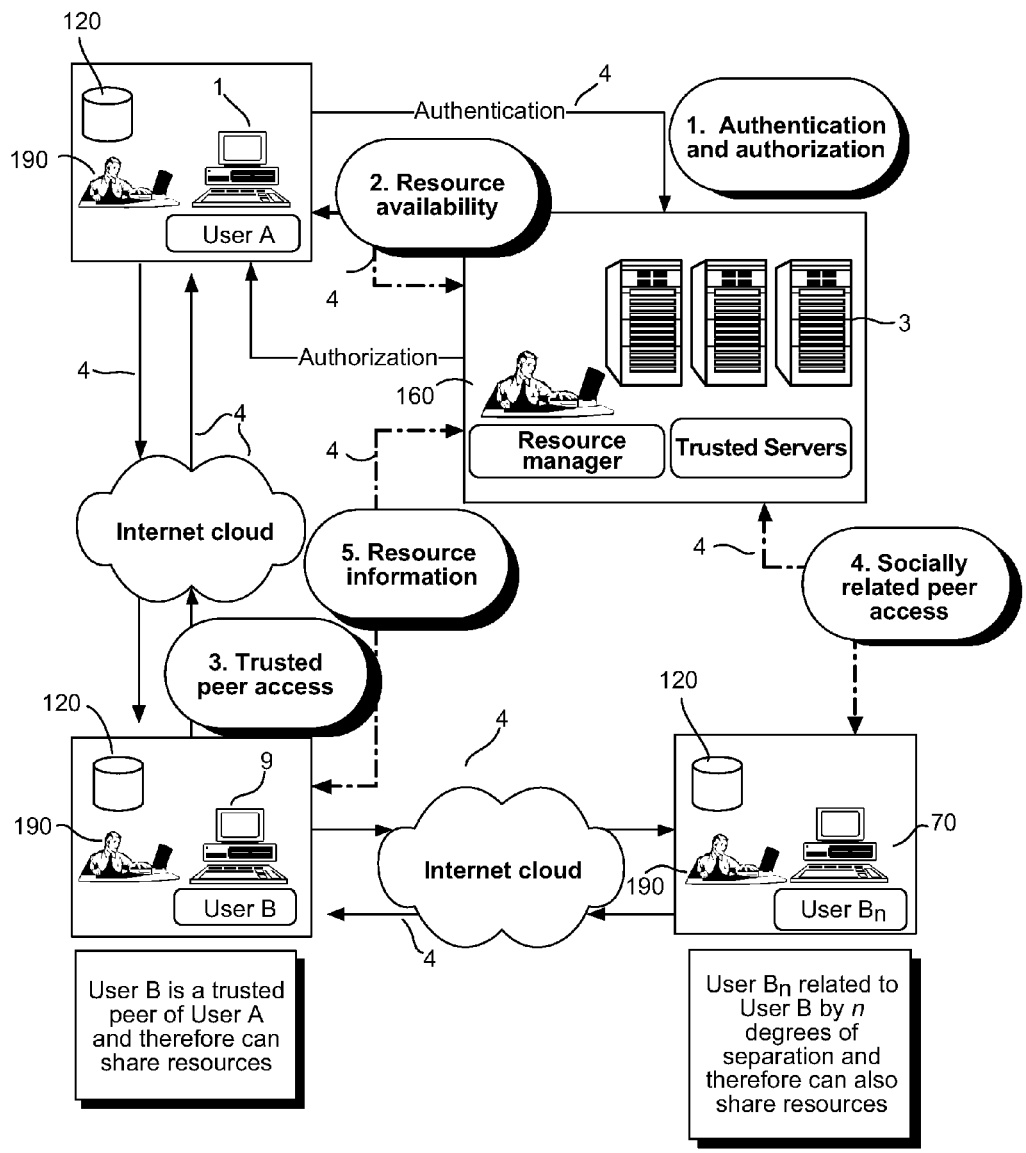
FIG. 41 is a process chart demonstrating an application of electronic resource sharing on a trusted social network.

This example applies to the sharing of electronic resources available on the local computing device that can include but not limited to: bandwidth, storage capacity and CPU processing capability. FIG. 41 illustrates an application of resource sharing on the network defined in this patent. Major steps in this process are:
1. Authentication and Authorization. User A 1 has resources 120 to share, in this case, local hard drive space. User A 1 must first be identified and receive authorization from the trusted servers 3 to access the network.
2. User A 1 sends information on resource availability. Once authenticated User A 1 sends resource information to the resource manager 160 residing with the trusted servers 3.
3. Trusted user can access. A trusted user, for example User B 9, who is already authorized to be on the system and is defined by User A 1 to be a trusted user, obtains information from the resource manager 160. User A 1 and User B 9 can now share their resources 120 accordingly.
4. Socially related users can access. Any connected user that is related to User A 1 or User B9, in this case, $B_n$ 70 (n representing the degree of separation from User B 9) can also share their resources 120. The resource manager 160 carries out the organization and management of those resources.
5. Resource information. For each user, the local resource service 190 reports the available resource information to the resource manager 160 on the trusted servers. The resource manager 160 can then allocate resources to each user of the trusted network accordingly.

As a result, resources can be grouped and shared on a trusted network according to the preference of each individual user.

EXAMPLE 5B

Figure 42:
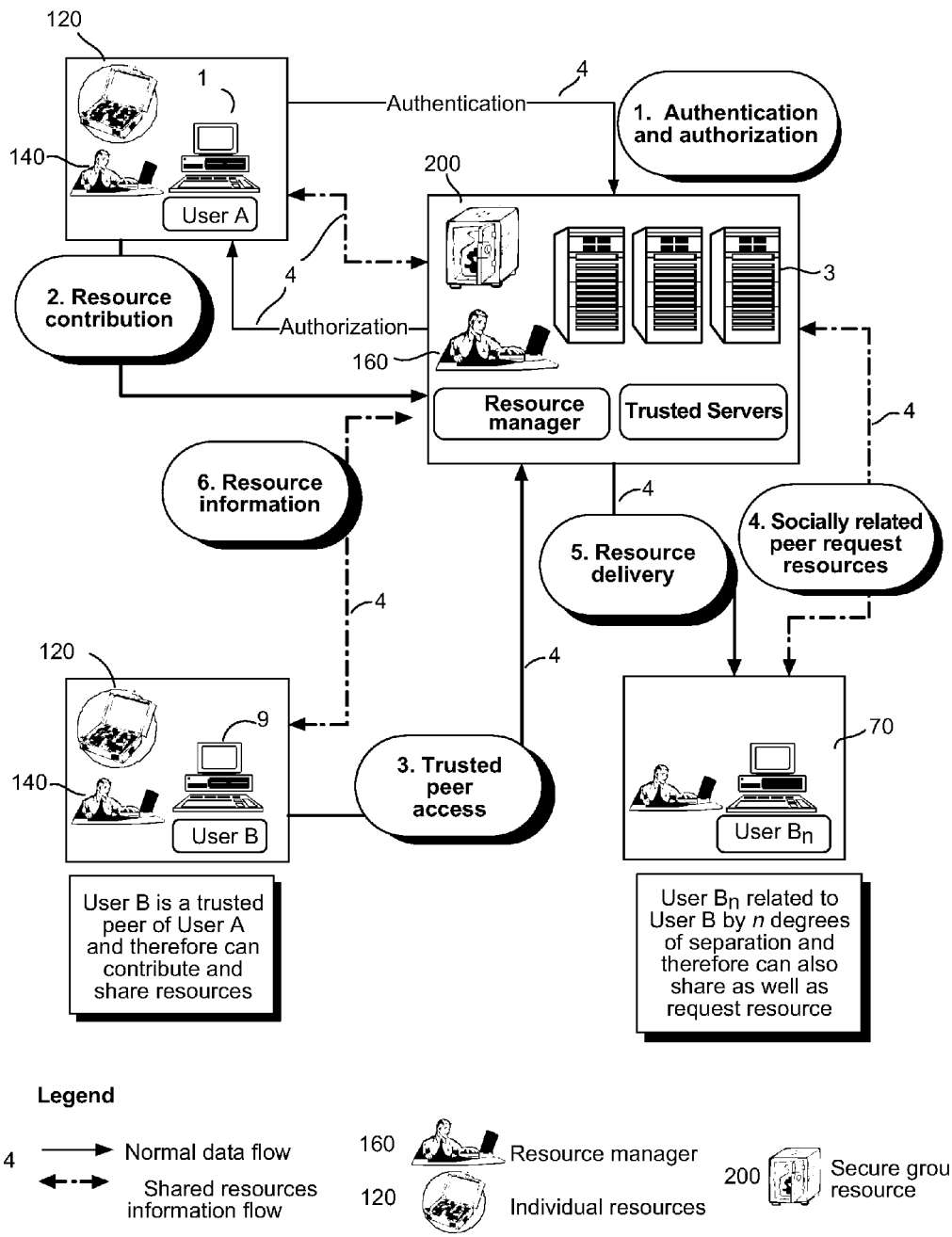
FIG. 42 is a process chart demonstrating a process for non-electronic resource sharing on a trusted social network.

Non-Electronic Resource Sharing on a Trusted Social Network with Delivery Through a Trusted Service The application of this patent is not limited to sharing or grouping of electronic resources but also includes identifiable non-electronic resources. Examples of non-electronic resources include: money, credit and/or information. FIG. 42 illustrates an application of resource sharing on the network defined in this patent for the case of resource delivery by a trusted authority. Major steps in this process are 1. Authentication and Authorization User A 1 has a resource 120 to share, in this case, money. User A 1 must first be identified and receive authorization from trusted servers 3 to access the network.
2. User A 1 contributes resource to a central authority Once authenticated User A 1 sends the resource (money) 120 to the trusted authority 200 and the information related the resource to the resource manager 160.
3. Trusted user resource contribution A trusted user, for example User B 9, who is already authorized to be on the system and is defined by User A 1 to be a trusted user, can contribute to the resource 120 on the trusted authority 200. With each contribution, the corresponding resource information is also sent to the resource manager 160. User A 1 and User B 9 can now share their resources 120 accordingly.
4. Socially related users access request resources Any connected user that are related to User A 1 or User B 9, in this case, $B_n$ 70 (n representing the degree of separation from User B 9) can also share and request the resources 120. In this case, the User Bn 70 requests the resource 120 and the resource manager 160 carries out the organization and management of those resources and arranges for the delivery of the resource 120.
5. Resource delivery The resource manager 160 arranges for the delivery of the resource 120 to User Bn 70 from a trusted authority 200.
6. Resource information For each user, the local resource service 140 reports and tracks the contribution of each socially related user. The resource server 160 can then allocate resources 120 or provide access privileges to each user of the trusted network accordingly.

As a result, resources can be grouped and shared on a trusted network according to the preference settings for each individual user.

EXAMPLE 5C

Figure 43:
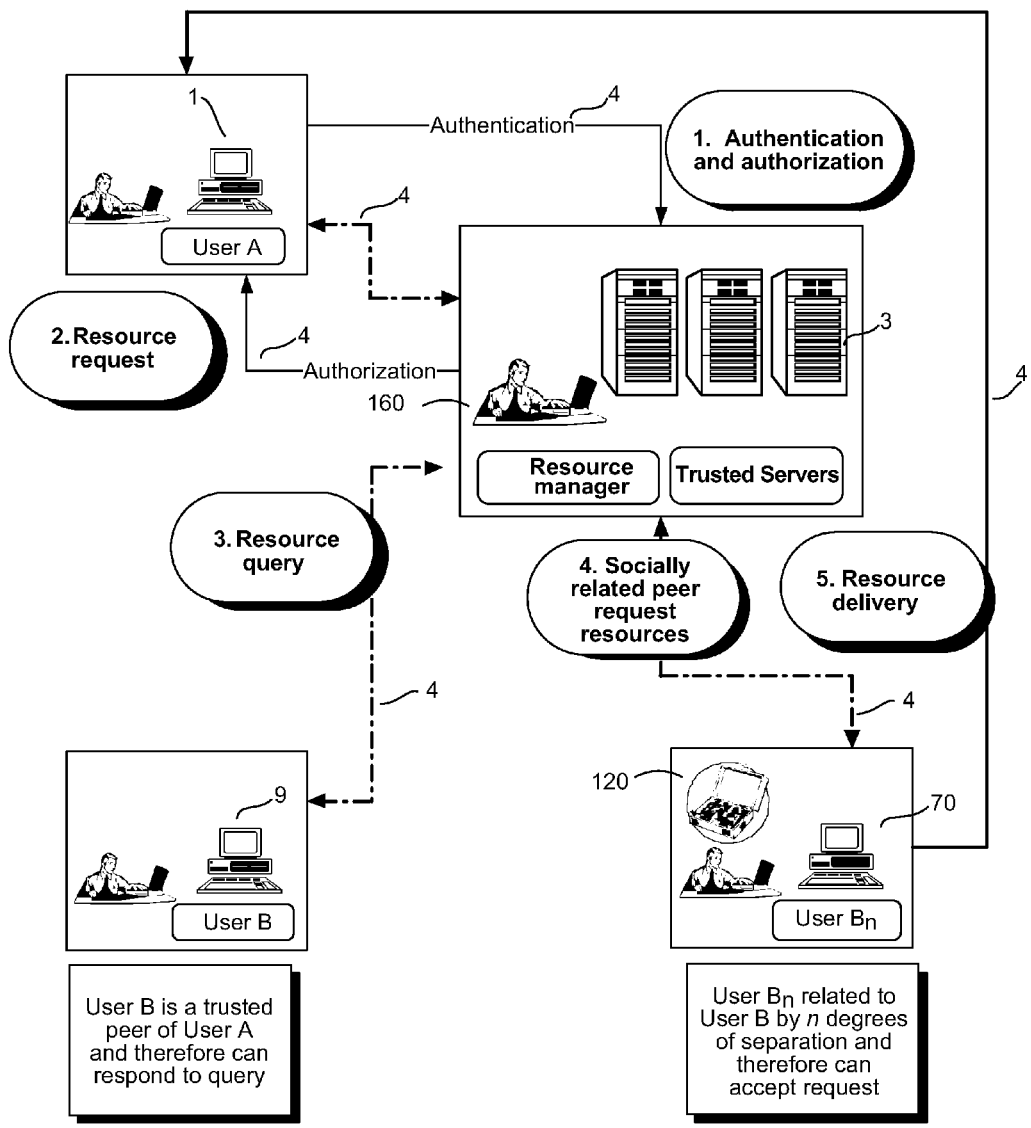
FIG. 43 is a process chart demonstrating a process for non-electronic resource sharing on a trusted social network where delivery of the resource is managed physically by a trusted user.

Non-Electronic Resource Sharing on a Trusted Social Network—Delivery by a Trusted User In this example of sharing of non-electronic resources, a trusted social user carries out the delivery of the resource. FIG. 43 is an illustration of this example. Major steps in this process are 1. Authentication and Authorization User A 1 has a request for a resource 120, in this case, money. User A 1 must first be identified and receive authorization from the trusted servers 3 to access the network.
2. User A 1 submits a resource request Once authenticated User A 1 submits a resource (money) request to the to the resource manager 160, a trusted authority.
3. Resource query Resource manager 160 then query each of the socially connected users to A 1 to find the resource. In this case, User B 9 is query and the system finds that User B 9 does not have the required resources 120.
4. Request accepted Any connected user that is related to User A 1 or User B 9, in this case, $B_n$ 70 (n representing the degree of separation from User B 9) can also reply to the request the resources. In this case, the User Bn 70 has the resource 120 and the resource manager 160 carries out the organization and management of those resources and arranges for the delivery of the resource 120.
5. Resource delivery The resource manager 160 closes the request after the delivery of the resource 120 from User Bn 70 to User A 1.

As a result, resources can be grouped and shared on a trusted network according to the preference of each individual user and the delivery of the resources does not have to occur via a trusted intermediate.

EXAMPLE 5D

Information Collaboration and Management on a Trusted Social Network

Figure 44:
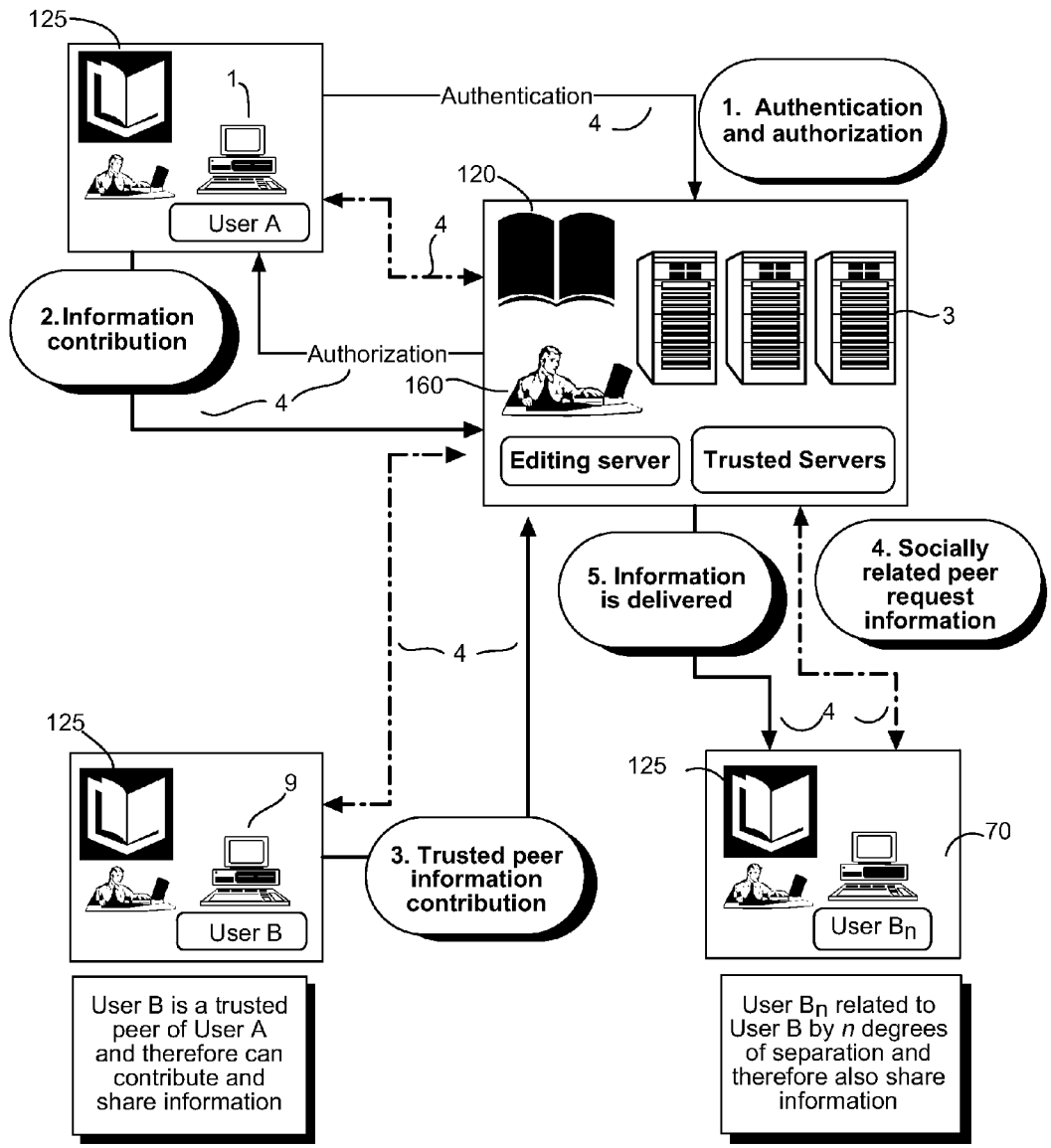
FIG. 44 is a process chart demonstrating information collaboration and management on a trusted social network.

Information is one particular type of resource that is ideally suited to be accessible and available on a trusted social network. In order for information to be useful and relevant, it must be written and organized for an intended audience. FIG. 44 is an example of information between managed on a trusted social network as defined in this patent. Major steps in this process are:

1. Authentication and Authorization. User A 1 requires updating information 120 that is being stored in a central trusted authority, an editing server 160. User A 1 must first be identified and receive authorization from the trusted servers 3 to access the network.
2. Information contribution. Once authenticated User A 1 submits the new information 125 to the editing server 160.
3. Trusted User information contribution A trusted user, User B 9, who is on the network can query the editing server 160 or contribute additional information 125.
4. Socially related user request information Any connected user that is related to User A 1 or User B 9, in this case, $B_n$ 70 (n representing the degree of separation from User B 9) can also edit or view the information 120. In this case, the User Bn 70 submits a query to the Editing Server 160.
5. Information is delivered The editing server 160 response to the query based on the rules and regulation governing the information 120.
6. Resource information The editing server 160 is connected to each user of the trusted social network to ensure each user has the appropriate access to the information 120.

As a result, information can be edited, manipulated, grouped and shared on a trusted network according to preference of each individual user. The uniqueness of this type of collaboration is that social relationships dictate function rather than having a central authority that has to manage user access to resources.

EXAMPLE 6

Electronic Games on a Trusted Social Network

Figure 45:
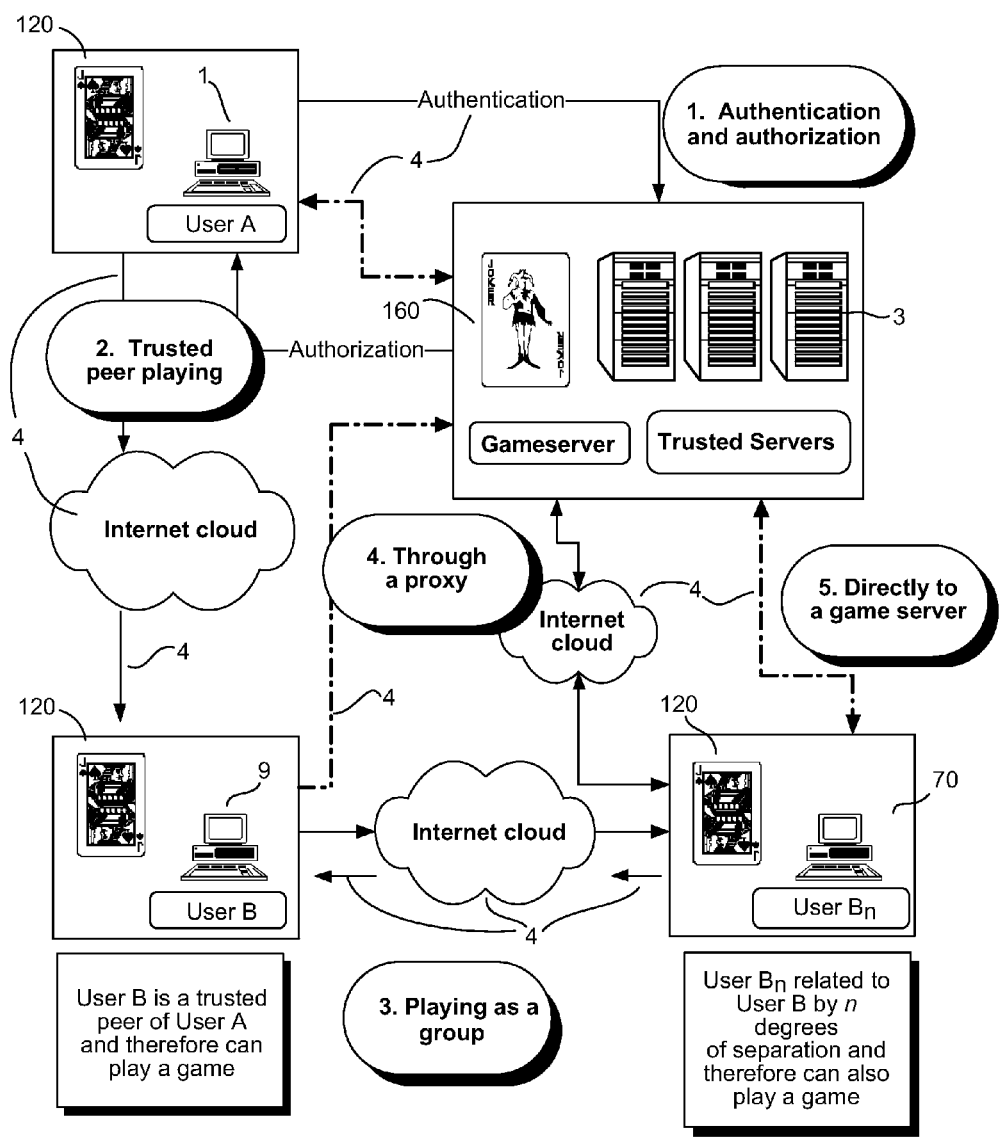
FIG. 45 is a process chart demonstrating playing games on a trusted social network.

The application of this patent can be used to play electronic games. Since most games are played between friends, the trusted social network becomes a natural electronic extension of the real world. Examples of games include, but are not limited to, the following: poker, chess, scrabble and on-line multi-player games. FIG. 45 illustrates an application of gaming on the network as defined in this patent. Major components in this process are:
1. Authentication and Authorization User A 1 wants to play a game 120 with another user. User A 1 must first be identified and receive authorization from trusted servers 3 to access the network.
2. Trusted user access A trusted user, for example User B 9, who is already authorized to be on the system and is defined by User A 1 to be a trusted user, can then play with User A 1.
3. Playing as a group Any connected users that are related to User A 1 or User B 9, in this case, $B_n$ 70 (n representing the degree of separation from User B 9) can also play the game 120 as an individual or as a group. A game server 160 can be a central organizer for some types of games.
4. Through a proxy In cases where there is a firewall or other forms of security, trusted users, the game server 160 can function as a proxy to establish connection between users.
5. Directly to a game server For complex games such as those found in on-line multi-player games, authenticated users can connect directly to the game server 160. In this case, the social network relationships are still maintained as each user plays the game.

This example illustrates the reinforcement of social networks on game play.

EXAMPLE 7

Advertising Through a Trusted Social Network

Figure 46:
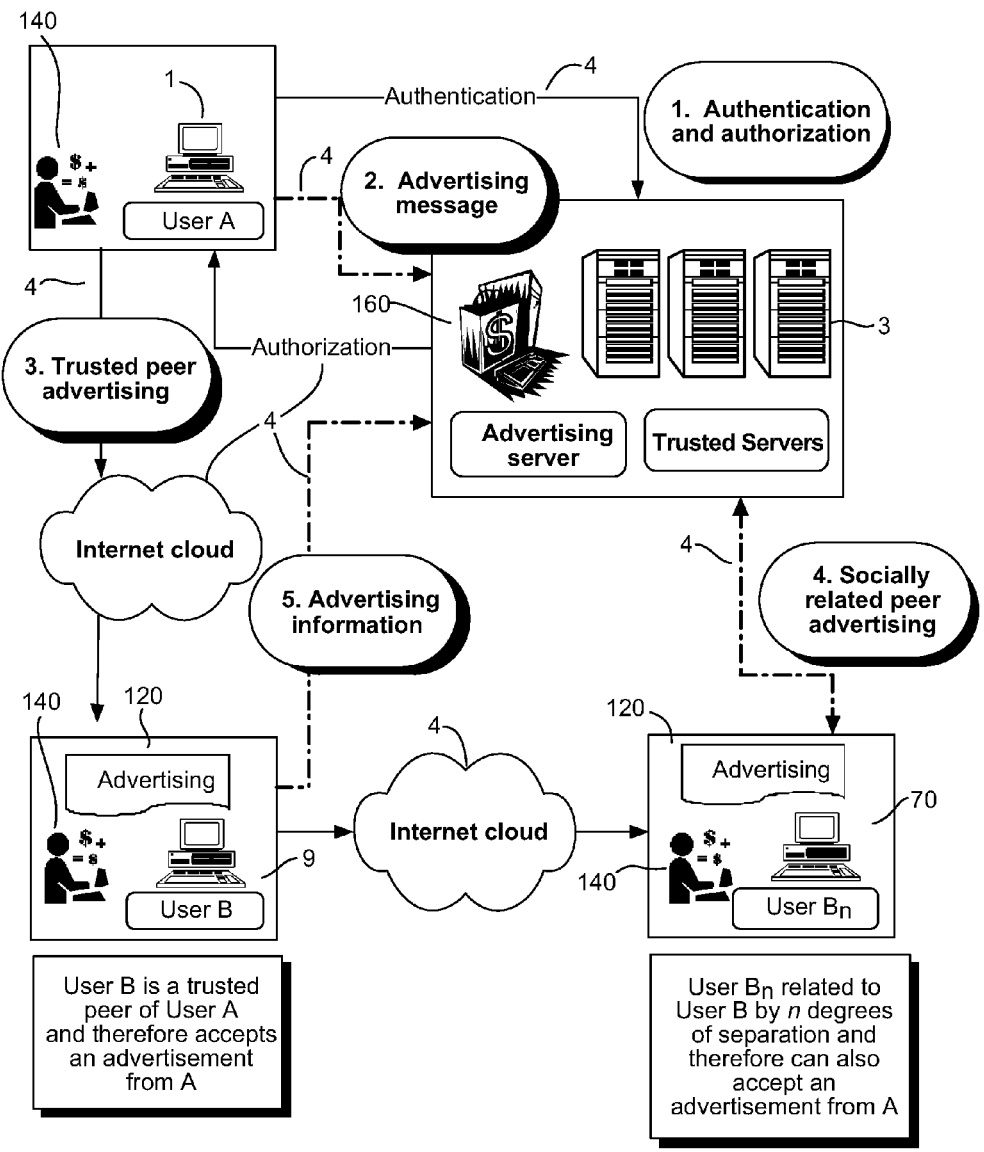
FIG. 46 is a process chart demonstrating advertising to users through a trusted social network.

The application of this patent can be applied to advertising for individual users of the network. FIG. 46 illustrates how the system allows a user to broadcast a message to users that are related socially. The main components are:
1. Authentication and Authorization User A 1 wants to broadcast a message 120. Examples of the message 120 include but are not limited to: a text message, a URL, a graphic or a multimedia file. User A 1 must first be identified and receive authorization from trusted servers 3 to access the network.
2. Advertising message User A 1 sends a request to advertise through the social network to the advertising server 160.
3. Trusted user advertisement Once authorized by the advertising server 160, User A 1 can send a message to a trusted user who is on the network, in this case, User B 9.
4. Socially related user advertisement Message 120 can also be sent to any user that is socially related to A 1 or B 9, in this case, User Bn 70.
5. Advertising information Advertising controls, for example, length of display or type of message is sent to each user. Advertising information, such as duration of the ad, click-through, etc. is sent back to the advertising server.

This example illustrates the ability to create a direct marketing campaign to users of a social group.

EXAMPLE 8

Example of Industrial Applications

The social network as defined in this patent can also be applied in a business environment. The essential nature of the network does not change but the terminology describing the elements of the network might be modified depending on context. For example, the network in this patent is described as a social network with elements within the network being described as friends related by a degree of separation. In a business settling, the social network is understood to be a collection of business related roles with the relationship being defined by business roles. The following examples illustrate the implementation of this patent in a corporate setting.

EXAMPLE 8A

Multilevel Marketing (MLM)

Figure 47:
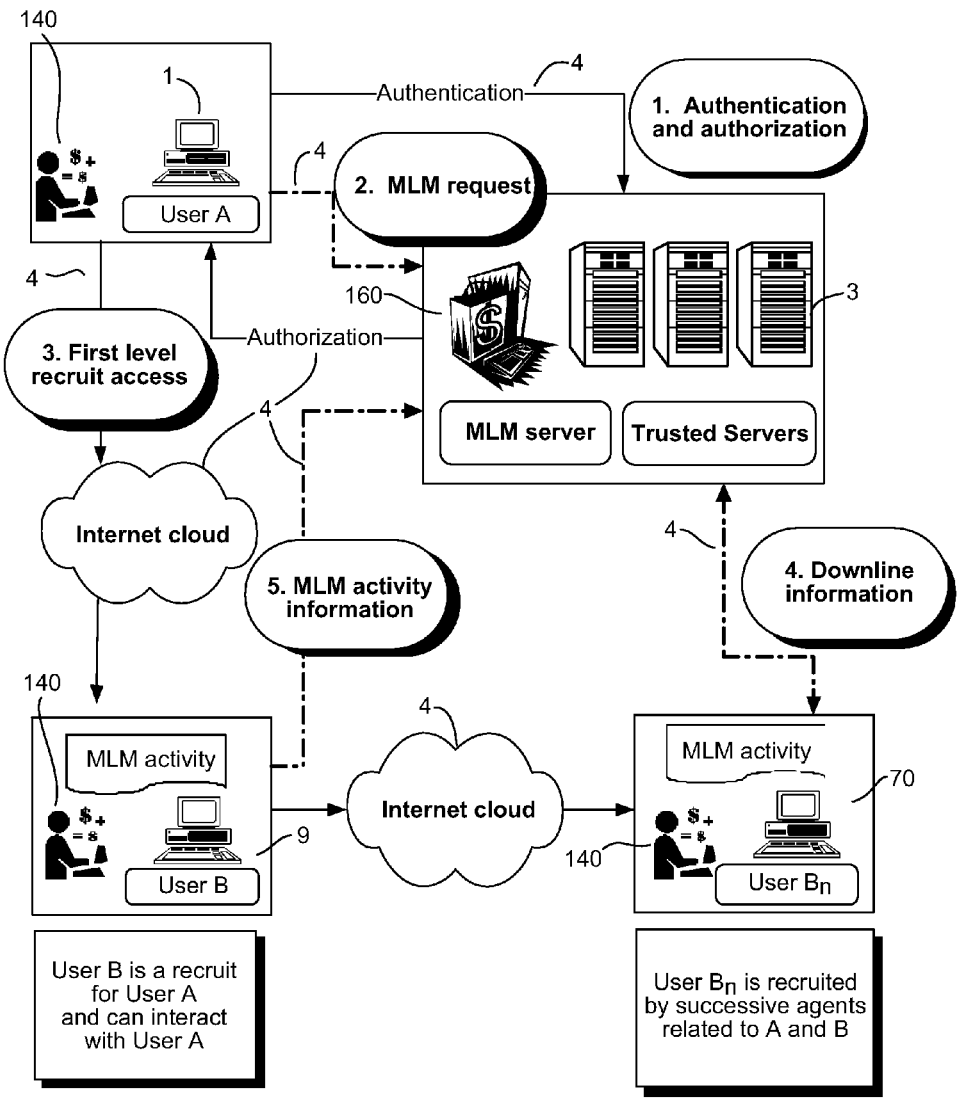
FIG. 47 is a process chart demonstrating the use of a trusted social network in the multi-level marketing industry.

Multi-level marketing (MLM), also known as network marketing (NM), affiliate marketing, or home based business franchising, is a business model that combines the characteristic of direct marketing and franchising. Typically, individuals enter into an independent contractor relationship with a business entity and acts as sellers and agents to recruit others to work for the company. New recruits themselves in turn are encouraged to get others to work for the company. Sellers are compensated based on their sales of a product or service, as well as the sales of those they bring into the business. FIG. 47 is an example of MLM operation on a network as described in this patent. In this example, the network is configured to be the same as an advertising network as described in Example 7 but the roles and responsibilities of each component reflects the needs of a MLM business. The main components are
1. Authentication and Authorization User A 1, represents an agent for a MLM business and wants access to the trusted network. User A 1 must first be identified and receive authorization from trusted servers 3 to access the network.
2. MLM request Once authenticated, User A 1 can then send a request to the MLM server 160. The MLM server 160 is a trusted entity that controls the rules and regulations specific to this business.
3. First levels recruit access User A 1 can now interact with a trusted user who is on the network, in this case, User B 9. In this context, User B 9 is known as a first level recruit because this user is directly related User A 1.
4. Downline information User Bn 70, is lower in the hierarchy relative to User A 1 and B 9 because User Bn 70 was recruited by agents related to User A 1 and B 9 in some way. Because of this relationship, User A 1 has rights to the MLM activities of User Bn 70.
5. MLM activity information MLM activities 120, for example, sales information, support are provided via a connection to the MLM server 160. Local MLM software 140 on each User's computing device processes this information. The MLM server 160 can also implement specific business rules based on such factors as the percentage of sales of users, sales volume discounts and limiting the number of users.

This example illustrates how the same network configuration can be applied in the MLM industry.

EXAMPLE 8B

Film Production

Figure 48:
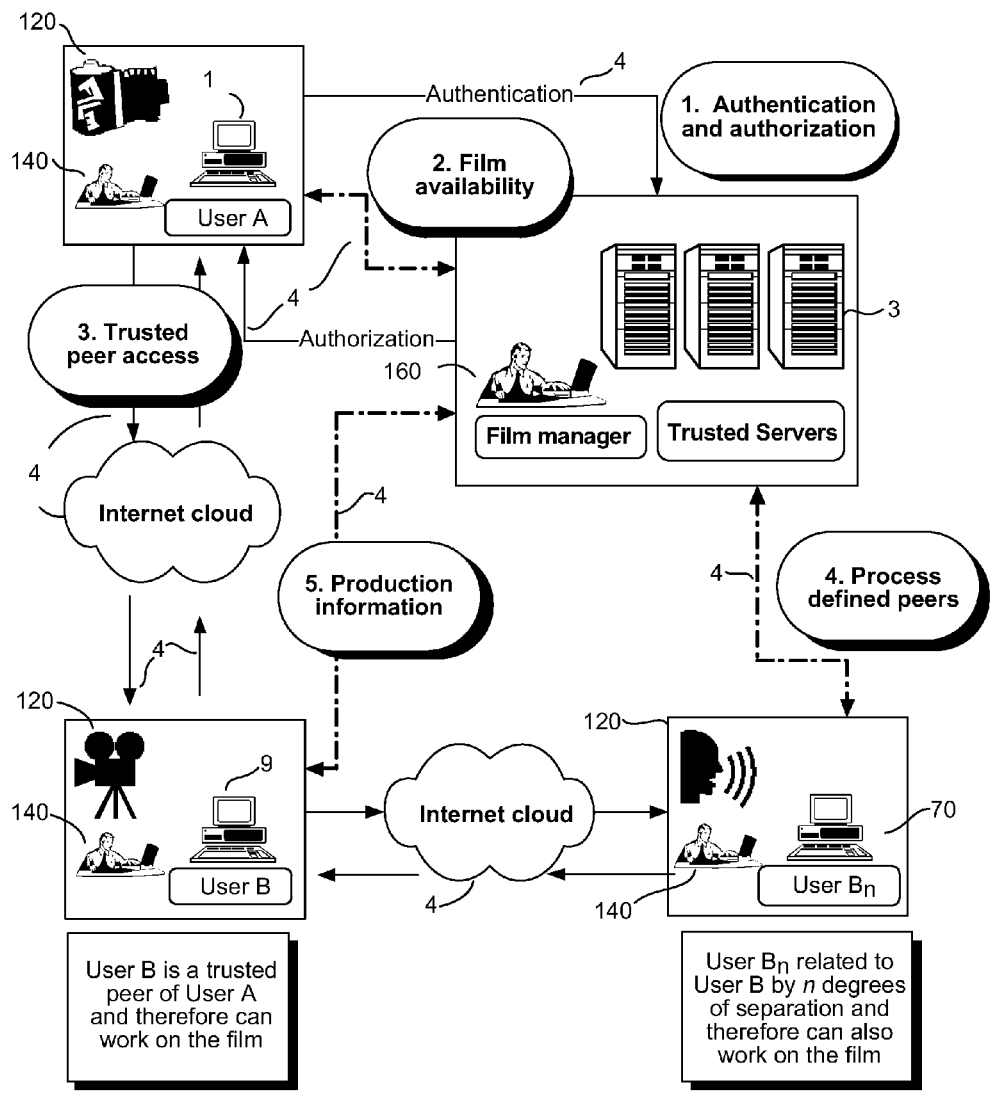
FIG. 48 is a process chart demonstrating the use of a trusted social network in the process of film production.

Film production is a complex process that requires the efforts of groups of individuals including: editors, sound engineers, cinematographers, etc. The process of movie production can be carried out on a network as described in this patent. FIG. 48 is a summary of a network created to support the production of a film.
1. Authentication and Authorization User A 1 has a movie in production. In this case, an electronic copy of the film 120 exists on his local machine. In order to use the network, User A 1 must first be identified and receive authorization from trusted servers 3 to gain access.
2. Film availability Once authenticated User A 1 sends film information 120 to the film manager 160 residing within the trusted servers 3.
3. Trusted user access A trusted user, for example User B 9, who is already authorized to be on the system and is defined by User A 1 to be a trusted user, obtains information from the resource manager 160. User A 1 and User B 9 can now both work on the film 120 accordingly. User B 9 can then delegate responsibilities and access to the film 120 independent from User A 1. This is because the network is built based on the principle that there is trust between User A 1 and User B 9.
4. Process defined users Any connected user that is related to User A 1 or User B 9, in this case, $B_n$ 70 (n representing the degree of separation from User B 9) can also access the film 120. The film manager 160 carries out the organization and management of this resource.
5. Resource information For each user, the local resource service 140 reports the available resource information to the resource manager 160 on the main trusted servers 3. For example, the film manager 160 can implement version control, so only one copy of a film 120 is in production. The film manager 160 can then allocate resources to each user of the trusted network accordingly.

As a result, resources can be grouped and shared on a trusted network according to the preference of each individual user.

EXAMPLE 8C

Film Festivals

Figure 49:
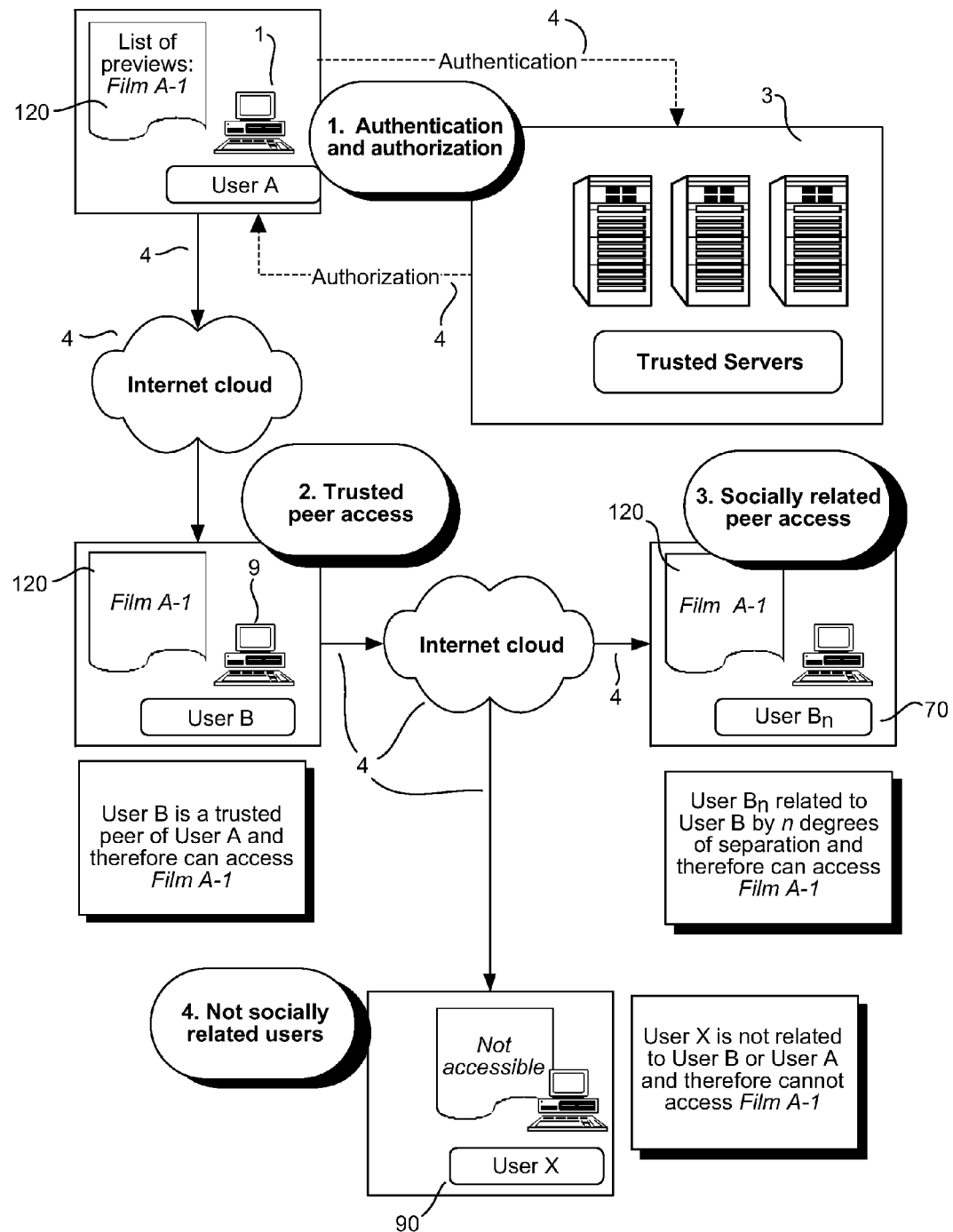
FIG. 49 is a process chart demonstrating the use of a trusted social network in film festivals.

A film festival is a periodic gathering of individuals with a common objective of showcasing films according to a common theme. FIG. 49 illustrates the use of this patent for a film festival in the case of sharing previews for the film festival. The network configuration is based on Example 1, file sharing on the network. In FIG. 49, the main components are:
1. Authentication and Authorization User A 1 has a list of films (film A-1) 120 on a shared folder. User A 1 must first be identified and receive authorization from the trusted servers 3. User A 1 could be a user of the film festival or just part of the audience.
2. Trusted user access A trusted user for A 1, in this case User B 9, who is already authorized to be on the system can now access film A-1 120.
3. Socially related users access Any connected user that are related to User A 1 or User B 9, in this case, $B_n$ 70 (n representing the degree of separation from User B 9) can also access file A-1 depending on the permission first setup by User A 1.
4. Not socially related users Users on the network that do not have a social connection to A 1, for example, User X 90, cannot have access to film A-1 120.

When a film festival uses this network, they can distribute content over the available band width of each trusted user while taking advantage of the growth opportunities of a social network.

EXAMPLE 8D

Medical Industry

Figure 50:
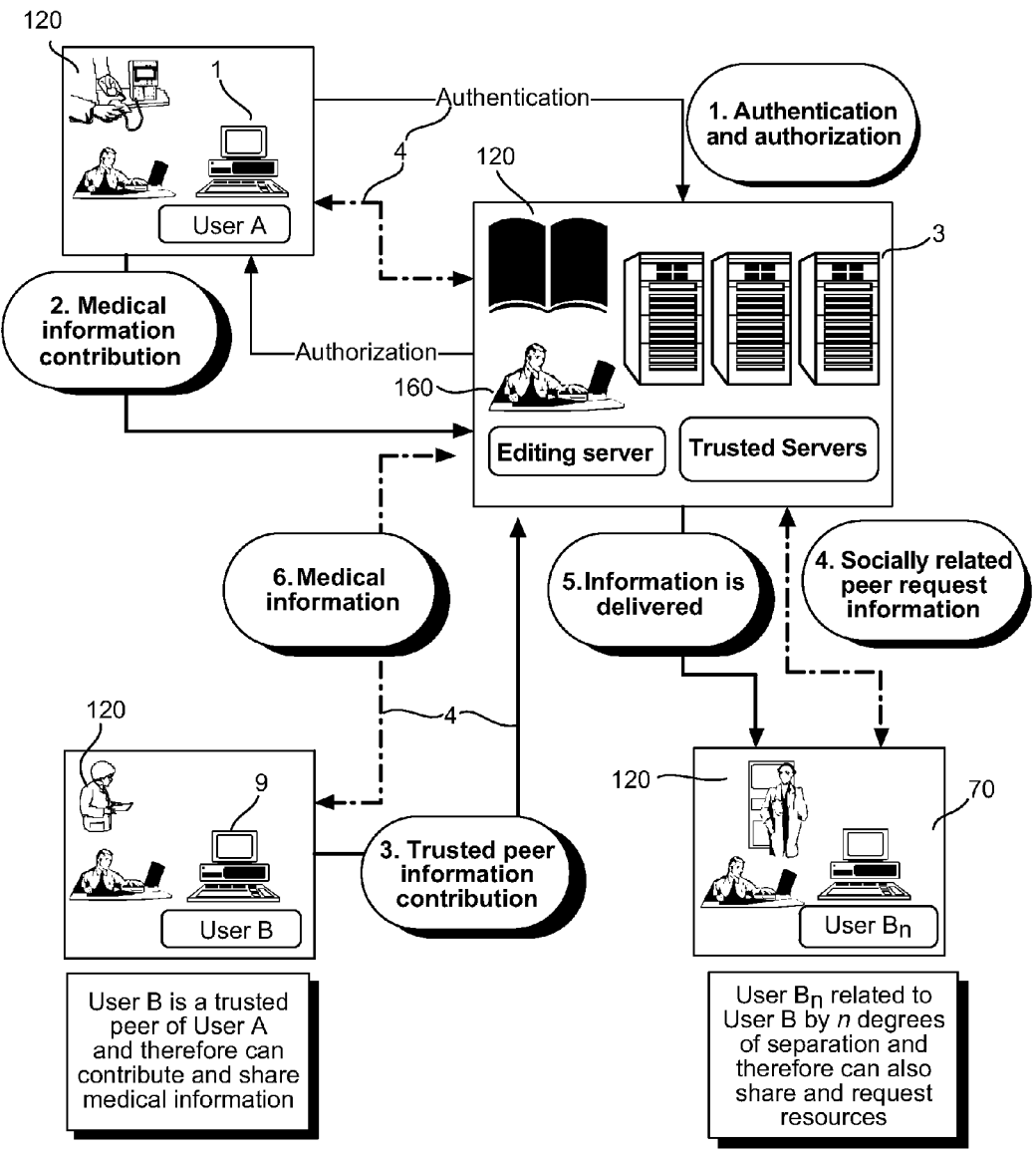
FIG. 50 is a process chart demonstrating the use of a trusted social network in the medical industry.
Figure 51:
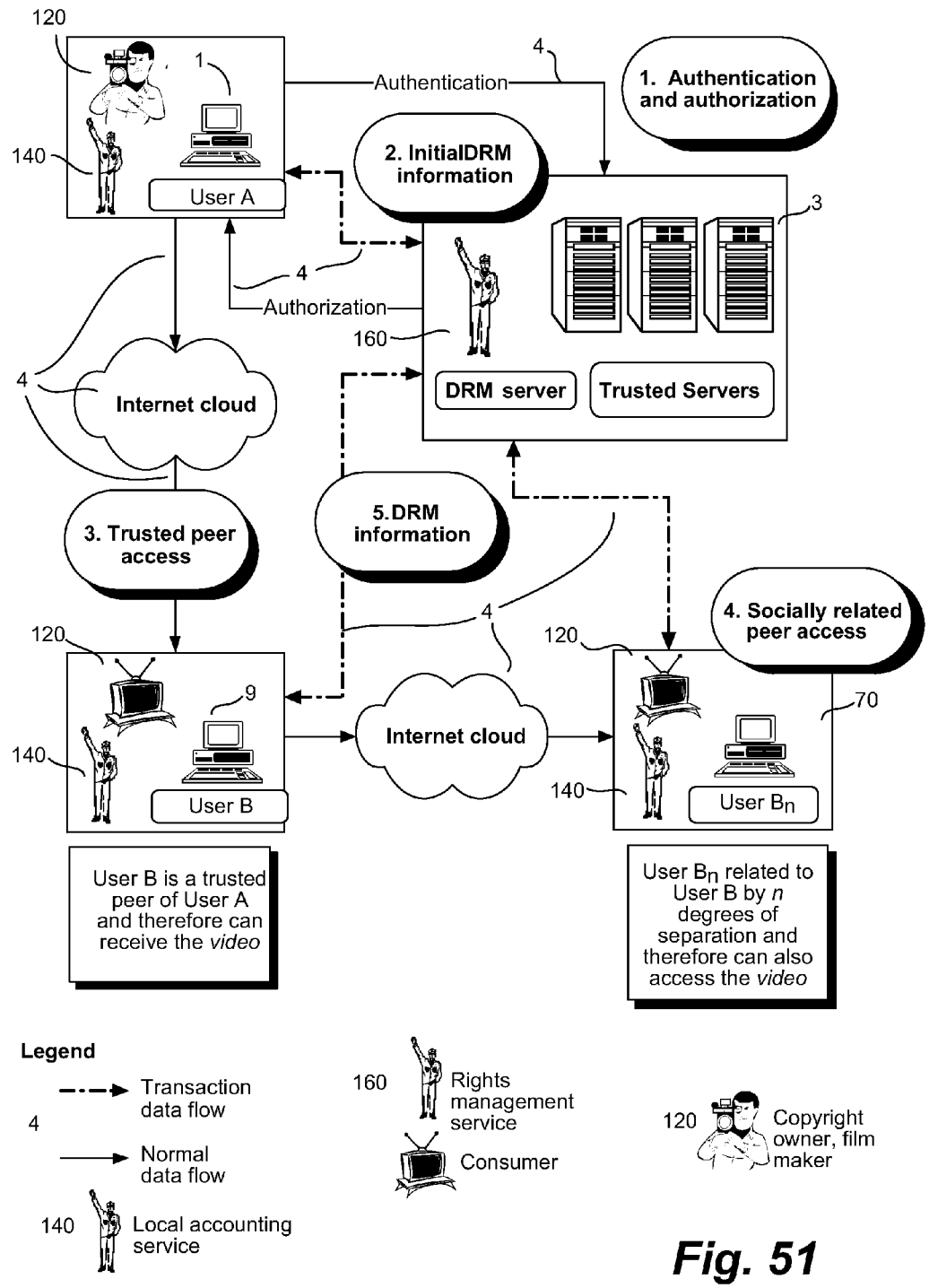
FIG. 51 is a process chart demonstrating the use of a trusted social network in the retail music/movie industry.

The contents of this patent can also be used in the medical industry for diagnostic and collaboration. An example of the application of this patent is given in FIG. 50. This application is similar to the process described in Example 5D. Information collaboration and management on a trusted social network. In this case, medical information, for example, test results or medical history are being shared on the network. Each user can represent a stakeholder in the medical industry, for example, specialists, the patient or the medical technologist. Major steps in this process are:
1. Authentication and Authorization User A 1 requires updating information 120 that is being stored in a central trusted authority. User A 1 must first be identified and receive authorization from the trusted servers 3 to access the network.
2. Medical Information contribution Once authenticated User A 1 submits the new information the trusted authority, a manager server 120.
3. Trusted User information contribution A trusted user, User B 9, who is on the network can query the manager server 160 or contribute additional information 120.
4. Related user request information Any connected user that is related to User A 1 or User B 9, in this case, $B_n$ 70 (n representing the degree of separation from User B 9) can also edit or view the information 120. In this case, the User Bn 70 submits a query to the manager server 160.
5. Information is delivered The manager server 160 responds to the query is based on the rules and regulation governing the use of the information 120.
6. Medical information The manager server 160 is connected to each user of the trusted social network to ensure each user has the appropriate access to the information.

As a result, information can be edited, manipulated, grouped and shared on a trusted network according to the preference of each individual user. The uniqueness of this type of collaboration is that each trusted user can assign access rights without having to explicitly request permission from any central authority. The role of the central authority is simply to verify the identity of the user.

EXAMPLE 8F

Online Movie and/or Music Store

Movies and music are increasingly available in electronic form. A new type of delivery mechanism and store can be created using this patent. Using Example 2B (an electronic market built on a trusted social network based on the transfer of digital rights) as a model, a movie produce can deliver a movie over a trusted network. In this case, the DRM (Digital Rights Management) server not only manages the rules and regulations governing the ownership of the object but also can enforce payment. The main components of this system are:

1. Authentication and Authorization User A 1 is the digital rights holder of a movie 120 on a shared folder. User A 1 must first be identified and receive authorization from the trusted servers 3 to access the network.
2. Initial DRM information User A 1 sends the Digital Rights Management (DRM) information 165 to the DRM server 160.
3. Trusted user of User A 1 requests and obtains item A trusted user, defined as User B 9, who is already authorized to be on the system can now obtain the item from User A 1. User A 1 must meet the requirements of the DRM server 160. For example, paying for the digital rights to the movie 120.
4. Socially related users can access Any connected users that are related to User A 1 or User B 9, in this case, $B_n$ 70 (n representing the degree of separation from User B 9) can also obtain the movie 120 depending on the permission first set up by User A 1 and subsequently, all the other related users. The digital rights information 165 is sent to the DRM manager 160 to ensure compliance with the rights and regulations governing the use of the movie 120.
5. Digital rights information For each user, the local accounting service 140 reports the digital rights information 165 to the DRM manager 160. The DRM manager 160 will assign the appropriate access rules and regulation governing the use of the item as defined by the digital rights owner.

A new type of retail store is created based on the network as described in this patent. Each individual user can act as both consumer and distributor enjoying the benefits of network and efficient distribution.

We claim:

1. A computer-implemented method for limiting distribution of one or more resources in a network of users to defined users, the method comprising the steps of:
   establishing a network of users;
   assigning to each of said users in said network a criterion, wherein said criterion is related to a degree of separation between a first user and one or more other users, the degree of separation representative of the number of pre-existing relationships of trust which link one user and one or more other users, as defined by said users;
   authenticating, identifying and verifying said first user and each of the one or more other users;
   processing the degree of separation between said first user and one or more other users; and
   granting access to a resource of a first user to one or more other users if the one or more other users falls within a degree of separation of the first user sharing the resource which is specified by the first user, and wherein granting of access to the resource by the one or more other users to a subsequent user is allowed if the subsequent user falls within the degree of separation from the first user that is specified by the first user.

2. A method of claim 1 wherein, a trusted server facilitates the authentication, identification, and verification of each user.

3. A method of claim 1 wherein, a processing engine is operable to associate the degree of separation between said first user and the one or more other users.

4. A computer implemented method for a first user to share resources with a plurality of other users in a secure social network comprising:
   interfacing the first user and the plurality of other users with one or more trusted servers and one or more other computing devices in a network via a plurality of software clients;
   communicating between the one or more trusted servers and at least one or more software clients;
   authenticating, identifying, and verifying the first user and each user in said plurality of other users;
   associating each of the other users with a degree of separation between the first user and one or more the other users; and
   granting access to a resource of a first user to one or more other users if the one or more other users falls within a degree of separation of the first user that is specified by the first user, and wherein granting access to the resource of a first user by the one of more other users to a subsequent user is granted if the subsequent user falls within the degree of separation from the first user that is specified by the first user.

* * * * *